United States Patent
Missig et al.

(10) Patent No.: US 11,895,391 B2
(45) Date of Patent: Feb. 6, 2024

(54) CAPTURING AND DISPLAYING IMAGES WITH MULTIPLE FOCAL PLANES

(71) Applicant: Apple Inc., Cupertino, CA (US)

(72) Inventors: Julian Missig, Redwood City, CA (US); Guillaume Ardaud, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/479,897

(22) Filed: Sep. 20, 2021

(65) Prior Publication Data

US 2022/0006946 A1    Jan. 6, 2022

Related U.S. Application Data

(63) Continuation of application No. 16/528,941, filed on Aug. 1, 2019, now Pat. No. 11,128,792.

(60) Provisional application No. 62/739,093, filed on Sep. 28, 2018.

(51) Int. Cl.
   *H04N 23/62*      (2023.01)
   *H04N 7/14*       (2006.01)

(52) U.S. Cl.
   CPC ............. *H04N 23/62* (2023.01); *H04N 7/141* (2013.01)

(58) Field of Classification Search
   CPC ............... H04N 5/23216; H04N 7/141; H04N 5/232945; H04N 5/232935; H04N 5/232127; H04N 5/232133; H04N 7/147
See application file for complete search history.

(56) References Cited

U.S. PATENT DOCUMENTS

| | | | |
|---|---|---|---|
| 4,518,237 A | 5/1985 | Mizokami | |
| 4,933,702 A | 6/1990 | Komatsuzaki et al. | |
| 5,463,443 A | 10/1995 | Tanaka et al. | |
| 5,557,358 A | 9/1996 | Mukai et al. | |
| 5,615,384 A | 3/1997 | Allard et al. | |
| 5,617,526 A | 4/1997 | Oran et al. | |
| 5,825,353 A | 10/1998 | Will | |
| 6,262,769 B1 | 7/2001 | Anderson et al. | |
| 6,268,864 B1 | 7/2001 | Chen et al. | |
| 6,278,466 B1 | 8/2001 | Chen | |
| 6,359,837 B1 | 3/2002 | Tsukamoto | |

(Continued)

FOREIGN PATENT DOCUMENTS

| | | | |
|---|---|---|---|
| AU | 2015100713 A4 | 6/2015 | |
| AU | 2013368443 B2 | 3/2016 | |

(Continued)

OTHER PUBLICATIONS

Applicant Initiated Interview Summary received for U.S. Appl. No. 17/190,879, dated Oct. 26, 2021, 3 pages.

(Continued)

*Primary Examiner* — Phung-Hoang J Nguyen
(74) *Attorney, Agent, or Firm* — DLA Piper LLP (US)

(57) ABSTRACT

The present disclosure generally relates to capturing and displaying video with multiple focal planes. The video includes a subject with a predefined portion of the subject identified in a first focal region. When a set of one or more conditions is met, the video is displayed with a focal plane of the video selected to be outside of the first focal region. When the set of one or more conditions is met is no longer met; and the video is displayed with the focal plane of the video selected to be inside of the first focal region.

51 Claims, 30 Drawing Sheets

(56) References Cited

U.S. PATENT DOCUMENTS

| | | |
|---|---|---|
| 6,429,896 B1 | 8/2002 | Aruga et al. |
| 6,483,878 B1 | 11/2002 | Yonezawa et al. |
| 6,522,347 B1 | 2/2003 | Sakai et al. |
| 6,621,524 B1 | 9/2003 | Iijima et al. |
| 6,677,981 B1 | 1/2004 | Mancuso et al. |
| 6,726,094 B1 | 4/2004 | Rantze et al. |
| 6,728,784 B1 | 4/2004 | Mattaway |
| 6,731,308 B1 | 5/2004 | Tang et al. |
| 6,809,724 B1 | 10/2004 | Shiraishi et al. |
| 6,809,759 B1 | 10/2004 | Chiang |
| 6,819,867 B2 | 11/2004 | Mayer et al. |
| 6,900,840 B1 | 5/2005 | Schinner et al. |
| 7,185,054 B1 | 2/2007 | Ludwig et al. |
| 7,463,304 B2 | 12/2008 | Murray |
| 7,515,178 B1 | 4/2009 | Fleischman et al. |
| 7,571,014 B1 | 8/2009 | Lambourne et al. |
| 7,583,892 B2 | 9/2009 | Okumura |
| 7,801,971 B1 | 9/2010 | Amidon et al. |
| 7,903,171 B2 | 3/2011 | Takabatake et al. |
| 8,169,463 B2 | 5/2012 | Enstad et al. |
| 8,185,839 B2 | 5/2012 | Jalon et al. |
| 8,189,087 B2 | 5/2012 | Misawa et al. |
| 8,203,640 B2 | 6/2012 | Kim et al. |
| 8,274,544 B2 | 9/2012 | Kurtz et al. |
| 8,295,546 B2 | 10/2012 | Craig et al. |
| 8,350,945 B2 | 1/2013 | Yumiki |
| 8,370,448 B2 | 2/2013 | Galchev |
| 8,390,628 B2 | 3/2013 | Harding et al. |
| 8,405,680 B1 | 3/2013 | Gomes et al. |
| 8,423,089 B2 | 4/2013 | Song et al. |
| 8,493,408 B2 | 7/2013 | Williamson et al. |
| 8,576,304 B2 | 11/2013 | Ishibashi |
| 8,624,836 B1 | 1/2014 | Miller et al. |
| 8,638,371 B2 | 1/2014 | Laberge et al. |
| 8,675,084 B2 | 3/2014 | Bolton et al. |
| 8,723,988 B2 | 5/2014 | Thorn |
| 8,736,704 B2 | 5/2014 | Jasinski et al. |
| 8,736,716 B2 | 5/2014 | Prentice |
| 8,742,890 B2 | 6/2014 | Gocho et al. |
| 8,762,895 B2 | 6/2014 | Mehta et al. |
| 8,817,158 B2 | 8/2014 | Saito |
| 8,848,097 B2 | 9/2014 | Makii |
| 8,885,978 B2 | 11/2014 | Cote et al. |
| 8,896,652 B2 | 11/2014 | Ralston |
| 8,914,752 B1 | 12/2014 | Spiegel |
| 9,001,226 B1 | 4/2015 | Ng et al. |
| 9,094,576 B1 | 7/2015 | Karakotsios |
| 9,153,031 B2 | 10/2015 | El-Saban et al. |
| 9,158,974 B1 | 10/2015 | Laska et al. |
| 9,172,866 B2 | 10/2015 | Ito et al. |
| 9,185,062 B1 | 11/2015 | Yang et al. |
| 9,185,291 B1 | 11/2015 | Shabtay et al. |
| 9,207,837 B2 | 12/2015 | Paretti et al. |
| 9,223,486 B2 | 12/2015 | Shin et al. |
| 9,230,241 B1 | 1/2016 | Singh et al. |
| 9,230,355 B1 | 1/2016 | Ahuja et al. |
| 9,245,177 B2 | 1/2016 | Perez |
| 9,246,961 B2 | 1/2016 | Walkin et al. |
| 9,250,797 B2 | 2/2016 | Roberts et al. |
| 9,253,531 B2 | 2/2016 | Relyea et al. |
| 9,264,660 B1 | 2/2016 | Petterson et al. |
| 9,288,476 B2 | 3/2016 | Sandrew et al. |
| 9,298,263 B2 | 3/2016 | Geisner et al. |
| 9,313,397 B2 | 4/2016 | Harris et al. |
| 9,313,401 B2 | 4/2016 | Frey et al. |
| 9,325,970 B2 | 4/2016 | Sakayori |
| 9,342,230 B2 | 5/2016 | Bastien et al. |
| 9,349,414 B1 | 5/2016 | Furment et al. |
| 9,360,671 B1 | 6/2016 | Zhou |
| 9,380,264 B1 | 6/2016 | Vakalapudi |
| 9,423,868 B2 | 8/2016 | Iwasaki |
| 9,448,708 B1 | 9/2016 | Bennett et al. |
| 9,451,144 B2 | 9/2016 | Dye |
| 9,462,017 B1 | 10/2016 | Siracusano, Jr. |
| 9,467,812 B2 | 10/2016 | Jung et al. |
| 9,544,563 B1 | 1/2017 | Cheng et al. |
| 9,592,428 B2 | 3/2017 | Binder |
| 9,600,178 B2 | 3/2017 | Yun et al. |
| 9,602,559 B1 | 3/2017 | Barros et al. |
| 9,609,221 B2 | 3/2017 | Kim et al. |
| 9,626,589 B1 | 4/2017 | Graham et al. |
| 9,628,416 B2 | 4/2017 | Henderson |
| 9,635,314 B2 | 4/2017 | Barkley et al. |
| 9,667,881 B2 | 5/2017 | Harris et al. |
| 9,686,497 B1 | 6/2017 | Terry |
| 9,704,250 B1 | 7/2017 | Gilmour et al. |
| 9,716,825 B1 | 7/2017 | Manzari et al. |
| 9,747,504 B2 | 8/2017 | Ma et al. |
| 9,749,543 B2 | 8/2017 | Kim et al. |
| 9,760,976 B2 | 9/2017 | Kameyama |
| 9,767,613 B1 | 9/2017 | Bedikian et al. |
| 9,800,951 B1 | 10/2017 | Carlson et al. |
| 9,819,877 B1 | 11/2017 | Faulkner et al. |
| 9,819,912 B2 | 11/2017 | Maruta |
| 9,942,463 B2 | 4/2018 | Kuo et al. |
| 9,948,589 B2 | 4/2018 | Gonnen et al. |
| 9,973,674 B2 | 5/2018 | Dye et al. |
| 10,015,298 B2 | 7/2018 | Yang et al. |
| 10,021,294 B2 | 7/2018 | Kwon et al. |
| 10,055,887 B1 | 8/2018 | Gil et al. |
| 10,091,411 B2 | 10/2018 | Ha et al. |
| 10,095,385 B2 | 10/2018 | Walkin et al. |
| 10,139,218 B2 | 11/2018 | Matsushita |
| 10,152,222 B2 | 12/2018 | Ozawa et al. |
| 10,176,622 B1 | 1/2019 | Waggoner et al. |
| 10,187,587 B2 | 1/2019 | Hasinoff et al. |
| 10,194,189 B1 | 1/2019 | Goetz et al. |
| 10,225,463 B2 | 3/2019 | Yun et al. |
| 10,230,901 B2 | 3/2019 | Harris et al. |
| 10,270,983 B1 | 4/2019 | Van Os et al. |
| 10,284,812 B1 | 5/2019 | Van Os et al. |
| 10,289,265 B2 | 5/2019 | Kulkarni |
| 10,297,034 B2 | 5/2019 | Nash et al. |
| 10,304,231 B2 | 5/2019 | Saito |
| 10,313,652 B1 | 6/2019 | Falstrup et al. |
| 10,325,417 B1 | 6/2019 | Scapel et al. |
| 10,326,942 B2 | 6/2019 | Shabtay et al. |
| 10,345,592 B2 | 7/2019 | Samec et al. |
| 10,353,532 B1 | 7/2019 | Holz et al. |
| 10,362,272 B1 | 7/2019 | Van Os et al. |
| 10,375,313 B1 | 8/2019 | Van Os et al. |
| 10,379,719 B2 | 8/2019 | Scapel et al. |
| 10,389,977 B1 | 8/2019 | Van Os et al. |
| 10,397,469 B1 | 8/2019 | Yan et al. |
| 10,397,500 B1 | 8/2019 | Xu et al. |
| 10,410,426 B2 | 9/2019 | Kamini et al. |
| 10,447,908 B2 | 10/2019 | Lee et al. |
| 10,467,729 B1 | 11/2019 | Perera et al. |
| 10,467,775 B1 | 11/2019 | Waggoner et al. |
| 10,521,091 B2 | 12/2019 | Anzures et al. |
| 10,521,948 B2 | 12/2019 | Rickwald et al. |
| 10,523,625 B1 | 12/2019 | Allen et al. |
| 10,523,879 B2 | 12/2019 | Dye et al. |
| 10,523,976 B2 | 12/2019 | Hemmati et al. |
| 10,574,895 B2 | 2/2020 | Lee et al. |
| 10,585,551 B2 | 3/2020 | Lee et al. |
| 10,614,139 B2 | 4/2020 | Fujioka et al. |
| 10,638,058 B2 | 4/2020 | Matsunaga |
| 10,645,294 B1 | 5/2020 | Manzari et al. |
| 10,652,470 B1 | 5/2020 | Manzari et al. |
| 10,657,695 B2 | 5/2020 | Chand et al. |
| 10,659,405 B1 | 5/2020 | Chang et al. |
| 10,674,072 B1 | 6/2020 | Manzari et al. |
| 10,681,282 B1 | 6/2020 | Manzari et al. |
| 10,698,575 B2 | 6/2020 | Walkin et al. |
| 10,735,642 B1 | 8/2020 | Manzari et al. |
| 10,735,643 B1 | 8/2020 | Manzari et al. |
| 10,771,741 B1 | 9/2020 | Reynolds et al. |
| 10,791,273 B1 | 9/2020 | Manzari et al. |
| 10,798,035 B2 | 10/2020 | Lewis et al. |
| 10,845,968 B2 | 11/2020 | Scapel et al. |
| 10,855,910 B2 | 12/2020 | Tano et al. |
| 10,902,661 B1 | 1/2021 | Mourkogiannis et al. |
| 10,909,586 B2 | 2/2021 | Avedissian et al. |

(56) References Cited

U.S. PATENT DOCUMENTS

| | | |
|---|---|---|
| 10,924,446 B1 | 2/2021 | Paul |
| 10,958,850 B2 | 3/2021 | Kwak et al. |
| 10,963,145 B1 | 3/2021 | Voss et al. |
| 10,972,655 B1 | 4/2021 | Ostap et al. |
| 11,039,074 B1 | 6/2021 | Manzari et al. |
| 11,054,973 B1 | 7/2021 | Manzari et al. |
| 11,079,913 B1 | 8/2021 | Kim et al. |
| 11,120,528 B1 | 9/2021 | Seely et al. |
| 11,212,449 B1 | 12/2021 | Manzari et al. |
| 11,258,619 B2 | 2/2022 | Libin |
| 11,321,857 B2 | 5/2022 | Stauber et al. |
| 11,350,026 B1 | 5/2022 | Manzari et al. |
| 11,360,634 B1 | 6/2022 | Chang et al. |
| 11,418,699 B1 | 8/2022 | Manzari et al. |
| 11,449,188 B1 | 9/2022 | Chang et al. |
| 11,468,625 B2 | 10/2022 | Manzari et al. |
| 11,539,876 B2 | 12/2022 | Manzari et al. |
| 2001/0030597 A1 | 10/2001 | Inoue et al. |
| 2001/0041007 A1 | 11/2001 | Aoki |
| 2002/0070945 A1 | 6/2002 | Kage |
| 2002/0101446 A1 | 8/2002 | Tang et al. |
| 2002/0140803 A1 | 10/2002 | Gutta et al. |
| 2002/0167604 A1 | 11/2002 | Ban et al. |
| 2002/0171737 A1 | 11/2002 | Tullis et al. |
| 2003/0025802 A1 | 2/2003 | Mayer, Jr. et al. |
| 2003/0107664 A1 | 6/2003 | Suzuki |
| 2003/0112938 A1 | 6/2003 | Kanakubo et al. |
| 2003/0122930 A1 | 7/2003 | Schofield et al. |
| 2003/0160756 A1 | 8/2003 | Numano |
| 2003/0160861 A1 | 8/2003 | Barlow et al. |
| 2003/0174216 A1 | 9/2003 | Iguchi et al. |
| 2003/0184587 A1 | 10/2003 | Ording et al. |
| 2003/0225836 A1 | 12/2003 | Lee et al. |
| 2004/0003040 A1 | 1/2004 | Beavers et al. |
| 2004/0041924 A1 | 3/2004 | White et al. |
| 2004/0061796 A1 | 4/2004 | Honda et al. |
| 2004/0090469 A1 | 5/2004 | Moon et al. |
| 2004/0095473 A1 | 5/2004 | Park |
| 2004/0189861 A1 | 9/2004 | Tom et al. |
| 2004/0201699 A1 | 10/2004 | Parulski et al. |
| 2004/0239763 A1 | 12/2004 | Notea et al. |
| 2005/0015286 A1 | 1/2005 | Rudnik et al. |
| 2005/0024517 A1 | 2/2005 | Luciano |
| 2005/0099492 A1 | 5/2005 | Orr |
| 2005/0124365 A1 | 6/2005 | Balasuriya et al. |
| 2005/0134695 A1 | 6/2005 | Deshpande et al. |
| 2005/0144247 A1 | 6/2005 | Christensen et al. |
| 2005/0189419 A1 | 9/2005 | Igarashi et al. |
| 2005/0206981 A1 | 9/2005 | Hung |
| 2005/0210380 A1 | 9/2005 | Kramer et al. |
| 2005/0210403 A1 | 9/2005 | Satanek |
| 2005/0237383 A1 | 10/2005 | Soga et al. |
| 2005/0248660 A1 | 11/2005 | Stavely et al. |
| 2005/0270397 A1 | 12/2005 | Battles |
| 2006/0002315 A1 | 1/2006 | Theurer et al. |
| 2006/0002523 A1 | 1/2006 | Bettis et al. |
| 2006/0026521 A1 | 2/2006 | Hotelling et al. |
| 2006/0033831 A1 | 2/2006 | Ejima et al. |
| 2006/0098085 A1 | 5/2006 | Nichols et al. |
| 2006/0098634 A1 | 5/2006 | Umemoto et al. |
| 2006/0132482 A1 | 6/2006 | Oh et al. |
| 2006/0158730 A1 | 7/2006 | Kira |
| 2006/0170781 A1 | 8/2006 | Sobol |
| 2006/0187322 A1 | 8/2006 | Janson et al. |
| 2006/0209067 A1 | 9/2006 | Pellacini et al. |
| 2006/0228040 A1 | 10/2006 | Simon et al. |
| 2006/0233192 A1 | 10/2006 | Mihara |
| 2006/0275025 A1 | 12/2006 | Labaziewicz et al. |
| 2007/0004389 A1 | 1/2007 | Wallace et al. |
| 2007/0024614 A1 | 2/2007 | Tam et al. |
| 2007/0025711 A1 | 2/2007 | Marcus et al. |
| 2007/0025714 A1 | 2/2007 | Shiraki |
| 2007/0025723 A1 | 2/2007 | Baudisch et al. |
| 2007/0031062 A1 | 2/2007 | Pal et al. |
| 2007/0040810 A1 | 2/2007 | Dowe et al. |
| 2007/0097088 A1 | 5/2007 | Battles |
| 2007/0101355 A1 | 5/2007 | Chung et al. |
| 2007/0109417 A1 | 5/2007 | Hyttfors et al. |
| 2007/0113099 A1 | 5/2007 | Takikawa et al. |
| 2007/0124783 A1 | 5/2007 | Ahiska et al. |
| 2007/0140675 A1 | 6/2007 | Yanagi et al. |
| 2007/0146503 A1 | 6/2007 | Shiraki |
| 2007/0153112 A1 | 7/2007 | Ueda et al. |
| 2007/0165103 A1 | 7/2007 | Arima et al. |
| 2007/0195350 A1 | 8/2007 | Hattori |
| 2007/0222789 A1 | 9/2007 | Yoshio et al. |
| 2007/0228259 A1 | 10/2007 | Hohenberger |
| 2007/0254640 A1 | 11/2007 | Bliss |
| 2007/0257992 A1 | 11/2007 | Kato |
| 2007/0273769 A1 | 11/2007 | Takahashi |
| 2007/0291152 A1 | 12/2007 | Suekane et al. |
| 2008/0030592 A1 | 2/2008 | Border et al. |
| 2008/0084484 A1 | 4/2008 | Ochi et al. |
| 2008/0106601 A1 | 5/2008 | Matsuda |
| 2008/0122796 A1 | 5/2008 | Jobs et al. |
| 2008/0129759 A1 | 6/2008 | Jeon et al. |
| 2008/0129825 A1 | 6/2008 | Deangelis et al. |
| 2008/0131019 A1 | 6/2008 | Ng |
| 2008/0143840 A1 | 6/2008 | Corkum et al. |
| 2008/0192020 A1 | 8/2008 | Kang et al. |
| 2008/0218611 A1 | 9/2008 | Parulski et al. |
| 2008/0222558 A1 | 9/2008 | Cho et al. |
| 2008/0284855 A1 | 11/2008 | Umeyama et al. |
| 2008/0297587 A1 | 12/2008 | Kurtz et al. |
| 2008/0298571 A1 | 12/2008 | Kurtz et al. |
| 2008/0309811 A1 | 12/2008 | Fujinawa et al. |
| 2008/0313278 A1 | 12/2008 | Hochberg |
| 2009/0009612 A1 | 1/2009 | Tico et al. |
| 2009/0021576 A1 | 1/2009 | Linder et al. |
| 2009/0021600 A1 | 1/2009 | Watanabe |
| 2009/0022422 A1 | 1/2009 | Sorek et al. |
| 2009/0027515 A1 | 1/2009 | Maruyama et al. |
| 2009/0027539 A1 | 1/2009 | Kunou |
| 2009/0040332 A1 | 2/2009 | Yoshino et al. |
| 2009/0046075 A1 | 2/2009 | Kim et al. |
| 2009/0046097 A1 | 2/2009 | Franklin |
| 2009/0051783 A1 | 2/2009 | Kim et al. |
| 2009/0066817 A1 | 3/2009 | Sakamaki |
| 2009/0073285 A1 | 3/2009 | Terashima |
| 2009/0077460 A1 | 3/2009 | Li et al. |
| 2009/0102918 A1 | 4/2009 | Sakamoto et al. |
| 2009/0102933 A1 | 4/2009 | Harris et al. |
| 2009/0109316 A1 | 4/2009 | Matsui |
| 2009/0117936 A1 | 5/2009 | Maeng |
| 2009/0144639 A1 | 6/2009 | Nims et al. |
| 2009/0164587 A1 | 6/2009 | Gavita et al. |
| 2009/0167671 A1 | 7/2009 | Kerofsky |
| 2009/0167672 A1 | 7/2009 | Kerofsky |
| 2009/0174763 A1 | 7/2009 | Bengtsson et al. |
| 2009/0175511 A1 | 7/2009 | Lee et al. |
| 2009/0244318 A1 | 10/2009 | Makii |
| 2009/0249244 A1 | 10/2009 | Robinson et al. |
| 2009/0251484 A1 | 10/2009 | Zhao et al. |
| 2009/0256780 A1 | 10/2009 | Small et al. |
| 2009/0262206 A1 | 10/2009 | Park |
| 2009/0263044 A1 | 10/2009 | Imagawa et al. |
| 2009/0276700 A1 | 11/2009 | Anderson et al. |
| 2009/0287790 A1 | 11/2009 | Upton et al. |
| 2009/0309897 A1 | 12/2009 | Morita et al. |
| 2009/0315671 A1 | 12/2009 | Gocho et al. |
| 2009/0319897 A1 | 12/2009 | Kotler et al. |
| 2009/0322901 A1 | 12/2009 | Subbotin et al. |
| 2010/0011065 A1 | 1/2010 | Scherpa et al. |
| 2010/0020221 A1 | 1/2010 | Tupman et al. |
| 2010/0020222 A1 | 1/2010 | Jones et al. |
| 2010/0033615 A1 | 2/2010 | Mori |
| 2010/0039498 A1 | 2/2010 | Liu et al. |
| 2010/0039522 A1 | 2/2010 | Huang |
| 2010/0042926 A1 | 2/2010 | Bull et al. |
| 2010/0066853 A1 | 3/2010 | Aoki et al. |
| 2010/0066889 A1 | 3/2010 | Ueda et al. |
| 2010/0066890 A1 | 3/2010 | Ueda et al. |
| 2010/0066895 A1 | 3/2010 | Ueda et al. |
| 2010/0085416 A1 | 4/2010 | Hegde et al. |

(56) References Cited

U.S. PATENT DOCUMENTS

| | | |
|---|---|---|
| 2010/0093400 A1 | 4/2010 | Ju et al. |
| 2010/0097322 A1 | 4/2010 | Hu et al. |
| 2010/0097438 A1 | 4/2010 | Ujii |
| 2010/0121636 A1 | 5/2010 | Burke et al. |
| 2010/0123737 A1 | 5/2010 | Williamson et al. |
| 2010/0124941 A1 | 5/2010 | Cho |
| 2010/0153847 A1 | 6/2010 | Fama |
| 2010/0162160 A1 | 6/2010 | Stallings et al. |
| 2010/0162171 A1 | 6/2010 | Felt et al. |
| 2010/0164893 A1 | 7/2010 | Shin et al. |
| 2010/0169435 A1 | 7/2010 | Osullivan et al. |
| 2010/0188426 A1 | 7/2010 | Ohmori et al. |
| 2010/0194931 A1 | 8/2010 | Kawaguchi et al. |
| 2010/0208122 A1 | 8/2010 | Yumiki |
| 2010/0231735 A1 | 9/2010 | Burian et al. |
| 2010/0231777 A1 | 9/2010 | Shintani et al. |
| 2010/0232703 A1 | 9/2010 | Aiso |
| 2010/0232704 A1 | 9/2010 | Thorn |
| 2010/0238327 A1 | 9/2010 | Griffith et al. |
| 2010/0247077 A1 | 9/2010 | Yamamoto et al. |
| 2010/0251119 A1 | 9/2010 | Geppert et al. |
| 2010/0251158 A1 | 9/2010 | Geppert et al. |
| 2010/0259645 A1 | 10/2010 | Kaplan et al. |
| 2010/0277470 A1 | 11/2010 | Margolis |
| 2010/0283743 A1 | 11/2010 | Coddington |
| 2010/0289825 A1 | 11/2010 | Shin et al. |
| 2010/0289910 A1 | 11/2010 | Kamshilin et al. |
| 2010/0302280 A1 | 12/2010 | Szeliski et al. |
| 2010/0317410 A1 | 12/2010 | Song et al. |
| 2010/0318928 A1 | 12/2010 | Neuman et al. |
| 2010/0318939 A1 | 12/2010 | Moon |
| 2011/0008033 A1 | 1/2011 | Ichimiya et al. |
| 2011/0013049 A1 | 1/2011 | Thörn |
| 2011/0018970 A1 | 1/2011 | Wakabayashi |
| 2011/0019058 A1 | 1/2011 | Sakai et al. |
| 2011/0058052 A1 | 3/2011 | Bolton et al. |
| 2011/0072394 A1 | 3/2011 | Victor et al. |
| 2011/0074710 A1 | 3/2011 | Weeldreyer et al. |
| 2011/0074830 A1 | 3/2011 | Rapp et al. |
| 2011/0085016 A1 | 4/2011 | Kristiansen et al. |
| 2011/0085017 A1 | 4/2011 | Robinson et al. |
| 2011/0109581 A1 | 5/2011 | Ozawa et al. |
| 2011/0115875 A1 | 5/2011 | Sadwick et al. |
| 2011/0115932 A1 | 5/2011 | Shin et al. |
| 2011/0126148 A1 | 5/2011 | Krishnaraj et al. |
| 2011/0138332 A1 | 6/2011 | Miyagawa |
| 2011/0157379 A1 | 6/2011 | Kimura |
| 2011/0161836 A1 | 6/2011 | Mu et al. |
| 2011/0176039 A1 | 7/2011 | Lo |
| 2011/0187879 A1 | 8/2011 | Ochiai |
| 2011/0193995 A1 | 8/2011 | Goh et al. |
| 2011/0199495 A1 | 8/2011 | Laberge et al. |
| 2011/0221755 A1 | 9/2011 | Geisner et al. |
| 2011/0234853 A1 | 9/2011 | Hayashi et al. |
| 2011/0242369 A1 | 10/2011 | Misawa et al. |
| 2011/0249073 A1 | 10/2011 | Cranfill et al. |
| 2011/0249078 A1 | 10/2011 | Abuan et al. |
| 2011/0249086 A1 | 10/2011 | Guo et al. |
| 2011/0252146 A1 | 10/2011 | Santamaria et al. |
| 2011/0273526 A1 | 11/2011 | Mehin et al. |
| 2011/0296163 A1 | 12/2011 | Abernethy et al. |
| 2011/0304632 A1 | 12/2011 | Evertt et al. |
| 2012/0002001 A1 | 1/2012 | Prentice |
| 2012/0002898 A1 | 1/2012 | Côté et al. |
| 2012/0011456 A1 | 1/2012 | Noda et al. |
| 2012/0019551 A1 | 1/2012 | Pettigrew et al. |
| 2012/0019610 A1 | 1/2012 | Hornyak et al. |
| 2012/0026378 A1 | 2/2012 | Pang et al. |
| 2012/0033028 A1 | 2/2012 | Murphy et al. |
| 2012/0036480 A1 | 2/2012 | Warner et al. |
| 2012/0054278 A1 | 3/2012 | Taleb et al. |
| 2012/0056830 A1 | 3/2012 | Suzuki et al. |
| 2012/0056997 A1 | 3/2012 | Jang |
| 2012/0057064 A1 | 3/2012 | Gardiner et al. |
| 2012/0062784 A1 | 3/2012 | Van et al. |
| 2012/0069028 A1 | 3/2012 | Bouguerra |
| 2012/0069206 A1 | 3/2012 | Hsieh |
| 2012/0079378 A1 | 3/2012 | Goossens |
| 2012/0092436 A1 | 4/2012 | Pahud et al. |
| 2012/0105579 A1 | 5/2012 | Jeon et al. |
| 2012/0114108 A1 | 5/2012 | Katis et al. |
| 2012/0120277 A1 | 5/2012 | Tsai et al. |
| 2012/0127189 A1 | 5/2012 | Park et al. |
| 2012/0127346 A1 | 5/2012 | Sato et al. |
| 2012/0133797 A1 | 5/2012 | Sato et al. |
| 2012/0162242 A1 | 6/2012 | Amano et al. |
| 2012/0169776 A1 | 7/2012 | Rissa et al. |
| 2012/0173383 A1 | 7/2012 | Badawiyeh et al. |
| 2012/0185355 A1 | 7/2012 | Kilroy |
| 2012/0188394 A1 | 7/2012 | Park et al. |
| 2012/0194559 A1 | 8/2012 | Lim |
| 2012/0206452 A1 | 8/2012 | Geisner et al. |
| 2012/0206495 A1 | 8/2012 | Endo et al. |
| 2012/0206619 A1 | 8/2012 | Nitta et al. |
| 2012/0206621 A1 | 8/2012 | Chen et al. |
| 2012/0235990 A1 | 9/2012 | Yamaji |
| 2012/0243802 A1 | 9/2012 | Fintel et al. |
| 2012/0249853 A1 | 10/2012 | Krolczyk et al. |
| 2012/0274830 A1 | 11/2012 | Kameyama et al. |
| 2012/0293605 A1 | 11/2012 | Seferian et al. |
| 2012/0293611 A1 | 11/2012 | Lee |
| 2012/0296972 A1 | 11/2012 | Backer |
| 2012/0304079 A1 | 11/2012 | Rideout et al. |
| 2012/0309520 A1 | 12/2012 | Evertt et al. |
| 2012/0320141 A1 | 12/2012 | Bowen et al. |
| 2013/0009858 A1 | 1/2013 | Lacey |
| 2013/0010170 A1 | 1/2013 | Matsuzawa et al. |
| 2013/0038546 A1 | 2/2013 | Mineo |
| 2013/0038771 A1 | 2/2013 | Brunner et al. |
| 2013/0055113 A1 | 2/2013 | Chazin et al. |
| 2013/0055119 A1 | 2/2013 | Luong |
| 2013/0057472 A1 | 3/2013 | Dizac et al. |
| 2013/0061155 A1 | 3/2013 | Hon |
| 2013/0076908 A1 | 3/2013 | Bratton et al. |
| 2013/0083222 A1 | 4/2013 | Matsuzawa et al. |
| 2013/0088413 A1 | 4/2013 | Raffle et al. |
| 2013/0088614 A1 | 4/2013 | Lee |
| 2013/0091298 A1 | 4/2013 | Ozzie et al. |
| 2013/0093904 A1 | 4/2013 | Wagner et al. |
| 2013/0101164 A1 | 4/2013 | Leclerc et al. |
| 2013/0109425 A1 | 5/2013 | Kerger et al. |
| 2013/0132865 A1 | 5/2013 | Li |
| 2013/0135315 A1 | 5/2013 | Bares et al. |
| 2013/0141362 A1 | 6/2013 | Asanuma et al. |
| 2013/0141513 A1 | 6/2013 | Setton et al. |
| 2013/0141524 A1 | 6/2013 | Karunamuni et al. |
| 2013/0147933 A1 | 6/2013 | Kulas et al. |
| 2013/0155308 A1 | 6/2013 | Wu et al. |
| 2013/0155474 A1 | 6/2013 | Roach et al. |
| 2013/0159900 A1 | 6/2013 | Pendharkar |
| 2013/0162781 A1 | 6/2013 | Hubner et al. |
| 2013/0165186 A1 | 6/2013 | Choi |
| 2013/0166580 A1 | 6/2013 | Maharajh et al. |
| 2013/0169742 A1 | 7/2013 | Wu et al. |
| 2013/0179831 A1 | 7/2013 | Izaki |
| 2013/0194378 A1 | 8/2013 | Brown |
| 2013/0201104 A1 | 8/2013 | Ptucha et al. |
| 2013/0201203 A1 | 8/2013 | Warner |
| 2013/0201307 A1 | 8/2013 | Schloter et al. |
| 2013/0208136 A1 | 8/2013 | Takatsuka et al. |
| 2013/0210563 A1 | 8/2013 | Hollinger |
| 2013/0216206 A1 | 8/2013 | Dubin et al. |
| 2013/0219276 A1 | 8/2013 | Shan |
| 2013/0222663 A1 | 8/2013 | Rydenhag et al. |
| 2013/0225140 A1 | 8/2013 | Greisson |
| 2013/0239057 A1 | 9/2013 | Ubillos et al. |
| 2013/0246948 A1 | 9/2013 | Chen et al. |
| 2013/0265311 A1 | 10/2013 | Na et al. |
| 2013/0265467 A1 | 10/2013 | Matsuzawa et al. |
| 2013/0278576 A1 | 10/2013 | Lee et al. |
| 2013/0282180 A1 | 10/2013 | Layton |
| 2013/0286251 A1 | 10/2013 | Wood et al. |
| 2013/0290905 A1 | 10/2013 | Luvogt et al. |
| 2013/0328770 A1 | 12/2013 | Parham |

(56) References Cited

U.S. PATENT DOCUMENTS

| | | |
|---|---|---|
| 2013/0329074 A1 | 12/2013 | Zhang et al. |
| 2013/0336545 A1 | 12/2013 | Pritikin et al. |
| 2013/0346916 A1 | 12/2013 | Williamson et al. |
| 2014/0007021 A1 | 1/2014 | Akiyama et al. |
| 2014/0009639 A1 | 1/2014 | Lee |
| 2014/0018053 A1 | 1/2014 | Cho et al. |
| 2014/0022399 A1 | 1/2014 | Rashid et al. |
| 2014/0026074 A1 | 1/2014 | Cortes et al. |
| 2014/0028872 A1 | 1/2014 | Lee et al. |
| 2014/0028885 A1 | 1/2014 | Ma et al. |
| 2014/0033043 A1 | 1/2014 | Kashima |
| 2014/0033100 A1 | 1/2014 | Noda et al. |
| 2014/0037178 A1 | 2/2014 | Park |
| 2014/0043368 A1 | 2/2014 | Yu |
| 2014/0043424 A1 | 2/2014 | Gava et al. |
| 2014/0043517 A1 | 2/2014 | Yim et al. |
| 2014/0047389 A1 | 2/2014 | Aarabi |
| 2014/0049536 A1 | 2/2014 | Neuman et al. |
| 2014/0055554 A1 | 2/2014 | Du et al. |
| 2014/0063175 A1 | 3/2014 | Jafry et al. |
| 2014/0063176 A1 | 3/2014 | Modai et al. |
| 2014/0063313 A1 | 3/2014 | Choi et al. |
| 2014/0071061 A1 | 3/2014 | Lin et al. |
| 2014/0071325 A1 | 3/2014 | Kawahara et al. |
| 2014/0078371 A1 | 3/2014 | Kinoshita |
| 2014/0092272 A1 | 4/2014 | Choi |
| 2014/0095122 A1 | 4/2014 | Appleman et al. |
| 2014/0099994 A1 | 4/2014 | Bishop et al. |
| 2014/0104449 A1 | 4/2014 | Masarik et al. |
| 2014/0105372 A1 | 4/2014 | Nowack et al. |
| 2014/0108084 A1 | 4/2014 | Bargetzi et al. |
| 2014/0108568 A1 | 4/2014 | Lee |
| 2014/0108928 A1 | 4/2014 | Mumick |
| 2014/0118560 A1 | 5/2014 | Bala et al. |
| 2014/0118563 A1 | 5/2014 | Mehta et al. |
| 2014/0123005 A1 | 5/2014 | Forstall et al. |
| 2014/0132735 A1 | 5/2014 | Lee et al. |
| 2014/0143678 A1 | 5/2014 | Mistry et al. |
| 2014/0152886 A1 | 6/2014 | Morgan-Mar et al. |
| 2014/0160231 A1 | 6/2014 | Middleton et al. |
| 2014/0160304 A1 | 6/2014 | Galor et al. |
| 2014/0176469 A1 | 6/2014 | Lim |
| 2014/0176565 A1 | 6/2014 | Adeyoola et al. |
| 2014/0184524 A1 | 7/2014 | Schiefer et al. |
| 2014/0192212 A1 | 7/2014 | He et al. |
| 2014/0192233 A1 | 7/2014 | Kakkori et al. |
| 2014/0201126 A1 | 7/2014 | Zadeh et al. |
| 2014/0204229 A1 | 7/2014 | Leung et al. |
| 2014/0205207 A1 | 7/2014 | Bhatt |
| 2014/0215356 A1 | 7/2014 | Brander et al. |
| 2014/0215404 A1 | 7/2014 | Kong et al. |
| 2014/0218371 A1 | 8/2014 | Du et al. |
| 2014/0218461 A1 | 8/2014 | Deland |
| 2014/0218599 A1 | 8/2014 | Nakamura et al. |
| 2014/0229831 A1 | 8/2014 | Chordia et al. |
| 2014/0229835 A1 | 8/2014 | Ravine |
| 2014/0232838 A1 | 8/2014 | Jorgensen et al. |
| 2014/0240471 A1 | 8/2014 | Srinivasa et al. |
| 2014/0240531 A1 | 8/2014 | Nakai et al. |
| 2014/0240577 A1 | 8/2014 | Masugi |
| 2014/0247368 A1 | 9/2014 | Chinn |
| 2014/0267126 A1 | 9/2014 | Åberg et al. |
| 2014/0267867 A1 | 9/2014 | Lee et al. |
| 2014/0280812 A1 | 9/2014 | Bealkowski et al. |
| 2014/0281983 A1 | 9/2014 | Xian et al. |
| 2014/0282223 A1 | 9/2014 | Bastien et al. |
| 2014/0285698 A1 | 9/2014 | Geiss |
| 2014/0300635 A1 | 10/2014 | Suzuki |
| 2014/0300722 A1 | 10/2014 | Garcia |
| 2014/0300779 A1 | 10/2014 | Yeo et al. |
| 2014/0310598 A1 | 10/2014 | Sprague et al. |
| 2014/0327639 A1 | 11/2014 | Papakipos et al. |
| 2014/0331149 A1 | 11/2014 | Labey |
| 2014/0333671 A1 | 11/2014 | Phang et al. |
| 2014/0333824 A1 | 11/2014 | Xiu |
| 2014/0349754 A1 | 11/2014 | Kaneoka et al. |
| 2014/0351753 A1 | 11/2014 | Shin et al. |
| 2014/0354759 A1 | 12/2014 | Cranfill et al. |
| 2014/0354845 A1 | 12/2014 | Mølgaard et al. |
| 2014/0359438 A1 | 12/2014 | Matsuki |
| 2014/0362091 A1 | 12/2014 | Bouaziz et al. |
| 2014/0362274 A1 | 12/2014 | Christie et al. |
| 2014/0364228 A1 | 12/2014 | Rimon |
| 2014/0368601 A1 | 12/2014 | Decharms |
| 2014/0368719 A1 | 12/2014 | Kaneko et al. |
| 2014/0372856 A1 | 12/2014 | Radakovitz et al. |
| 2014/0373081 A1 | 12/2014 | Dodson et al. |
| 2014/0375747 A1 | 12/2014 | Martinez et al. |
| 2015/0022649 A1 | 1/2015 | Koppal |
| 2015/0022674 A1 | 1/2015 | Koss et al. |
| 2015/0033149 A1 | 1/2015 | Kuchoor |
| 2015/0033192 A1 | 1/2015 | Bohannon et al. |
| 2015/0035825 A1 | 2/2015 | Zhou et al. |
| 2015/0042852 A1 | 2/2015 | Lee et al. |
| 2015/0043806 A1 | 2/2015 | Sunkavalli et al. |
| 2015/0049233 A1 | 2/2015 | Choi |
| 2015/0058413 A1 | 2/2015 | Ge |
| 2015/0058754 A1 | 2/2015 | Rauh |
| 2015/0067513 A1 | 3/2015 | Zambetti et al. |
| 2015/0067541 A1 | 3/2015 | Owens et al. |
| 2015/0070362 A1 | 3/2015 | Hirai |
| 2015/0078621 A1 | 3/2015 | Choi et al. |
| 2015/0078680 A1 | 3/2015 | Shakib et al. |
| 2015/0078726 A1 | 3/2015 | Shakib et al. |
| 2015/0085174 A1 | 3/2015 | Shabtay et al. |
| 2015/0092077 A1 | 4/2015 | Feder et al. |
| 2015/0095804 A1 | 4/2015 | Grossman et al. |
| 2015/0106720 A1 | 4/2015 | Backer |
| 2015/0109417 A1 | 4/2015 | Zirnheld |
| 2015/0116353 A1* | 4/2015 | Miura .................. G06F 3/04845 345/632 |
| 2015/0116448 A1 | 4/2015 | Gottlieb |
| 2015/0116542 A1 | 4/2015 | Lee |
| 2015/0135109 A1 | 5/2015 | Zambetti et al. |
| 2015/0135234 A1 | 5/2015 | Hall |
| 2015/0138079 A1 | 5/2015 | Lannsjö |
| 2015/0145950 A1 | 5/2015 | Murphy et al. |
| 2015/0146079 A1 | 5/2015 | Kim |
| 2015/0149927 A1 | 5/2015 | Walkin et al. |
| 2015/0150141 A1 | 5/2015 | Szymanski et al. |
| 2015/0154448 A1 | 6/2015 | Murayama et al. |
| 2015/0172534 A1 | 6/2015 | Miyakawa et al. |
| 2015/0177914 A1 | 6/2015 | Coyner et al. |
| 2015/0181135 A1 | 6/2015 | Shimosato |
| 2015/0189138 A1 | 7/2015 | Xie et al. |
| 2015/0189162 A1 | 7/2015 | Kuo et al. |
| 2015/0193196 A1 | 7/2015 | Lin et al. |
| 2015/0194186 A1 | 7/2015 | Lee et al. |
| 2015/0208001 A1 | 7/2015 | Nonaka et al. |
| 2015/0212723 A1 | 7/2015 | Lim et al. |
| 2015/0213001 A1 | 7/2015 | Levy et al. |
| 2015/0213604 A1 | 7/2015 | Li et al. |
| 2015/0220249 A1 | 8/2015 | Snibbe et al. |
| 2015/0248198 A1 | 9/2015 | Somlai-Fisher et al. |
| 2015/0248583 A1 | 9/2015 | Sekine et al. |
| 2015/0249775 A1 | 9/2015 | Jacumet |
| 2015/0249785 A1 | 9/2015 | Mehta et al. |
| 2015/0254855 A1 | 9/2015 | Patankar et al. |
| 2015/0256749 A1 | 9/2015 | Frey et al. |
| 2015/0256796 A1 | 9/2015 | Ma |
| 2015/0264202 A1 | 9/2015 | Pawlowski |
| 2015/0264304 A1 | 9/2015 | Chastney et al. |
| 2015/0271389 A1 | 9/2015 | Huang et al. |
| 2015/0277686 A1 | 10/2015 | Laforge et al. |
| 2015/0286724 A1 | 10/2015 | Knaapen et al. |
| 2015/0288868 A1 | 10/2015 | Slavin et al. |
| 2015/0289104 A1 | 10/2015 | Jung et al. |
| 2015/0296077 A1 | 10/2015 | Wakeyama et al. |
| 2015/0297185 A1 | 10/2015 | Mccormack et al. |
| 2015/0301338 A1 | 10/2015 | Van Heugten |
| 2015/0301731 A1 | 10/2015 | Okamoto et al. |
| 2015/0304366 A1 | 10/2015 | Bader-Natal et al. |
| 2015/0304413 A1 | 10/2015 | Park |
| 2015/0310583 A1 | 10/2015 | Hume et al. |

(56) References Cited

U.S. PATENT DOCUMENTS

| | | |
|---|---|---|
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0319006 A1 | 11/2015 | Plummer et al. |
| 2015/0319144 A1 | 11/2015 | Barton et al. |
| 2015/0334075 A1 | 11/2015 | Wang et al. |
| 2015/0334140 A1 | 11/2015 | Singh et al. |
| 2015/0334291 A1 | 11/2015 | Cho et al. |
| 2015/0341536 A1 | 11/2015 | Huang et al. |
| 2015/0347824 A1 | 12/2015 | Saari et al. |
| 2015/0350141 A1 | 12/2015 | Yang et al. |
| 2015/0350143 A1 | 12/2015 | Lemay et al. |
| 2015/0350533 A1 | 12/2015 | Harris et al. |
| 2015/0350535 A1 | 12/2015 | Voss |
| 2015/0358484 A1 | 12/2015 | Permude |
| 2015/0358584 A1 | 12/2015 | Mattson |
| 2015/0362998 A1 | 12/2015 | Park et al. |
| 2015/0365587 A1 | 12/2015 | Ha et al. |
| 2015/0370426 A1 | 12/2015 | Carrigan et al. |
| 2015/0370458 A1 | 12/2015 | Chen |
| 2015/0373065 A1 | 12/2015 | Holmquist et al. |
| 2016/0012567 A1 | 1/2016 | Siddiqui et al. |
| 2016/0014059 A1 | 1/2016 | Rathod |
| 2016/0014477 A1 | 1/2016 | Siders |
| 2016/0026371 A1 | 1/2016 | Lu et al. |
| 2016/0029004 A1* | 1/2016 | Campbell ............ H04N 13/122 348/47 |
| 2016/0044236 A1 | 2/2016 | Matsuzawa et al. |
| 2016/0048598 A1 | 2/2016 | Fujioka et al. |
| 2016/0048599 A1 | 2/2016 | Fujioka et al. |
| 2016/0048725 A1 | 2/2016 | Holz et al. |
| 2016/0048903 A1 | 2/2016 | Fujioka et al. |
| 2016/0050169 A1 | 2/2016 | Ben Atar et al. |
| 2016/0050351 A1 | 2/2016 | Lee et al. |
| 2016/0050446 A1 | 2/2016 | Fujioka et al. |
| 2016/0057173 A1 | 2/2016 | Singman et al. |
| 2016/0065832 A1* | 3/2016 | Kim ................... H04N 5/23212 348/207.11 |
| 2016/0065861 A1 | 3/2016 | Steinberg et al. |
| 2016/0065930 A1 | 3/2016 | Chandra et al. |
| 2016/0072861 A1 | 3/2016 | Woolsey et al. |
| 2016/0073185 A1 | 3/2016 | Kannappan et al. |
| 2016/0077725 A1 | 3/2016 | Maeda |
| 2016/0080639 A1 | 3/2016 | Choi et al. |
| 2016/0080657 A1 | 3/2016 | Chuang et al. |
| 2016/0088280 A1 | 3/2016 | Sadi et al. |
| 2016/0092035 A1 | 3/2016 | Crocker et al. |
| 2016/0098094 A1 | 4/2016 | Minkkinen |
| 2016/0099901 A1 | 4/2016 | Allen et al. |
| 2016/0099987 A1 | 4/2016 | Shamma |
| 2016/0117829 A1 | 4/2016 | Yoon et al. |
| 2016/0127636 A1 | 5/2016 | Ito et al. |
| 2016/0127638 A1 | 5/2016 | Guo et al. |
| 2016/0132200 A1 | 5/2016 | Walkin et al. |
| 2016/0132201 A1 | 5/2016 | Shaw et al. |
| 2016/0139785 A1 | 5/2016 | Griffin et al. |
| 2016/0142450 A1 | 5/2016 | Paul et al. |
| 2016/0142649 A1 | 5/2016 | Yim |
| 2016/0148384 A1 | 5/2016 | Bud et al. |
| 2016/0162039 A1 | 6/2016 | Eilat et al. |
| 2016/0163084 A1 | 6/2016 | Corazza et al. |
| 2016/0173869 A1 | 6/2016 | Srikanth et al. |
| 2016/0180259 A1 | 6/2016 | Marianko et al. |
| 2016/0188181 A1 | 6/2016 | Smith |
| 2016/0210602 A1 | 7/2016 | Siddique et al. |
| 2016/0212319 A1 | 7/2016 | Harris et al. |
| 2016/0212374 A1 | 7/2016 | Usbergo et al. |
| 2016/0217601 A1 | 7/2016 | Tsuda et al. |
| 2016/0219217 A1 | 7/2016 | Williams et al. |
| 2016/0225175 A1 | 8/2016 | Kim et al. |
| 2016/0226926 A1 | 8/2016 | Singh et al. |
| 2016/0227016 A1 | 8/2016 | Kim et al. |
| 2016/0227095 A1 | 8/2016 | Yoshizawa et al. |
| 2016/0227121 A1 | 8/2016 | Matsushita |
| 2016/0231902 A1 | 8/2016 | Sirpal et al. |
| 2016/0241777 A1 | 8/2016 | Rav-Acha et al. |
| 2016/0241793 A1 | 8/2016 | Shanmugavadivelu et al. |
| 2016/0247288 A1 | 8/2016 | Omori et al. |
| 2016/0247309 A1 | 8/2016 | Li et al. |
| 2016/0255268 A1 | 9/2016 | Kang et al. |
| 2016/0259413 A1 | 9/2016 | Anzures et al. |
| 2016/0259497 A1 | 9/2016 | Bauer et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0277708 A1 | 9/2016 | Rintel et al. |
| 2016/0277903 A1 | 9/2016 | Poosala et al. |
| 2016/0283097 A1 | 9/2016 | Voss et al. |
| 2016/0284123 A1 | 9/2016 | Hare et al. |
| 2016/0306422 A1 | 10/2016 | Parham et al. |
| 2016/0306504 A1 | 10/2016 | Brunsch et al. |
| 2016/0307324 A1 | 10/2016 | Higuchi et al. |
| 2016/0308920 A1 | 10/2016 | Brunsch et al. |
| 2016/0316038 A1 | 10/2016 | Jolfaei |
| 2016/0316147 A1 | 10/2016 | Bernstein et al. |
| 2016/0320849 A1 | 11/2016 | Koo |
| 2016/0335041 A1 | 11/2016 | Wachter et al. |
| 2016/0337570 A1 | 11/2016 | Tan et al. |
| 2016/0337582 A1 | 11/2016 | Shimauchi et al. |
| 2016/0352661 A1 | 12/2016 | Yang et al. |
| 2016/0353030 A1 | 12/2016 | Tang et al. |
| 2016/0357353 A1 | 12/2016 | Miura et al. |
| 2016/0357387 A1 | 12/2016 | Bovet et al. |
| 2016/0360097 A1 | 12/2016 | Penha et al. |
| 2016/0360116 A1 | 12/2016 | Penha et al. |
| 2016/0364106 A1 | 12/2016 | Koum et al. |
| 2016/0366323 A1 | 12/2016 | Chen et al. |
| 2016/0366344 A1 | 12/2016 | Pan et al. |
| 2016/0370974 A1 | 12/2016 | Stenneth |
| 2016/0373631 A1 | 12/2016 | Titi et al. |
| 2016/0373650 A1 | 12/2016 | Kim et al. |
| 2016/0380780 A1 | 12/2016 | Stephenson et al. |
| 2017/0006162 A1 | 1/2017 | Bargetzi et al. |
| 2017/0006210 A1 | 1/2017 | Dye et al. |
| 2017/0011773 A1 | 1/2017 | Lee |
| 2017/0013179 A1 | 1/2017 | Kang et al. |
| 2017/0018289 A1 | 1/2017 | Morgenstern |
| 2017/0019604 A1 | 1/2017 | Kim et al. |
| 2017/0024100 A1 | 1/2017 | Pieper et al. |
| 2017/0024872 A1 | 1/2017 | Olsson et al. |
| 2017/0026565 A1 | 1/2017 | Hong et al. |
| 2017/0031557 A1 | 2/2017 | Xiangli et al. |
| 2017/0034449 A1 | 2/2017 | Eum et al. |
| 2017/0034583 A1 | 2/2017 | Long et al. |
| 2017/0039686 A1 | 2/2017 | Miura et al. |
| 2017/0041549 A1 | 2/2017 | Kim et al. |
| 2017/0041677 A1 | 2/2017 | Anderson et al. |
| 2017/0046065 A1 | 2/2017 | Zeng et al. |
| 2017/0048450 A1 | 2/2017 | Lee et al. |
| 2017/0048461 A1 | 2/2017 | Lee et al. |
| 2017/0048494 A1 | 2/2017 | Boyle et al. |
| 2017/0048817 A1 | 2/2017 | Yang et al. |
| 2017/0054960 A1 | 2/2017 | Chien et al. |
| 2017/0061635 A1 | 3/2017 | Petrovich et al. |
| 2017/0064184 A1* | 3/2017 | Tsai ..................... G02B 7/36 |
| 2017/0064200 A1 | 3/2017 | Castillo et al. |
| 2017/0064205 A1 | 3/2017 | Choi et al. |
| 2017/0083189 A1 | 3/2017 | Yang et al. |
| 2017/0092329 A1 | 3/2017 | Kim et al. |
| 2017/0094019 A1 | 3/2017 | Ahmed et al. |
| 2017/0094161 A1 | 3/2017 | Graham et al. |
| 2017/0097621 A1 | 4/2017 | Ackmann et al. |
| 2017/0109912 A1 | 4/2017 | Lee et al. |
| 2017/0111567 A1 | 4/2017 | Pila |
| 2017/0111587 A1 | 4/2017 | Herbst et al. |
| 2017/0111595 A1 | 4/2017 | Soni et al. |
| 2017/0111616 A1 | 4/2017 | Li et al. |
| 2017/0124664 A1 | 5/2017 | Savenok et al. |
| 2017/0126592 A1 | 5/2017 | El Ghoul |
| 2017/0139572 A1 | 5/2017 | Sunkavalli et al. |

(56) References Cited

U.S. PATENT DOCUMENTS

| | | |
|---|---|---|
| 2017/0150904 A1 | 6/2017 | Park et al. |
| 2017/0178287 A1 | 6/2017 | Anderson |
| 2017/0180811 A1 | 6/2017 | Quirino et al. |
| 2017/0186162 A1 | 6/2017 | Mihic et al. |
| 2017/0206779 A1 | 7/2017 | Lee et al. |
| 2017/0220212 A1 | 8/2017 | Yang et al. |
| 2017/0230576 A1 | 8/2017 | Sparks et al. |
| 2017/0230585 A1 | 8/2017 | Nash et al. |
| 2017/0237888 A1 | 8/2017 | Harris et al. |
| 2017/0243389 A1 | 8/2017 | Wild et al. |
| 2017/0244896 A1 | 8/2017 | Chien et al. |
| 2017/0244897 A1 | 8/2017 | Jung et al. |
| 2017/0257559 A1 | 9/2017 | Stricker |
| 2017/0257596 A1 | 9/2017 | Murata et al. |
| 2017/0264817 A1 | 9/2017 | Yan et al. |
| 2017/0272654 A1 | 9/2017 | Poindexter, Jr. |
| 2017/0280494 A1 | 9/2017 | Jung et al. |
| 2017/0285764 A1 | 10/2017 | Kim et al. |
| 2017/0285916 A1 | 10/2017 | Xu et al. |
| 2017/0287220 A1 | 10/2017 | Khalid et al. |
| 2017/0302840 A1 | 10/2017 | Hasinoff et al. |
| 2017/0309174 A1 | 10/2017 | Gonzales et al. |
| 2017/0315772 A1 | 11/2017 | Lee et al. |
| 2017/0324784 A1 | 11/2017 | Taine et al. |
| 2017/0336926 A1 | 11/2017 | Chaudhri et al. |
| 2017/0336928 A1 | 11/2017 | Chaudhri et al. |
| 2017/0336960 A1 | 11/2017 | Chaudhri et al. |
| 2017/0336961 A1 | 11/2017 | Heo et al. |
| 2017/0344253 A1 | 11/2017 | Zhang |
| 2017/0352379 A1 | 12/2017 | Oh et al. |
| 2017/0354888 A1 | 12/2017 | Benedetto et al. |
| 2017/0357382 A1 | 12/2017 | Miura et al. |
| 2017/0357425 A1 | 12/2017 | Smith et al. |
| 2017/0357434 A1 | 12/2017 | Coffman et al. |
| 2017/0357917 A1 | 12/2017 | Holmes et al. |
| 2017/0358071 A1 | 12/2017 | Yamaoka et al. |
| 2017/0359191 A1 | 12/2017 | Smith et al. |
| 2017/0359285 A1 | 12/2017 | Weinig et al. |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2017/0366729 A1 | 12/2017 | Itoh |
| 2017/0373868 A1 | 12/2017 | Deets, Jr. |
| 2018/0007315 A1 | 1/2018 | Kim et al. |
| 2018/0013949 A1 | 1/2018 | Han |
| 2018/0021684 A1 | 1/2018 | Benedetto |
| 2018/0034867 A1 | 2/2018 | Zahn et al. |
| 2018/0035031 A1 | 2/2018 | Kwak et al. |
| 2018/0047200 A1 | 2/2018 | O'Hara et al. |
| 2018/0048820 A1* | 2/2018 | Hinkel ................ G02B 27/646 |
| 2018/0052571 A1 | 2/2018 | Seol et al. |
| 2018/0061158 A1 | 3/2018 | Greene |
| 2018/0070144 A1 | 3/2018 | Tang et al. |
| 2018/0077332 A1 | 3/2018 | Shimura et al. |
| 2018/0081522 A1 | 3/2018 | Greenberg et al. |
| 2018/0088787 A1 | 3/2018 | Bereza et al. |
| 2018/0091728 A1 | 3/2018 | Brown et al. |
| 2018/0091732 A1 | 3/2018 | Wilson et al. |
| 2018/0095616 A1 | 4/2018 | Valdivia et al. |
| 2018/0095649 A1 | 4/2018 | Valdivia et al. |
| 2018/0096487 A1 | 4/2018 | Nash et al. |
| 2018/0101297 A1 | 4/2018 | Yang et al. |
| 2018/0103074 A1 | 4/2018 | Rosenberg |
| 2018/0107367 A1 | 4/2018 | Rinneberg et al. |
| 2018/0109722 A1 | 4/2018 | Laroia et al. |
| 2018/0113577 A1 | 4/2018 | Burns et al. |
| 2018/0114543 A1 | 4/2018 | Novikoff |
| 2018/0120661 A1 | 5/2018 | Kilgore et al. |
| 2018/0123986 A1 | 5/2018 | Faulkner et al. |
| 2018/0124128 A1 | 5/2018 | Faulkner et al. |
| 2018/0124299 A1 | 5/2018 | Brook |
| 2018/0124359 A1 | 5/2018 | Faulkner |
| 2018/0129224 A1 | 5/2018 | Hur |
| 2018/0131732 A1 | 5/2018 | Aronoff et al. |
| 2018/0131876 A1 | 5/2018 | Bernstein et al. |
| 2018/0131878 A1 | 5/2018 | Charlton et al. |
| 2018/0139374 A1 | 5/2018 | Yu |
| 2018/0146132 A1 | 5/2018 | Manzari et al. |
| 2018/0152611 A1 | 5/2018 | Li et al. |
| 2018/0157455 A1 | 6/2018 | Troy et al. |
| 2018/0184008 A1 | 6/2018 | Kondo |
| 2018/0184061 A1 | 6/2018 | Kitsunai et al. |
| 2018/0191944 A1 | 7/2018 | Carbonell et al. |
| 2018/0191965 A1 | 7/2018 | Faulkner et al. |
| 2018/0198985 A1 | 7/2018 | Ishitsuka |
| 2018/0199025 A1 | 7/2018 | Holzer et al. |
| 2018/0199164 A1 | 7/2018 | Bargetzi et al. |
| 2018/0203577 A1 | 7/2018 | Astavans et al. |
| 2018/0204111 A1 | 7/2018 | Zadeh et al. |
| 2018/0205797 A1 | 7/2018 | Faulkner |
| 2018/0213144 A1 | 7/2018 | Kim et al. |
| 2018/0213161 A1 | 7/2018 | Kanda et al. |
| 2018/0227341 A1 | 8/2018 | Rizzi |
| 2018/0227479 A1 | 8/2018 | Parameswaran et al. |
| 2018/0227482 A1 | 8/2018 | Holzer et al. |
| 2018/0227505 A1 | 8/2018 | Baltz et al. |
| 2018/0228003 A1 | 8/2018 | O'Driscoll et al. |
| 2018/0234608 A1 | 8/2018 | Sudo et al. |
| 2018/0249047 A1 | 8/2018 | Marlatt |
| 2018/0253194 A1 | 9/2018 | Javadi |
| 2018/0262677 A1 | 9/2018 | Dye et al. |
| 2018/0267703 A1 | 9/2018 | Kamimaru et al. |
| 2018/0270420 A1 | 9/2018 | Lee et al. |
| 2018/0278823 A1 | 9/2018 | Horesh |
| 2018/0284979 A1 | 10/2018 | Choi et al. |
| 2018/0288310 A1 | 10/2018 | Goldenberg |
| 2018/0293959 A1 | 10/2018 | Monga et al. |
| 2018/0295079 A1 | 10/2018 | Longo |
| 2018/0302551 A1 | 10/2018 | Yamajo et al. |
| 2018/0302568 A1 | 10/2018 | Kim et al. |
| 2018/0308282 A1 | 10/2018 | Yokoi |
| 2018/0308480 A1 | 10/2018 | Jang et al. |
| 2018/0309801 A1 | 10/2018 | Rathod |
| 2018/0332559 A1 | 11/2018 | Gudivada et al. |
| 2018/0335901 A1 | 11/2018 | Manzari et al. |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |
| 2018/0341448 A1 | 11/2018 | Behzadi et al. |
| 2018/0343383 A1 | 11/2018 | Ito et al. |
| 2018/0348764 A1 | 12/2018 | Zhang et al. |
| 2018/0349008 A1 | 12/2018 | Manzari et al. |
| 2018/0349659 A1 | 12/2018 | Manzari et al. |
| 2018/0352165 A1 | 12/2018 | Zhen et al. |
| 2018/0364665 A1 | 12/2018 | Clymer et al. |
| 2018/0367483 A1 | 12/2018 | Rodriguez et al. |
| 2018/0367484 A1 | 12/2018 | Rodriguez et al. |
| 2018/0375676 A1 | 12/2018 | Bader-natal et al. |
| 2018/0376122 A1 | 12/2018 | Park et al. |
| 2019/0007589 A1 | 1/2019 | Kadambala et al. |
| 2019/0025943 A1 | 1/2019 | Jobs et al. |
| 2019/0028419 A1 | 1/2019 | Sullivan |
| 2019/0028650 A1 | 1/2019 | Bernstein et al. |
| 2019/0029513 A1 | 1/2019 | Gunnerson et al. |
| 2019/0034849 A1 | 1/2019 | Romaine et al. |
| 2019/0051032 A1 | 2/2019 | Chu et al. |
| 2019/0058827 A1 | 2/2019 | Park et al. |
| 2019/0068670 A1 | 2/2019 | Adam et al. |
| 2019/0080189 A1 | 3/2019 | Van Os et al. |
| 2019/0082097 A1 | 3/2019 | Manzari et al. |
| 2019/0089873 A1 | 3/2019 | Misawa et al. |
| 2019/0102049 A1 | 4/2019 | Anzures et al. |
| 2019/0102145 A1 | 4/2019 | Wilberding et al. |
| 2019/0108684 A1 | 4/2019 | Callaghan |
| 2019/0114740 A1 | 4/2019 | Ogino et al. |
| 2019/0121216 A1 | 4/2019 | Shabtay et al. |
| 2019/0124021 A1 | 4/2019 | Demattei |
| 2019/0138259 A1 | 5/2019 | Bagaria et al. |
| 2019/0138951 A1 | 5/2019 | Brownhill et al. |
| 2019/0141030 A1 | 5/2019 | Cockerill et al. |
| 2019/0149706 A1 | 5/2019 | Rivard et al. |
| 2019/0173939 A1 | 6/2019 | Lewis et al. |
| 2019/0174054 A1 | 6/2019 | Srivastava et al. |

(56) References Cited

U.S. PATENT DOCUMENTS

| | | |
|---|---|---|
| 2019/0199926 A1 | 6/2019 | An et al. |
| 2019/0199963 A1 | 6/2019 | Ahn et al. |
| 2019/0199993 A1 | 6/2019 | Babu et al. |
| 2019/0205861 A1 | 7/2019 | Bace |
| 2019/0206031 A1 | 7/2019 | Kim et al. |
| 2019/0222769 A1 | 7/2019 | Srivastava et al. |
| 2019/0222775 A1 | 7/2019 | Ahn |
| 2019/0228495 A1 | 7/2019 | Tremblay et al. |
| 2019/0235743 A1 | 8/2019 | Ono |
| 2019/0236142 A1 | 8/2019 | Balakrishnan et al. |
| 2019/0250812 A1 | 8/2019 | Davydov et al. |
| 2019/0253619 A1 | 8/2019 | Davydov et al. |
| 2019/0289201 A1 | 9/2019 | Nishimura et al. |
| 2019/0289271 A1 | 9/2019 | Paulus et al. |
| 2019/0297039 A1 | 9/2019 | Rodriguez et al. |
| 2019/0303861 A1 | 10/2019 | Mathias et al. |
| 2019/0318538 A1 | 10/2019 | Li et al. |
| 2019/0339825 A1 | 11/2019 | Anzures et al. |
| 2019/0342507 A1 | 11/2019 | Dye et al. |
| 2019/0342519 A1 | 11/2019 | Van Os et al. |
| 2019/0347181 A1 | 11/2019 | Cranfill et al. |
| 2019/0361575 A1 | 11/2019 | Ni et al. |
| 2019/0361694 A1 | 11/2019 | Gordon et al. |
| 2019/0362555 A1 | 11/2019 | Chen et al. |
| 2019/0370805 A1 | 12/2019 | Van Os et al. |
| 2019/0379821 A1 | 12/2019 | Kobayashi et al. |
| 2019/0379837 A1 | 12/2019 | Kim et al. |
| 2020/0045245 A1 | 2/2020 | Van Os et al. |
| 2020/0050502 A1 | 2/2020 | Ghafourifar et al. |
| 2020/0053288 A1 | 2/2020 | Kim et al. |
| 2020/0055515 A1 | 2/2020 | Herman et al. |
| 2020/0059605 A1 | 2/2020 | Liu et al. |
| 2020/0068121 A1 | 2/2020 | Wang |
| 2020/0082599 A1 | 3/2020 | Manzari |
| 2020/0104038 A1 | 4/2020 | Kamath et al. |
| 2020/0105003 A1 | 4/2020 | Stauber et al. |
| 2020/0106952 A1 | 4/2020 | Missig et al. |
| 2020/0106965 A1 | 4/2020 | Malia et al. |
| 2020/0128191 A1 | 4/2020 | Sun et al. |
| 2020/0135191 A1 | 4/2020 | Nourbakhsh |
| 2020/0142577 A1 | 5/2020 | Manzari et al. |
| 2020/0143593 A1 | 5/2020 | Rudman et al. |
| 2020/0152186 A1 | 5/2020 | Koh et al. |
| 2020/0183548 A1 | 6/2020 | Anzures et al. |
| 2020/0186378 A1 | 6/2020 | Six et al. |
| 2020/0195887 A1 | 6/2020 | Van Os et al. |
| 2020/0204725 A1 | 6/2020 | Li |
| 2020/0213530 A1 | 7/2020 | Ahn |
| 2020/0221020 A1 | 7/2020 | Manzari et al. |
| 2020/0234508 A1 | 7/2020 | Shaburov et al. |
| 2020/0236278 A1 | 7/2020 | Yeung et al. |
| 2020/0242788 A1* | 7/2020 | Jacobs .................... G06T 7/50 |
| 2020/0244879 A1 | 7/2020 | Hohjoh |
| 2020/0274726 A1 | 8/2020 | Setteboun et al. |
| 2020/0279279 A1 | 9/2020 | Chaudhuri |
| 2020/0285806 A1 | 9/2020 | Radakovitz et al. |
| 2020/0285851 A1 | 9/2020 | Lin et al. |
| 2020/0296329 A1 | 9/2020 | Tang et al. |
| 2020/0302913 A1 | 9/2020 | Marcinkiewicz |
| 2020/0335133 A1 | 10/2020 | Vaucher |
| 2020/0336660 A1 | 10/2020 | Dong et al. |
| 2020/0336674 A1 | 10/2020 | Bernstein et al. |
| 2020/0358963 A1 | 11/2020 | Manzari et al. |
| 2020/0380768 A1 | 12/2020 | Harris et al. |
| 2020/0380781 A1 | 12/2020 | Barlier et al. |
| 2020/0383157 A1 | 12/2020 | Lee et al. |
| 2020/0385116 A1 | 12/2020 | Sabripour et al. |
| 2020/0395012 A1 | 12/2020 | Kim et al. |
| 2020/0400957 A1 | 12/2020 | Van Heugten |
| 2020/0410763 A1 | 12/2020 | Hare et al. |
| 2020/0412975 A1 | 12/2020 | Al Majid et al. |
| 2021/0005003 A1 | 1/2021 | Chong et al. |
| 2021/0043189 A1 | 2/2021 | Pyun |
| 2021/0058351 A1 | 2/2021 | Viklund et al. |
| 2021/0064317 A1 | 3/2021 | Juenger et al. |
| 2021/0065134 A1 | 3/2021 | Chhabra et al. |
| 2021/0065448 A1 | 3/2021 | Goodrich et al. |
| 2021/0065454 A1 | 3/2021 | Goodrich et al. |
| 2021/0096703 A1 | 4/2021 | Anzures et al. |
| 2021/0097695 A1 | 4/2021 | Lundberg et al. |
| 2021/0097768 A1 | 4/2021 | Malia et al. |
| 2021/0099568 A1 | 4/2021 | Depue et al. |
| 2021/0099761 A1 | 4/2021 | Zhang |
| 2021/0099829 A1 | 4/2021 | Soto et al. |
| 2021/0136129 A1 | 5/2021 | Ponnusamy et al. |
| 2021/0144336 A1 | 5/2021 | Van Os et al. |
| 2021/0146838 A1 | 5/2021 | Goseberg et al. |
| 2021/0152503 A1 | 5/2021 | Rodriguez et al. |
| 2021/0152505 A1 | 5/2021 | Baldwin et al. |
| 2021/0158622 A1 | 5/2021 | Leelaphattarakij et al. |
| 2021/0158830 A1 | 5/2021 | Boehlke |
| 2021/0168108 A1 | 6/2021 | Antmen et al. |
| 2021/0176204 A1 | 6/2021 | Geppert et al. |
| 2021/0182169 A1 | 6/2021 | Mardente et al. |
| 2021/0195084 A1 | 6/2021 | Olajos et al. |
| 2021/0195093 A1 | 6/2021 | Manzari et al. |
| 2021/0201953 A1 | 7/2021 | Takahashi et al. |
| 2021/0217106 A1 | 7/2021 | Hauser et al. |
| 2021/0264656 A1 | 8/2021 | Barlier et al. |
| 2021/0265032 A1 | 8/2021 | Burgess et al. |
| 2021/0266274 A1 | 8/2021 | Liu et al. |
| 2021/0287343 A1 | 9/2021 | Kaida |
| 2021/0306288 A1 | 9/2021 | Boyd et al. |
| 2021/0318798 A1 | 10/2021 | Manzari et al. |
| 2021/0323406 A1 | 10/2021 | So et al. |
| 2021/0333864 A1 | 10/2021 | Harvey et al. |
| 2021/0349680 A1 | 11/2021 | Kim et al. |
| 2021/0352172 A1 | 11/2021 | Kim et al. |
| 2021/0360199 A1 | 11/2021 | Oz et al. |
| 2021/0373750 A1 | 12/2021 | Manzari et al. |
| 2021/0375042 A1 | 12/2021 | Chen et al. |
| 2021/0397338 A1 | 12/2021 | Davydov et al. |
| 2021/0409359 A1 | 12/2021 | Eirinberg et al. |
| 2022/0004356 A1 | 1/2022 | Kim et al. |
| 2022/0044459 A1 | 2/2022 | Zacharia et al. |
| 2022/0046186 A1 | 2/2022 | Fayad et al. |
| 2022/0046222 A1 | 2/2022 | Meier |
| 2022/0050578 A1 | 2/2022 | Waldman et al. |
| 2022/0053142 A1 | 2/2022 | Manzari et al. |
| 2022/0070380 A1 | 3/2022 | Bernstein et al. |
| 2022/0070385 A1 | 3/2022 | Van Os et al. |
| 2022/0103758 A1 | 3/2022 | Manzari et al. |
| 2022/0122089 A1 | 4/2022 | Bonilla Kuhlmann et al. |
| 2022/0124241 A1 | 4/2022 | Manzari et al. |
| 2022/0244836 A1 | 8/2022 | O'leary et al. |
| 2022/0247918 A1 | 8/2022 | O'leary et al. |
| 2022/0247919 A1 | 8/2022 | O'leary et al. |
| 2022/0262022 A1 | 8/2022 | Stauber et al. |
| 2022/0264028 A1 | 8/2022 | Manzari et al. |
| 2022/0276041 A1 | 9/2022 | Dryer et al. |
| 2022/0278992 A1 | 9/2022 | Baker et al. |
| 2022/0286314 A1 | 9/2022 | Meyer et al. |
| 2022/0294992 A1 | 9/2022 | Manzari et al. |
| 2022/0319100 A1 | 10/2022 | Manzari et al. |
| 2022/0345785 A1 | 10/2022 | Yang et al. |
| 2022/0353425 A1 | 11/2022 | Manzari et al. |
| 2022/0365643 A1 | 11/2022 | Triverio et al. |
| 2022/0365739 A1 | 11/2022 | Chang et al. |
| 2022/0365740 A1 | 11/2022 | Chang et al. |
| 2022/0368548 A1 | 11/2022 | Chang et al. |
| 2022/0368659 A1 | 11/2022 | Chang et al. |
| 2022/0368742 A1 | 11/2022 | Chang et al. |
| 2022/0374136 A1 | 11/2022 | Chang et al. |
| 2022/0382417 A1 | 12/2022 | Zhang |
| 2022/0382440 A1 | 12/2022 | Manzari et al. |
| 2022/0382443 A1 | 12/2022 | Clarke et al. |
| 2022/0417440 A1 | 12/2022 | Bernstein et al. |
| 2023/0004264 A1 | 1/2023 | Anzures et al. |
| 2023/0020616 A1 | 1/2023 | Manzari et al. |
| 2023/0041125 A1 | 2/2023 | Kim et al. |
| 2023/0094453 A1 | 3/2023 | O'Leary et al. |
| 2023/0098395 A1 | 3/2023 | O'Leary et al. |
| 2023/0109787 A1 | 4/2023 | O'Leary et al. |
| 2023/0143275 A1 | 5/2023 | Opara et al. |

(56) References Cited

U.S. PATENT DOCUMENTS

| | | |
|---|---|---|
| 2023/0188674 A1 | 6/2023 | Van Os et al. |
| 2023/0209179 A1 | 6/2023 | Manzari et al. |
| 2023/0229297 A1 | 7/2023 | Manzari et al. |
| 2023/0252659 A1 | 8/2023 | Stauber et al. |
| 2023/0254573 A1 | 8/2023 | Manzari et al. |
| 2023/0262317 A1 | 8/2023 | O'Leary et al. |
| 2023/0283884 A1 | 9/2023 | Van Os et al. |

FOREIGN PATENT DOCUMENTS

| | | |
|---|---|---|
| AU | 2017100683 B4 | 1/2018 |
| AU | 2015297035 B2 | 6/2018 |
| CA | 2729392 A1 | 8/2011 |
| CA | 2845537 A1 | 9/2014 |
| CA | 2965700 A1 | 5/2016 |
| CA | 2729392 C | 5/2017 |
| CN | 1437365 A | 8/2003 |
| CN | 1499878 A | 5/2004 |
| CN | 1689327 A | 10/2005 |
| CN | 1705346 A | 12/2005 |
| CN | 1890996 A | 1/2007 |
| CN | 1901717 A | 1/2007 |
| CN | 101068311 A | 11/2007 |
| CN | 101075173 A | 11/2007 |
| CN | 101243383 A | 8/2008 |
| CN | 101282422 A | 10/2008 |
| CN | 101300830 A | 11/2008 |
| CN | 101310519 A | 11/2008 |
| CN | 101355655 A | 1/2009 |
| CN | 101364031 A | 2/2009 |
| CN | 101388965 A | 3/2009 |
| CN | 101427574 A | 5/2009 |
| CN | 101431564 A | 5/2009 |
| CN | 101576996 A | 11/2009 |
| CN | 101681462 A | 3/2010 |
| CN | 101682622 A | 3/2010 |
| CN | 101778220 A | 7/2010 |
| CN | 101853132 A | 10/2010 |
| CN | 101854247 A | 10/2010 |
| CN | 101883213 A | 11/2010 |
| CN | 101917529 A | 12/2010 |
| CN | 101931691 A | 12/2010 |
| CN | 201788344 U | 4/2011 |
| CN | 102075727 A | 5/2011 |
| CN | 102084327 A | 6/2011 |
| CN | 102088554 A | 6/2011 |
| CN | 102215217 A | 10/2011 |
| CN | 102272700 A | 12/2011 |
| CN | 102428655 A | 4/2012 |
| CN | 102457661 A | 5/2012 |
| CN | 102474560 A | 5/2012 |
| CN | 102567953 A | 7/2012 |
| CN | 102572369 A | 7/2012 |
| CN | 202309894 U | 7/2012 |
| CN | 202330968 U | 7/2012 |
| CN | 102625036 A | 8/2012 |
| CN | 102651731 A | 8/2012 |
| CN | 102855079 A | 1/2013 |
| CN | 103037075 A | 4/2013 |
| CN | 103039064 A | 4/2013 |
| CN | 103051837 A | 4/2013 |
| CN | 103051841 A | 4/2013 |
| CN | 103052961 A | 4/2013 |
| CN | 103222247 A | 7/2013 |
| CN | 103237191 A | 8/2013 |
| CN | 103297719 A | 9/2013 |
| CN | 103309602 A | 9/2013 |
| CN | 103324329 A | 9/2013 |
| CN | 103384235 A | 11/2013 |
| CN | 103442774 A | 12/2013 |
| CN | 103458215 A | 12/2013 |
| CN | 103491298 A | 1/2014 |
| CN | 103649985 A | 3/2014 |
| CN | 103685925 A | 3/2014 |
| CN | 103702029 A | 4/2014 |
| CN | 103702039 A | 4/2014 |
| CN | 103718152 A | 4/2014 |
| CN | 103748610 A | 4/2014 |
| CN | 103777742 A | 5/2014 |
| CN | 103916582 A | 7/2014 |
| CN | 103947190 A | 7/2014 |
| CN | 103970472 A | 8/2014 |
| CN | 104010158 A | 8/2014 |
| CN | 104081335 A | 10/2014 |
| CN | 104270597 A | 1/2015 |
| CN | 104346080 A | 2/2015 |
| CN | 104346099 A | 2/2015 |
| CN | 104423946 A | 3/2015 |
| CN | 104427288 A | 3/2015 |
| CN | 104461288 A | 3/2015 |
| CN | 104469143 A | 3/2015 |
| CN | 104602133 A | 5/2015 |
| CN | 104754203 A | 7/2015 |
| CN | 104813322 A | 7/2015 |
| CN | 104836947 A | 8/2015 |
| CN | 104869046 A | 8/2015 |
| CN | 104903834 A | 9/2015 |
| CN | 104952063 A | 9/2015 |
| CN | 104980578 A | 10/2015 |
| CN | 105094957 A | 11/2015 |
| CN | 105138259 A | 12/2015 |
| CN | 105141498 A | 12/2015 |
| CN | 105190511 A | 12/2015 |
| CN | 105204846 A | 12/2015 |
| CN | 105210018 A | 12/2015 |
| CN | 105229571 A | 1/2016 |
| CN | 105245774 A | 1/2016 |
| CN | 105264473 A | 1/2016 |
| CN | 105338256 A | 2/2016 |
| CN | 105389173 A | 3/2016 |
| CN | 105391778 A | 3/2016 |
| CN | 105474163 A | 4/2016 |
| CN | 105493138 A | 4/2016 |
| CN | 105554429 A | 5/2016 |
| CN | 105589637 A | 5/2016 |
| CN | 105611215 A | 5/2016 |
| CN | 105620393 A | 6/2016 |
| CN | 105630290 A | 6/2016 |
| CN | 105637855 A | 6/2016 |
| CN | 105653031 A | 6/2016 |
| CN | 105765967 A | 7/2016 |
| CN | 105794196 A | 7/2016 |
| CN | 105900376 A | 8/2016 |
| CN | 105981372 A | 9/2016 |
| CN | 105991915 A | 10/2016 |
| CN | 106067947 A | 11/2016 |
| CN | 106161956 A | 11/2016 |
| CN | 106210184 A | 12/2016 |
| CN | 106210550 A | 12/2016 |
| CN | 106210855 A | 12/2016 |
| CN | 106257540 A | 12/2016 |
| CN | 106257909 A | 12/2016 |
| CN | 106303280 A | 1/2017 |
| CN | 106303648 A | 1/2017 |
| CN | 106303690 A | 1/2017 |
| CN | 106341611 A | 1/2017 |
| CN | 106375662 A | 2/2017 |
| CN | 106412214 A | 2/2017 |
| CN | 106412412 A | 2/2017 |
| CN | 106412445 A | 2/2017 |
| CN | 106445219 A | 2/2017 |
| CN | 106471793 A | 3/2017 |
| CN | 106534619 A | 3/2017 |
| CN | 106575149 A | 4/2017 |
| CN | 106713946 A | 5/2017 |
| CN | 106791357 A | 5/2017 |
| CN | 106791377 A | 5/2017 |
| CN | 106791420 A | 5/2017 |
| CN | 106921829 A | 7/2017 |
| CN | 107066523 A | 8/2017 |
| CN | 107077274 A | 8/2017 |
| CN | 107079141 A | 8/2017 |
| CN | 107122049 A | 9/2017 |
| CN | 107491257 A | 12/2017 |

(56) References Cited

FOREIGN PATENT DOCUMENTS

| | | |
|---|---|---|
| CN | 107533356 A | 1/2018 |
| CN | 107533417 A | 1/2018 |
| CN | 107534656 A | 1/2018 |
| CN | 107566721 A | 1/2018 |
| CN | 107580693 A | 1/2018 |
| CN | 107704177 A | 2/2018 |
| CN | 107728876 A | 2/2018 |
| CN | 107770448 A | 3/2018 |
| CN | 107800945 A | 3/2018 |
| CN | 107820011 A | 3/2018 |
| CN | 107924113 A | 4/2018 |
| CN | 107992248 A | 5/2018 |
| CN | 108353126 A | 7/2018 |
| CN | 108391053 A | 8/2018 |
| CN | 108513070 A | 9/2018 |
| CN | 108549522 A | 9/2018 |
| CN | 108668083 A | 10/2018 |
| CN | 108712609 A | 10/2018 |
| CN | 108769562 A | 11/2018 |
| CN | 108848308 A | 11/2018 |
| CN | 108886569 A | 11/2018 |
| CN | 109005366 A | 12/2018 |
| CN | 109061985 A | 12/2018 |
| CN | 109196825 A | 1/2019 |
| CN | 109313530 A | 2/2019 |
| CN | 109496425 A | 3/2019 |
| CN | 109639970 A | 4/2019 |
| CN | 109644229 A | 4/2019 |
| CN | 110784615 A | 2/2020 |
| CN | 111580671 A | 8/2020 |
| CN | 111784615 A | 10/2020 |
| CN | 111901475 A | 11/2020 |
| CN | 111901476 A | 11/2020 |
| CN | 111917980 A | 11/2020 |
| CN | 112154658 A | 12/2020 |
| CN | 112291627 A | 1/2021 |
| CN | 112598677 A | 4/2021 |
| CN | 112637477 A | 4/2021 |
| CN | 202110328601 A | 4/2022 |
| DK | 201670652 A1 | 12/2017 |
| DK | 201670753 A1 | 1/2018 |
| DK | 201670755 A1 | 1/2018 |
| DK | 201670627 A1 | 2/2018 |
| EP | 0651543 A2 | 5/1995 |
| EP | 0651543 A3 | 12/1997 |
| EP | 1278099 A1 | 1/2003 |
| EP | 1592212 A1 | 11/2005 |
| EP | 1953663 A1 | 8/2008 |
| EP | 0651543 B1 | 9/2008 |
| EP | 1981262 A1 | 10/2008 |
| EP | 2056568 A1 | 5/2009 |
| EP | 2194508 A1 | 6/2010 |
| EP | 2237536 A1 | 10/2010 |
| EP | 2430766 A2 | 3/2012 |
| EP | 2454872 A1 | 5/2012 |
| EP | 2482179 A2 | 8/2012 |
| EP | 2487613 A1 | 8/2012 |
| EP | 2487913 A2 | 8/2012 |
| EP | 2430766 A4 | 12/2012 |
| EP | 2579572 A1 | 4/2013 |
| EP | 2627073 A1 | 8/2013 |
| EP | 2634751 A1 | 9/2013 |
| EP | 2640060 A1 | 9/2013 |
| EP | 2682855 A2 | 1/2014 |
| EP | 2830297 A1 | 1/2015 |
| EP | 2843530 A1 | 3/2015 |
| EP | 2446619 B1 | 10/2015 |
| EP | 2950198 A1 | 12/2015 |
| EP | 2966855 A2 | 1/2016 |
| EP | 2972677 A1 | 1/2016 |
| EP | 2430766 B1 | 3/2016 |
| EP | 3008575 A1 | 4/2016 |
| EP | 3012732 A1 | 4/2016 |
| EP | 3026636 A1 | 6/2016 |
| EP | 3033837 A1 | 6/2016 |
| EP | 3038427 A1 | 6/2016 |
| EP | 3051525 A1 | 8/2016 |
| EP | 3104590 A1 | 12/2016 |
| EP | 3107065 A1 | 12/2016 |
| EP | 3120217 A1 | 1/2017 |
| EP | 2761582 B1 | 3/2017 |
| EP | 3033837 A4 | 3/2017 |
| EP | 3209012 A1 | 8/2017 |
| EP | 3211587 A1 | 8/2017 |
| EP | 2194508 B1 | 12/2017 |
| EP | 2258103 B1 | 5/2018 |
| EP | 3333544 A1 | 6/2018 |
| EP | 2556665 B1 | 8/2018 |
| EP | 3033837 B1 | 10/2018 |
| EP | 3393119 A1 | 10/2018 |
| EP | 3135028 B1 | 1/2019 |
| EP | 2482179 B1 | 3/2019 |
| EP | 3457680 A1 | 3/2019 |
| EP | 3012732 B1 | 5/2019 |
| EP | 3008575 B1 | 7/2019 |
| EP | 3120217 B1 | 4/2020 |
| EP | 3633975 A1 | 4/2020 |
| EP | 3163866 B1 | 5/2020 |
| EP | 3736676 A1 | 11/2020 |
| EP | 2682855 B1 | 2/2021 |
| EP | 3787285 A1 | 3/2021 |
| GB | 2307383 A | 5/1997 |
| GB | 2515797 A | 1/2015 |
| GB | 2519363 A | 4/2015 |
| GB | 2523670 A | 9/2015 |
| HK | 40022327 A | 11/2020 |
| IN | 1038MUM2005 A | 6/2007 |
| JP | 2-179078 A | 7/1990 |
| JP | 9-116792 A | 5/1997 |
| JP | 11-355617 A | 12/1999 |
| JP | 2000-207549 A | 7/2000 |
| JP | 2000-244905 A | 9/2000 |
| JP | 2001-245204 A | 9/2001 |
| JP | 2001-298649 A | 10/2001 |
| JP | 2003-8964 A | 1/2003 |
| JP | 2003-18438 A | 1/2003 |
| JP | 2003-32597 A | 1/2003 |
| JP | 2003-241293 A | 8/2003 |
| JP | 2003-248549 A | 9/2003 |
| JP | 2003-338975 A | 11/2003 |
| JP | 200415595 A | 1/2004 |
| JP | 2004-135074 A | 4/2004 |
| JP | 2005-31466 A | 2/2005 |
| JP | 2005-94696 A | 4/2005 |
| JP | 2005-191641 A | 7/2005 |
| JP | 2005-191985 A | 7/2005 |
| JP | 2005-311699 A | 11/2005 |
| JP | 3872041 B2 | 1/2007 |
| JP | 2007-28211 A | 2/2007 |
| JP | 2007-124398 A | 5/2007 |
| JP | 2007-150921 A | 6/2007 |
| JP | 2008-66978 A | 3/2008 |
| JP | 2008-99330 A | 4/2008 |
| JP | 2008-236534 A | 10/2008 |
| JP | 2009-105919 A | 5/2009 |
| JP | 2009-212899 A | 9/2009 |
| JP | 2009-273023 A | 11/2009 |
| JP | 2009-545256 A | 12/2009 |
| JP | 2010-117444 A | 5/2010 |
| JP | 2010-119147 A | 5/2010 |
| JP | 2010-160581 A | 7/2010 |
| JP | 2010-182023 A | 8/2010 |
| JP | 2010-268052 A | 11/2010 |
| JP | 2011-87167 A | 4/2011 |
| JP | 2011-91570 A | 5/2011 |
| JP | 2011-124864 A | 6/2011 |
| JP | 2011-211552 A | 10/2011 |
| JP | 2011-249887 A | 12/2011 |
| JP | 2012-79302 A | 4/2012 |
| JP | 2012-89973 A | 5/2012 |
| JP | 2012-124608 A | 6/2012 |
| JP | 2012-147379 A | 8/2012 |
| JP | 2013-70303 A | 4/2013 |
| JP | 2013-101528 A | 5/2013 |

(56) References Cited

FOREIGN PATENT DOCUMENTS

| | | |
|---|---|---|
| JP | 2013-106289 A | 5/2013 |
| JP | 2013-524683 A | 6/2013 |
| JP | 2013-546238 A | 12/2013 |
| JP | 2014-23083 A | 2/2014 |
| JP | 2014-60501 A | 4/2014 |
| JP | 2014-71835 A | 4/2014 |
| JP | 2014-87126 A | 5/2014 |
| JP | 2014-170982 A | 9/2014 |
| JP | 2014-212415 A | 11/2014 |
| JP | 2015-1716 A | 1/2015 |
| JP | 2015-5255 A | 1/2015 |
| JP | 2015-11507 A | 1/2015 |
| JP | 2015-22716 A | 2/2015 |
| JP | 2015-25897 A | 2/2015 |
| JP | 2015-50713 A | 3/2015 |
| JP | 2015-76717 A | 4/2015 |
| JP | 2015-091098 A | 5/2015 |
| JP | 2015-146619 A | 8/2015 |
| JP | 2015-149095 A | 8/2015 |
| JP | 2015-170234 A | 9/2015 |
| JP | 2015-180987 A | 10/2015 |
| JP | 2015-201839 A | 11/2015 |
| JP | 2015-534742 A | 12/2015 |
| JP | 2016-1446 A | 1/2016 |
| JP | 2016-66978 A | 4/2016 |
| JP | 2016-72965 A | 5/2016 |
| JP | 2016-129315 A | 7/2016 |
| JP | 2016-174282 A | 9/2016 |
| JP | 2016-175175 A | 10/2016 |
| JP | 2017-34474 A | 2/2017 |
| JP | 2017-228843 A | 12/2017 |
| JP | 2018-7158 A | 1/2018 |
| JP | 2018-56719 A | 4/2018 |
| JP | 2018-107711 A | 7/2018 |
| JP | 2018-121235 A | 8/2018 |
| JP | 2019-62556 A | 4/2019 |
| JP | 2019-145108 A | 8/2019 |
| JP | 2019-203399 A | 11/2019 |
| JP | 2020-42602 A | 3/2020 |
| JP | 6982047 B2 | 11/2021 |
| KR | 10-2005-0086630 A | 8/2005 |
| KR | 10-2009-0066319 A | 6/2009 |
| KR | 10-2012-0004928 A | 1/2012 |
| KR | 10-2012-0025872 A | 3/2012 |
| KR | 10-2012-0048397 A | 5/2012 |
| KR | 10-2012-0054406 A | 5/2012 |
| KR | 10-2012-0057696 A | 6/2012 |
| KR | 10-2012-0093322 A | 8/2012 |
| KR | 10-2013-0033445 A | 4/2013 |
| KR | 10-1341095 B1 | 12/2013 |
| KR | 10-1343591 B1 | 12/2013 |
| KR | 10-2014-0019631 A | 2/2014 |
| KR | 10-2014-0049850 A | 4/2014 |
| KR | 10-2014-0062801 A | 5/2014 |
| KR | 10-2015-0014290 A | 2/2015 |
| KR | 10-2015-0024899 A | 3/2015 |
| KR | 10-2016-0016910 A | 2/2016 |
| KR | 10-2016-0019145 A | 2/2016 |
| KR | 10-2016-0020396 A | 2/2016 |
| KR | 10-2016-0020791 A | 2/2016 |
| KR | 10-2016-0047891 A | 5/2016 |
| KR | 10-2016-0075583 A | 6/2016 |
| KR | 10-1674959 B1 | 11/2016 |
| KR | 10-2017-0123125 A | 11/2017 |
| KR | 10-1799223 B1 | 11/2017 |
| KR | 10-2017-0135975 A | 12/2017 |
| KR | 10-2018-0017227 A | 2/2018 |
| KR | 10-2018-0037076 A | 4/2018 |
| KR | 10-2018-0085931 A | 7/2018 |
| KR | 10-2018-0095331 A | 8/2018 |
| KR | 10-2018-0108847 A | 10/2018 |
| KR | 10-2018-0137610 A | 12/2018 |
| KR | 10-2019-0034248 A | 4/2019 |
| KR | 10-2020-0039030 A | 4/2020 |
| KR | 10-2338576 B1 | 12/2021 |
| SU | 1610470 A1 | 11/1990 |
| WO | 99/39307 A1 | 8/1999 |
| WO | 01/18665 A1 | 3/2001 |
| WO | 2004032507 A1 | 4/2004 |
| WO | 2005/043892 A1 | 5/2005 |
| WO | 2005/060501 A2 | 7/2005 |
| WO | 2007/126707 A1 | 11/2007 |
| WO | 2008/014301 A2 | 1/2008 |
| WO | 2008/020655 A1 | 2/2008 |
| WO | 2008/025120 A1 | 3/2008 |
| WO | 2008/030779 A1 | 3/2008 |
| WO | 2008/109644 A2 | 9/2008 |
| WO | 2009/005914 A1 | 1/2009 |
| WO | 2009/078091 A1 | 6/2009 |
| WO | 2010/059426 A2 | 5/2010 |
| WO | 2010/077048 A2 | 7/2010 |
| WO | 2010/102678 A1 | 9/2010 |
| WO | 2010/077048 A3 | 10/2010 |
| WO | 2010/131869 A2 | 11/2010 |
| WO | 2010/134275 A1 | 11/2010 |
| WO | 2010/137513 A1 | 12/2010 |
| WO | 2011/007264 A1 | 1/2011 |
| WO | 2010/131869 A3 | 2/2011 |
| WO | 2010/059426 A3 | 5/2011 |
| WO | 2011/126505 A1 | 10/2011 |
| WO | 2011/146605 A1 | 11/2011 |
| WO | 2011/146839 A1 | 11/2011 |
| WO | 2011/161145 A1 | 12/2011 |
| WO | 2012/001947 A1 | 1/2012 |
| WO | 2012/006251 A1 | 1/2012 |
| WO | 2012/019163 A2 | 2/2012 |
| WO | 2012/037170 A1 | 3/2012 |
| WO | 2012/051720 A2 | 4/2012 |
| WO | 2012/170118 A1 | 12/2012 |
| WO | 2013/082325 A1 | 6/2013 |
| WO | 2013/114821 A1 | 8/2013 |
| WO | 2013/152453 A1 | 10/2013 |
| WO | 2013/152454 A1 | 10/2013 |
| WO | 2013/189058 A1 | 12/2013 |
| WO | 2014/052871 A1 | 4/2014 |
| WO | 2014/058937 A1 | 4/2014 |
| WO | 2014/066115 A1 | 5/2014 |
| WO | 2014/105276 A1 | 7/2014 |
| WO | 2014/159779 A1 | 10/2014 |
| WO | 2014/160819 A1 | 10/2014 |
| WO | 2014/165141 A1 | 10/2014 |
| WO | 2014/185028 A1 | 11/2014 |
| WO | 2014/200734 A1 | 12/2014 |
| WO | 2014/200798 A1 | 12/2014 |
| WO | 2015/023044 A1 | 2/2015 |
| WO | 2015/026864 A1 | 2/2015 |
| WO | 2015/037211 A1 | 3/2015 |
| WO | 2015/059349 A1 | 4/2015 |
| WO | 2015/080744 A1 | 6/2015 |
| WO | 2015/085042 A1 | 6/2015 |
| WO | 2015/112868 A1 | 7/2015 |
| WO | 2014/200798 A8 | 8/2015 |
| WO | 2015/144209 A1 | 10/2015 |
| WO | 2015/152953 A1 | 10/2015 |
| WO | 2015/166684 A1 | 11/2015 |
| WO | 2015/183438 A1 | 12/2015 |
| WO | 2015/187494 A1 | 12/2015 |
| WO | 2015/190666 A1 | 12/2015 |
| WO | 2016/028806 A1 | 2/2016 |
| WO | 2016/028807 A1 | 2/2016 |
| WO | 2016/028808 A1 | 2/2016 |
| WO | 2016/028809 A1 | 2/2016 |
| WO | 2016/064435 A1 | 4/2016 |
| WO | 2016/073804 A2 | 5/2016 |
| WO | 2016/073804 A3 | 7/2016 |
| WO | 2016/145129 A1 | 9/2016 |
| WO | 2016/168154 A1 | 10/2016 |
| WO | 2016/172619 A1 | 10/2016 |
| WO | 2016/203282 A1 | 12/2016 |
| WO | 2016/204936 A1 | 12/2016 |
| WO | 2017/058834 A1 | 4/2017 |
| WO | 2017/071559 A1 | 5/2017 |
| WO | 2017/153771 A1 | 9/2017 |
| WO | 2017/164716 A1 | 9/2017 |

(56) References Cited

FOREIGN PATENT DOCUMENTS

| | | |
|---|---|---|
| WO | 2017/201326 A1 | 11/2017 |
| WO | 2017/218143 A1 | 12/2017 |
| WO | 2017/218153 A1 | 12/2017 |
| WO | 2017/218193 A1 | 12/2017 |
| WO | 2018/006053 A1 | 1/2018 |
| WO | 2018/048838 A1 | 3/2018 |
| WO | 2018/049430 A2 | 3/2018 |
| WO | 2018/057268 A1 | 3/2018 |
| WO | 2018/099037 A1 | 6/2018 |
| WO | 2018/144339 A2 | 8/2018 |
| WO | 2018/159864 A1 | 9/2018 |
| WO | 2018/212802 A1 | 11/2018 |
| WO | 2018/213401 A1 | 11/2018 |
| WO | 2018/213415 A1 | 11/2018 |
| WO | 2018/232333 A1 | 12/2018 |
| WO | 2019/050562 A1 | 3/2019 |
| WO | 2019/067131 A1 | 4/2019 |
| WO | 2019/216997 A1 | 11/2019 |
| WO | 2020/227386 A2 | 11/2020 |
| WO | 2021/112983 A1 | 6/2021 |

OTHER PUBLICATIONS

Applicant-Initiated Interview Summary received for U.S. Appl. No. 16/528,257, dated Nov. 18, 2021, 2 pages.
Applicant-Initiated Interview Summary received for U.S. Appl. No. 17/121,610, dated Oct. 29, 2021, 2 pages.
Applicant-Initiated Interview Summary received for U.S. Appl. No. 17/220,596, dated Aug. 18, 2021, 3 pages.
Applicant-Initiated Interview Summary received for U.S. Appl. No. 17/476,404, dated Mar. 18, 2022, 2 pages.
Corrected Notice of Allowance received for U.S. Appl. No. 16/528,257, dated Feb. 3, 2022, 2 pages.
Corrected Notice of Allowance received for U.S. Appl. No. 16/733,718, dated Nov. 17, 2021, 2 pages.
Corrected Notice of Allowance received for U.S. Appl. No. 17/121,610, dated Mar. 31, 2022, 3 pages.
Corrected Notice of Allowance received for U.S. Appl. No. 17/157,166, dated Apr. 13, 2022, 4 pages.
Corrected Notice of Allowance received for U.S. Appl. No. 17/157,166, dated Dec. 9, 2021, 4 pages.
Corrected Notice of Allowance received for U.S. Appl. No. 17/157,166, dated Dec. 15, 2021, 4 pages.
Corrected Notice of Allowance received for U.S. Appl. No. 17/157,166, dated Jan. 5, 2022, 4 pages.
Corrected Notice of Allowance received for U.S. Appl. No. 17/190,879, dated Nov. 19, 2021, 2 pages.
Corrected Notice of Allowance received for U.S. Appl. No. 17/220,596, dated Nov. 4, 2021, 3 pages.
Corrected Notice of Allowance received for U.S. Appl. No. 17/220,596, dated Nov. 18, 2021, 27 pages.
Corrected Notice of Allowance received for U.S. Appl. No. 17/354,376, dated Apr. 11, 2022, 5 pages.
Corrected Notice of Allowance received for U.S. Appl. No. 17/354,376, dated Feb. 16, 2022, 5 pages.
Corrected Notice of Allowance received for U.S. Appl. No. 17/354,376, dated Mar. 23, 2022, 6 pages.
Decision on Appeal received for U.S. Appl. No. 15/995,040, dated Dec. 29, 2021, 14 pages.
Decision on Appeal received for U.S. Appl. No. 16/144,629, dated Jan. 18, 2022, 8 pages.
Decision to Grant received for Danish Patent Application No. PA201770719, dated Feb. 3, 2022, 2 pages.
Decision to Grant received for European Patent Application No. 16784025.5, dated Nov. 11, 2021, 2 pages.
Decision to Grant received for European Patent Application No. 17809168.2, dated Oct. 21, 2021, 3 pages.
Decision to Grant received for European Patent Application No. 19729395.4, dated Dec. 9, 2021, 2 pages.
Decision to Grant received for Japanese Patent Application No. 2018-182607, dated Apr. 13, 2022, 3 pages (1 page of English Translation and 2 pages of Official Copy).
Decision to Grant received for Japanese Patent Application No. 2019-203399, dated Oct. 20, 2021, 3 pages (1 page of English Translation and 2 pages of Official Copy).
Decision to Grant received for Japanese Patent Application No. 2019-566087, dated Jan. 26, 2022, 2 pages (1 page of English Translation and 1 page of Official Copy).
Decision to Refuse received for European Patent Application No. 19204230.7, dated Feb. 4, 2022, 15 pages.
Demetriou, Soteris, "Analyzing & Designing the Security of Shared Resources on Smartphone Operating Systems, Dissertation", University of Illinois at Urbana-Champaign Online available at: https://www.ideals.illinois.edu/bitstream/handle/2142/100907/DEMETRIOU-DISSERTATION-2018.pdf?sequence=1&isAllowed=n, 2018, 211 pages.
Dutta, Tushar Subhra., "Warning! iOS Apps with Camera Access Permission Can Spy On You", Online available at: https://web.archive.org/web/20180219092123/https://techviral.net/ios-apps-camera-can-spy/, Feb. 19, 2018, 3 pages.
Ex Parte Quayle Action received for U.S. Appl. No. 17/121,610, mailed on Dec. 9, 2021, 7 pages.
Examiner-Initiated Interview Summary received for U.S. Appl. No. 17/027,373, dated Mar. 31, 2022, 4 pages.
Examiner-Initiated Interview Summary received for U.S. Appl. No. 17/220,596, dated Oct. 7, 2021, 2 pages.
Extended European Search Report received for European Patent Application No. 21202358.4, dated Dec. 6, 2021, 8 pages.
Extended European Search Report received for European Patent Application No. 22151131.4, dated Mar. 24, 2022, 6 pages.
Intention to Grant received for Danish Patent Application No. PA202070617, dated Nov. 15, 2021, 2 pages.
International Preliminary Report on Patentability received for PCT Patent Application No. PCT/US2020/031643, dated Nov. 18, 2021, 27 pages.
International Search Report and Written Opinion received for PCT Patent Application No. PCT/US2021/046877, dated Mar. 1, 2022, 17 pages.
Invitation to Pay Additional Fees received for PCT Patent Application No. PCT/US2021/046877, mailed on Jan. 5, 2022, 10 pages.
King, Julie Adair., "How to Check the Exposure Meter on Your Nikon D5500", Online available at: https://www.dummies.com/article/home-auto-hobbies/photography/how-to-check-the-exposuremeter-on-your-nikon-d5500-142677, Mar. 26, 2016, 6 pages.
Minutes of the Oral Proceedings received for European Patent Application No. 19204230.7, mailed on Feb. 2, 2022, 9 pages.
Non-Final Office Action received for U.S. Appl. No. 17/476,404, dated Feb. 8, 2022, 26 pages.
Non-Final Office Action received for U.S. Appl. No. 15/995,040, dated Apr. 8, 2022, 21 pages.
Non-Final Office Action received for U.S. Appl. No. 17/027,373, dated Feb. 2, 2022, 17 pages.
Non-Final Office Action received for U.S. Appl. No. 17/220,596, dated Jun. 10, 2021, 31 pages.
Notice of Acceptance received for Australian Patent Application No. 2019218241, dated Mar. 9, 2022, 3 pages.
Notice of Acceptance received for Australian Patent Application No. 2020239711, dated Dec. 16, 2021, 3 pages.
Notice of Acceptance received for Australian Patent Application No. 2020260413, dated Oct. 14, 2021, 3 pages.
Notice of Acceptance received for Australian Patent Application No. 2021254567, dated Nov. 17, 2021, 3 pages.
Notice of Acceptance received for Australian Patent Application No. 2022200966, dated Feb. 25, 2022, 3 pages.
Notice of Allowance received for Chinese Patent Application No. 202010287950.2, dated Mar. 22, 2022, 7 pages (03 pages of English Translation and 04 pages of Official Copy).
Notice of Allowance received for Chinese Patent Application No. 202010600197.8, dated Feb. 9, 2022, 5 pages (1 page of English Translation and 4 pages of Official Copy).

(56) References Cited

OTHER PUBLICATIONS

Notice of Allowance received for Chinese Patent Application No. 202010601484.0, dated Nov. 23, 2021, 2 pages (1 page of English Translation and 1 page of Official Copy).
Notice of Allowance received for Chinese Patent Application No. 202011480411.7, dated Feb. 18, 2022, 6 pages (3 pages of English Translation and 3 pages of Official Copy).
Notice of Allowance received for Japanese Patent Application No. 2019-194597, dated Nov. 19, 2021, 4 pages (1 page of English Translation and 3 pages of Official Copy).
Notice of Allowance received for Korean Patent Application No. 10-2021-0022053, dated Nov. 23, 2021, 5 pages (2 pages of English Translation and 3 pages of Official Copy).
Notice of Allowance received for Korean Patent Application No. 10-2021-7020693, dated Dec. 27, 2021, 5 pages (1 page of English Translation and 4 pages of Official Copy).
Notice of Allowance received for Korean Patent Application No. 10-2021-7035687, dated Dec. 30, 2021, 5 pages (1 page of English Translation and 4 pages of Official Copy).
Notice of Allowance received for Korean Patent Application No. 10-2021-7036337, dated Apr. 5, 2022, 4 pages (1 page of English Translation and 3 pages of Official Copy).
Notice of Allowance received for Korean Patent Application No. 10-2022-7002829, dated Feb. 12, 2022, 6 pages (1 page of English Translation and 5 pages of Official Copy).
Notice of Allowance received for U.S. Appl. No. 17/157,166, dated Nov. 16, 2021, 6 pages.
Notice of Allowance received for U.S. Appl. No. 16/144,629, dated Apr. 7, 2022, 8 pages.
Notice of Allowance received for U.S. Appl. No. 16/528,257, dated Jan. 14, 2022, 10 pages.
Notice of Allowance received for U.S. Appl. No. 16/733,718, dated Oct. 20, 2021, 24 pages.
Notice of Allowance received for U.S. Appl. No. 16/835,651, dated Nov. 10, 2021, 9 pages.
Notice of Allowance received for U.S. Appl. No. 17/121,610, dated Mar. 11, 2022, 5 pages.
Notice of Allowance received for U.S. Appl. No. 17/157,166, dated Mar. 30, 2022, 6 pages.
Notice of Allowance received for U.S. Appl. No. 17/190,879, dated Nov. 10, 2021, 8 pages.
Notice of Allowance received for U.S. Appl. No. 17/220,596, dated Oct. 21, 2021, 43 pages.
Notice of Allowance received for U.S. Appl. No. 17/354,376, dated Jan. 27, 2022, 10 pages.
Notice of Allowance received for U.S. Appl. No. 17/354,376, dated Mar. 4, 2022, 5 pages.
Notice of Allowance received for U.S. Appl. No. 17/354,376, dated Mar. 30, 2022, 5 pages.
Office Action received for Australian Patent Application No. 2019338180, dated Feb. 18, 2022, 3 pages.
Office Action received for Australian Patent Application No. 2020239717, dated Dec. 15, 2021, 6 pages.
Office Action received for Australian Patent Application No. 2020239717, dated Mar. 16, 2022, 4 pages.
Office Action received for Australian Patent Application No. 2021107587, dated Feb. 1, 2022, 6 pages.
Office Action received for Australian Patent Application No. 2021201295, dated Jan. 14, 2022, 3 pages.
Office Action received for Australian Patent Application No. 2021203903, dated Feb. 24, 2022, 3 pages.
Office Action received for Chinese Patent Application No. 2019104001792, dated Dec. 27, 2021, 32 pages (13 pages of English Translation and 19 pages of Official Copy).
Office Action received for Chinese Patent Application No. 2020101266614, dated Mar. 4, 2022, 13 pages (8 pages of English Translation and 5 pages of Official Copy).
Office Action received for Chinese Patent Application No. 2020102879502, dated Nov. 19, 2021, 8 pages (5 pages of English Translation and 3 pages of Official Copy).
Office Action received for Chinese Patent Application No. 202011480411.7, dated Jan. 12, 2022, 7 pages (4 pages of English Translation and 3 pages of Official Copy).
Office Action received for Chinese Patent Application No. 202110328602.X, dated Mar. 24, 2022, 6 pages (3 pages of English Translation and 3 pages of Official Copy).
Office Action received for Chinese Patent Application No. 2021107666687, dated Feb. 16, 2022, 12 pages (6 pages of English Translation and 6 pages of Official Copy).
Office Action received for Chinese Patent Application No. 202180002106.3, dated Feb. 16, 2022, 12 pages (6 pages of English Translation and 6 pages of Official Copy).
Office Action received for Danish Patent Application No. PA201770719, dated Nov. 16, 2021, 2 pages.
Office Action received for European Patent Application No. 18779093.6, dated Mar. 17, 2022, 4 pages.
Office Action received for European Patent Application No. 20205496.1, dated Nov. 10, 2021, 5 pages.
Office Action received for European Patent Application No. 20206197.4, dated Mar. 18, 2022, 7 pages.
Office Action received for European Patent Application No. 20210373.5, dated Dec. 9, 2021, 7 pages.
Office Action received for Indian Patent Application No. 201818025015, dated Feb. 4, 2022, 7 pages.
Office Action received for Indian Patent Application No. 201818046896, dated Feb. 2, 2022, 7 pages.
Office Action received for Indian Patent Application No. 202014041529, dated Dec. 6, 2021, 6 pages.
Office Action received for Indian Patent Application No. 202014041530, dated Dec. 8, 2021, 7 pages.
Office Action received for Indian Patent Application No. 202118021941, dated Mar. 23, 2022, 5 pages.
Office Action received for Japanese Patent Application No. 2019-566087, dated Oct. 18, 2021, 10 pages (6 pages of English Translation and 4 pages of Official Copy).
Office Action received for Japanese Patent Application No. 2020-159338, dated Dec. 8, 2021, 9 pages (5 pages of English Translation and 4 pages of Official Copy).
Office Action received for Japanese Patent Application No. 2020-159840, dated Dec. 10, 2021, 13 pages (7 pages of English Translation and 6 pages of Official Copy).
Office Action received for Japanese Patent Application No. 2020-159840, dated Mar. 28, 2022, 6 pages (3 pages of English Translation and 3 pages of Official Copy).
Office Action received for Korean Patent Application No. 10-2021-7036337, dated Dec. 8, 2021, 6 pages (2 pages of English Translation and 4 pages of Official Copy).
Office Action received for Korean Patent Application No. 10-2022-7006310, dated Mar. 8, 2022, 6 pages (2 pages of English Translation and 4 pages of Official Copy).
Record of Oral Hearing received for U.S. Appl. No. 16/144,629, mailed on Jan. 28, 2022, 13 pages.
Sigdel, Prakash, "How to record WhatsApp voice massage without continue holding down button", Available Online at: https://www.youtube.com/watch?v=m3Hz6TXtOPA, Dec. 6, 2017, 9 pages.
Tech Stuff, "Telegram 4.0: Video Messages + Telescope, Payments and more . . . ", Available Online at: https://www.youtube.com/watch?v=y0alJRPH7nQ, May 19, 2017, 46 pages.
Whitacre, Michele, "Photography 101 | Exposure Meter", Online available at: https://web.archive.org/web/20160223055834/http://www.michelewhitacrephotographyblog.com, Feb. 23, 2016, 4 pages.
Wu, et al., "Security Threats to Mobile Multimedia Applications: Camera-Based Attacks on Mobile Phones", IEEE Communications Magazine, Available online at: http://www.ieeeprojectmadurai.in/BASE/ANDROID/Security%20Threats%20to%20Mobile.pdf, Mar. 2014, pp. 80-87.
[B612] Addition of facial recognition bear/cat stamps and AR background function having moving sparkles or hearts, Available Online at: <URL, htpps://apptopi.jp/2017/01/22/b612>, Jan. 22, 2017, 11 pages.
Advisory Action received for U.S. Appl. No. 16/144,629, dated Dec. 13, 2019, 9 pages.

(56) References Cited

OTHER PUBLICATIONS

Advisory Action received for U.S. Appl. No. 16/144,629, dated Jan. 6, 2021, 10 pages.
Android Police, "Galaxy S9+ In-Depth Camera Review", See Especially 0:43-0:53; 1:13-1:25; 1:25-1:27; 5:11-5:38; 6:12-6:26, Available Online at <https://www.youtube.com/watch?v=GZHYCdMCv-w>, Apr. 19, 2018, 3 pages.
Androidcentral, "How do I respond to group messages from notification bar?", Available online at: https://forums.androidcentral.com/ask-question/952030-how-do-i-respond-group-messages-notification-bar.html, Mar. 25, 2019, 3 pages.
Applicant Initiated Interview Summary received for U.S. Appl. No. 16/790,619, dated Jul. 28, 2020, 3 pages.
Applicant-Initiated Interview Summary received for U.S. Appl. No. 16/271,583 dated Mar. 2, 2020, 3 pages.
Applicant-Initiated Interview Summary received for U.S. Appl. No. 16/271,583, dated Jul. 14, 2020, 4 pages.
Applicant-Initiated Interview Summary received for U.S. Appl. No. 15/995,040, dated Dec. 23, 2019, 5 pages.
Applicant-Initiated Interview Summary received for U.S. Appl. No. 15/995,040, dated Jul. 27, 2020, 4 pages.
Applicant-Initiated Interview Summary received for U.S. Appl. No. 15/995,040, dated Nov. 24, 2020, 4 pages.
Applicant-Initiated Interview Summary received for U.S. Appl. No. 16/144,629, dated Jul. 2, 2020, 5 pages.
Applicant-Initiated Interview Summary received for U.S. Appl. No. 16/144,629, dated Nov. 23, 2020, 3 pages.
Applicant-Initiated Interview Summary received for U.S. Appl. No. 16/528,941, dated Jun. 19, 2020, 3 pages.
Applicant-Initiated Interview Summary received for U.S. Appl. No. 16/528,941, dated Nov. 10, 2020, 2 pages.
Applicant-Initiated Interview Summary received for U.S. Appl. No. 16/584,100, dated Feb. 19, 2020, 3 pages.
Applicant-Initiated Interview Summary received for U.S. Appl. No. 16/586,344, dated Feb. 27, 2020, 3 pages.
Applicant-Initiated Interview Summary received for U.S. Appl. No. 16/599,433, dated Apr. 20, 2021, 7 pages.
Applicant-Initiated Interview Summary received for U.S. Appl. No. 16/733,718, dated Nov. 2, 2020, 4 pages.
Applicant-Initiated Interview Summary received for U.S. Appl. No. 16/799,481, dated Jul. 24, 2020, 3 pages.
Applicant-Initiated Interview Summary received for U.S. Appl. No. 17/027,317, dated Dec. 21, 2020, 4 pages.
AstroVideo, "AstroVideo enables you to use a low-cost,low-light video camera to capture astronomical images.", Available online at: https://www.coaa.co.uk/astrovideo.htm, Retrieved on: Nov. 18, 2019, 5 pages.
Brief Communication regarding Oral Proceedings received for European Patent Application No. 17184710.6, dated Feb. 19, 2020, 2 pages.
Brief Communication regarding Oral Proceedings received for European Patent Application No. 17184710.6, dated Mar. 9, 2020, 2 pages.
Certificate of Examination received for Australian Patent Application No. 2017100683, dated Jan. 16, 2018, 2 pages.
Certificate of Examination received for Australian Patent Application No. 2019100420, dated Jul. 3, 2019, 2 pages.
Certificate of Examination received for Australian Patent Application No. 2019100499, dated Aug. 15, 2019, 2 pages.
Certificate of Examination received for Australian Patent Application No. 2019100794, dated Dec. 19, 2019, 2 pages.
Certificate of Examination received for Australian Patent Application No. 2019101062, dated Jun. 2, 2020, 2 pages.
Certificate of Examination received for Australian Patent Application No. 2020100189, dated May 12, 2020, 2 pages.
Certificate of Examination received for Australian Patent Application No. 2020100720, dated Nov. 11, 2020, 2 pages.
Certificate of Examination received for Australian Patent Application No. 2020101043, dated Dec. 22, 2020, 2 pages.
Certificate of Examination received for Australian Patent Application No. 2020101324, dated Sep. 7, 2020, 2 pages.
Certificate of Examination received for Australian Patent Application No. 2020104220, dated Apr. 1, 2021, 2 pages.
Channel Highway, "Virtual Makeover in Real-time and in full 3D", Available online at: https://www.youtube.com/watch?v=NgUbBzb5qZg, Feb. 16, 2016, 1 page.
Clover Juli, "Moment Pro Camera App for iOS Gains Zebra Striping for Displaying Over and Underexposed Areas", Online Available at: https://web.archive.org/web/20190502081353/https://www.macrumors.com/2019/05/01/momentcamera-app-zebra-striping-and-morel, May 1, 2019, 8 pages.
Corrected Notice of Allowance received for U.S. Appl. No. 14/641,251, dated Jun. 17, 2016, 2 pages.
Corrected Notice of Allowance received for U.S. Appl. No. 15/268,115, dated Apr. 13, 2018, 11 pages.
Corrected Notice of Allowance received for U.S. Appl. No. 15/268,115, dated Mar. 21, 2018, 9 pages.
Corrected Notice of Allowance received for U.S. Appl. No. 15/273,453, dated Dec. 21, 2017, 3 pages.
Corrected Notice of Allowance received for U.S. Appl. No. 15/273,453, dated Feb. 8, 2018, 2 pages.
Corrected Notice of Allowance received for U.S. Appl. No. 15/273,453, dated Nov. 27, 2017, 2 pages.
Corrected Notice of Allowance received for U.S. Appl. No. 15/273,503, dated Nov. 2, 2017, 2 pages.
Corrected Notice of Allowance received for U.S. Appl. No. 15/273,503, dated Nov. 24, 2017, 2 pages.
Corrected Notice of Allowance received for U.S. Appl. No. 15/858,175, dated Sep. 21, 2018, 2 pages.
Corrected Notice of Allowance received for U.S. Appl. No. 16/109,552, dated Jun. 13, 2019, 2 pages.
Corrected Notice of Allowance received for U.S. Appl. No. 16/143,097, dated Nov. 8, 2019, 3 pages.
Corrected Notice of Allowance received for U.S. Appl. No. 16/143,396, dated Jan. 30, 2020, 2 pages.
Corrected Notice of Allowance received for U.S. Appl. No. 16/144,572, dated Mar. 21, 2019, 3 pages.
Corrected Notice of Allowance received for U.S. Appl. No. 16/147,432, dated Jan. 18, 2019, 3 pages.
Corrected Notice of Allowance received for U.S. Appl. No. 16/147,432, dated Jul. 16, 2019, 3 pages.
Corrected Notice of Allowance received for U.S. Appl. No. 16/191,117, dated Dec. 9, 2019, 2 pages.
Corrected Notice of Allowance received for U.S. Appl. No. 16/191,117, dated Feb. 28, 2020, 2 pages.
Corrected Notice of Allowance received for U.S. Appl. No. 16/191,117, dated Nov. 20, 2019, 2 pages.
Corrected Notice of Allowance received for U.S. Appl. No. 16/511,578, dated Feb. 13, 2020, 3 pages.
Corrected Notice of Allowance received for U.S. Appl. No. 16/582,595, dated Apr. 7, 2020, 5 pages.
Corrected Notice of Allowance received for U.S. Appl. No. 16/582,595, dated Apr. 22, 2020, 5 pages.
Corrected Notice of Allowance received for U.S. Appl. No. 16/583,020, dated Mar. 24, 2020, 2 pages.
Corrected Notice of Allowance received for U.S. Appl. No. 16/584,044, dated Apr. 16, 2020, 3 pages.
Corrected Notice of Allowance received for U.S. Appl. No. 16/584,044, dated Jan. 29, 2020, 3 pages.
Corrected Notice of Allowance received for U.S. Appl. No. 16/584,044, dated Mar. 4, 2020, 2 pages.
Corrected Notice of Allowance received for U.S. Appl. No. 16/584,100, dated Feb. 21, 2020, 9 pages.
Corrected Notice of Allowance received for U.S. Appl. No. 16/584,693, dated Feb. 21, 2020, 15 pages.
Corrected Notice of Allowance received for U.S. Appl. No. 16/584,693, dated Mar. 4, 2020, 2 pages.
Corrected Notice of Allowance received for U.S. Appl. No. 16/584,693, dated Mar. 20, 2020, 2 pages.
Corrected Notice of Allowance received for U.S. Appl. No. 16/586,314, dated Apr. 8, 2020, 5 pages.

(56) References Cited

OTHER PUBLICATIONS

Corrected Notice of Allowance received for U.S. Appl. No. 16/586,314, dated Mar. 4, 2020, 3 pages.
Corrected Notice of Allowance received for U.S. Appl. No. 16/586,344, dated Apr. 7, 2020, 4 pages.
Corrected Notice of Allowance received for U.S. Appl. No. 16/586,344, dated Jan. 23, 2020, 4 pages.
Corrected Notice of Allowance received for U.S. Appl. No. 16/586,344, dated Mar. 17, 2020, 4 pages.
Corrected Notice of Allowance received for U.S. Appl. No. 16/790,619, dated Oct. 13, 2020, 3 pages.
Corrected Notice of Allowance received for U.S. Appl. No. 16/799,481, dated Oct. 27, 2020, 3 pages.
Corrected Notice of Allowance received for U.S. Appl. No. 16/825,879, dated Jul. 23, 2021, 2 pages.
Corrected Notice of Allowance received for U.S. Appl. No. 16/835,651, dated Jul. 28, 2021, 4 pages.
Corrected Notice of Allowance received for U.S. Appl. No. 16/835,651, dated Jun. 14, 2021, 2 pages.
Corrected Notice of Allowance received for U.S. Appl. No. 16/840,719, dated Jul. 8, 2021, 8 pages.
Corrected Notice of Allowance received for U.S. Appl. No. 16/840,719, dated May 14, 2021, 4 pages.
Corrected Notice of Allowance received for U.S. Appl. No. 17/027,484, dated May 14, 2021, 5 pages.
Corrected Notice of Allowance received for U.S. Appl. No. 17/027,484, dated May 28, 2021, 5 pages.
Corrected Search Report and Opinion received for Danish Patent Application No. PA201870364, dated Sep. 5, 2018, 13 pages.
Decision of Refusal received for Japanese Patent Application No. 2018-243463, dated Feb. 25, 2019, 8 pages.
Decision of Refusal received for Japanese Patent Application No. 2018-545502, dated Feb. 25, 2019, 11 pages.
Decision on Appeal received for Japanese Patent Application No. 2018-225131, dated Mar. 11, 2021, 5 pages.
Decision on Appeal received for Japanese Patent Application No. 2018-545502, dated Mar. 25, 2021, 3 pages.
Decision to grant received for Danish Patent Application No. PA201570788, dated Jul. 10, 2017, 2 pages.
Decision to Grant received for Danish Patent Application No. PA201570791, dated Jun. 7, 2017, 2 pages.
Decision to Grant received for Danish Patent Application No. PA201670627, dated Nov. 29, 2018, 2 pages.
Decision to Grant received for Danish Patent Application No. PA201670753, dated Mar. 6, 2019, 2 pages.
Decision to Grant received for Danish Patent Application No. PA201670755, dated Mar. 6, 2019, 2 pages.
Decision to Grant received for Danish Patent Application No. PA201870362, dated May 15, 2020, 2 pages.
Decision to Grant received for Danish Patent Application No. PA201970601, dated Feb. 3, 2021, 2 pages.
Decision to Grant received for Danish Patent Application No. PA201970603, dated May 21, 2021, 2 pages.
Decision to Grant received for European Patent Application No. 15712218.5, dated Jun. 7, 2018, 2 pages.
Decision to Grant received for European Patent Application No. 18176890.4, dated Jul. 9, 2020, 3 pages.
Decision to Grant received for European Patent Application No. 18183054.8, dated Jan. 21, 2021, 3 pages.
Decision to Grant received for European Patent Application No. 18209460.7, dated Apr. 9, 2021, 2 pages.
Decision to Grant received for European Patent Application No. 18214698.5, dated Sep. 10, 2020, 3 pages.
Decision to Grant received for Japanese Patent Application No. 2018-243463, dated Aug. 17, 2020, 2 pages.
Decision to Grant received for Japanese Patent Application No. 2020-070418, dated Feb. 8, 2021, 3 pages.
Decision to Grant received for Japanese Patent Application No. 2020-184470, dated Jul. 1, 2021, 3 pages.
Decision to Grant received for Japanese Patent Application No. 2020-184471, dated Jul. 1, 2021, 3 pages.
Decision to Grant received for Japanese Patent Application No. 2021-051385, dated Jul. 8, 2021, 3 pages.
Decision to Refuse received for European Patent Application No. 17184710.6, dated Jun. 16, 2020, 9 pages.
Decision to Refuse received for European Patent Application No. 19724959.2, dated Jun. 22, 2021, 13 pages.
Decision to Refuse received for Japanese Patent Application No. 2018-225131, dated Jul. 8, 2019, 6 pages.
Decision to Refuse received for Japanese Patent Application No. 2018-243463, dated Jul. 8, 2019, 5 pages.
Decision to Refuse received for Japanese Patent Application No. 2018-545502, dated Jul. 8, 2019, 5 pages.
Digital Trends, "ModiFace Partners with Samsung to Bring AR Makeup to the Galaxy S9", Available online at: https://www.digitaltrends.com/mobile/modiface-samsung-partnership-ar-makeup-galaxy-s9/, 2018, 16 pages.
European Search Report received for European Patent Application No. 18209460.7, dated Mar. 15, 2019, 4 pages.
European Search Report received for European Patent Application No. 18214698.5, dated Mar. 21, 2019, 5 pages.
European Search Report received for European Patent Application No. 20206196.6, dated Dec. 8, 2020, 4 pages.
European Search Report received for European Patent Application No. 20206197.4, dated Nov. 30, 2020, 4 pages.
European Search Report received for European Patent Application No. 20210373.5, dated Apr. 13, 2021, 4 pages.
European Search Report received for European Patent Application No. 21157252.4, dated Apr. 16, 2021, 4 pages.
European Search Report received for European Patent Application No. 21163791.3, dated May 6, 2021, 5 pages.
Examiner Initiated-Interview Summary received for U.S. Appl. No. 16/528,941, dated Dec. 1, 2020, 2 pages.
Examiner's Answer to Appeal Brief received for U.S. Appl. No. 15/995,040, dated Jun. 23, 2021, 31 pages.
Examiner's Answer to Appeal Brief received for U.S. Appl. No. 16/144,629, dated Jul. 21, 2021, 21 pages.
Extended European Search Report (includes Supplementary European Search Report and Search Opinion) received for European Patent Application No. 17184710.6, dated Nov. 28, 2017, 10 pages.
Extended European Search Report received for European Patent Application No. 16784025.5, dated Apr. 16, 2018, 11 pages.
Extended European Search Report received for European Patent Application No. 19204230.7, dated Feb. 21, 2020, 7 pages.
Extended European Search Report received for European Patent Application No. 20166552.8, dated Jun. 12, 2020, 9 pages.
Extended European Search Report received for European Patent Application No. 20168009.7, dated Sep. 11, 2020, 12 pages.
Extended European Search Report received for European Patent Application No. 20205496.1, dated Mar. 11, 2021, 11 pages.
Extended Search Report received for European Patent Application 17809168.2, dated Jun. 28, 2018, 9 pages.
Fedko Daria, "AR Hair Styles", Online Available at <https://www.youtube.com/watch?v=FrS6tHRbFE0>, Jan. 24, 2017, 2 pages.
Feng et al., "3D Direct Human-Computer Interface Paradigm Based on Free Hand Tracking", Chinese Journal of Computers, vol. 37, No. 6, Jun. 30, 2014, 15 pages.
Final Office Action received for U.S. Patent Application No. 15/268,115, dated Oct. 11, 2017, 48 pages.
Final Office Action received for U.S. Appl. No. 15/728,147, dated Aug. 29, 2018, 39 pages.
Final Office Action received for U.S. Appl. No. 15/728,147, dated May 28, 2019, 45 pages.
Final Office Action received for U.S. Appl. No. 15/995,040, dated Oct. 17, 2019, 20 pages.
Final Office Action received for U.S. Appl. No. 15/995,040, dated Sep. 2, 2020, 21 pages.
Final Office Action received for U.S. Appl. No. 16/143,396, dated Jun. 20, 2019, 14 pages.
Final Office Action received for U.S. Appl. No. 16/144,629, dated Sep. 11, 2020, 22 pages.

(56) References Cited

OTHER PUBLICATIONS

Final Office Action received for U.S. Appl. No. 16/144,629, dated Sep. 18, 2019, 22 pages.
Final Office Action received for U.S. Appl. No. 16/271,583, dated Aug. 26, 2020, 18 pages.
Final Office Action received for U.S. Appl. No. 16/528,941, dated Jul. 13, 2020, 15 pages.
Franks Tech Help,"DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gadgets Portal, "Galaxy J5 Prime Camera Review! (vs J7 Prime) 4K", Available Online at: https://www.youtube.com/watch?v=Rf2Gy8QmDqc, Oct. 24, 2016, 3 pages.
Gavin's Gadgets, "Honor 10 Camera App Tutorial—How to use All Modes + 90 Photos Camera Showcase", See Especially 2:58-4:32, Available Online at <https://www.youtube.com/watch?v=M5XZwXJcK74>, May 26, 2018, 3 pages.
Gibson Andrews, "Aspect Ratio: What it is and Why it Matters", Retrieved from <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
GSM Arena, "Honor 10 Review: Camera", Available Online at: <https://web.archive.org/web/20180823142417/https://www.gsmarena.com/honor_10-review-1771p5.php>, Aug. 23, 2018, 11 pages.
Hall Brent, "Samsung Galaxy Phones Pro Mode (S7/S8/S9/Note 8/Note 9): When, why, & How yo Use It", See Especially 3:18-5:57, Available Online at <https://www.youtube.com/watch?v=KwPxGUDRkTg>, Jun. 19, 2018, 3 pages.
Helpvideostv, "How to Use Snap Filters on Snapchat", Retrieved from <https://www.youtube.com/watch?v=oR-7cIWPszU&feature=youtu.be>, Mar. 22, 2017, pp. 1-2.
Hernández Carlos, "Lens Blur in the New Google Camera App", Available online at: https://research.googleblog.com/2014/04/lens-blur-in-new-google-camera-app.html, https://ai.googleblog.com/2014/04/lens-blur-in-new-google-camera-app.html, Apr. 16, 2014, 6 pages.
Huawei Mobile PH, "Huawei P10 Tips & Tricks: Compose Portraits with Wide Aperture (Bokeh)", Available Online at <https://www.youtube.com/watch?v=WM4yo5-hrrE>, Mar. 30, 2017, 2 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
Imagespacetv, "Olympus OM-D E-M1 Mark II—Highlights & Shadows with Gavin Hoey", Online available at: https://www.youtube.com/watch?v=goEhh1n--hQ, Aug. 3, 2018, 3 pages.
Intention to Grant received for Danish Patent Application No. PA201570788, dated Mar. 27, 2017, 2 pages.
Intention to Grant received for Danish Patent Application No. PA201570791, dated Mar. 7, 2017, 2 pages.
Intention to Grant received for Danish Patent Application No. PA201670627, dated Jun. 11, 2018, 2 pages.
Intention to Grant received for Danish Patent Application No. PA201670753, dated Oct. 29, 2018, 2 pages.
Intention to Grant received for Danish Patent Application No. PA201670755, dated Nov. 13, 2018, 2 pages.
Intention to Grant received for Danish Patent Application No. PA201870362, dated Feb. 14, 2020, 2 pages.
Intention to Grant received for Danish Patent Application No. PA201970593, dated Apr. 13, 2021, 2 pages.
Intention to Grant received for Danish Patent Application No. PA201970601, dated Sep. 21, 2020, 2 pages.
Intention to Grant received for Danish Patent Application No. PA201970603, dated Jan. 13, 2021, 2 pages.
Intention to Grant received for Danish Patent Application No. PA202070611, dated May 5, 2021, 2 pages.
Intention to Grant received for European Patent Application No. 15712218.5, dated Jan. 24, 2018, 7 pages.
Intention to Grant received for European Patent Application No. 16784025.5, dated Jul. 15, 2021, 8 pages.
Intention to Grant received for European Patent Application No. 17809168.2, dated Jun. 25, 2021, 8 pages.
Intention to Grant received for European Patent Application No. 18176890.4, dated Feb. 28, 2020, 8 pages.
Intention to Grant received for European Patent Application No. 18183054.8, dated Nov. 5, 2020, 6 pages.
Intention to Grant received for European Patent Application No. 18209460.7, dated Jan. 15, 2021, 8 pages.
Intention to Grant received for European Patent Application No. 18214698.5, dated Apr. 21, 2020, 8 pages.
International Preliminary Report on Patentability and Written Opinion received for PCT Application No. PCT/US2016/029030, dated Nov. 2, 2017, 35 pages.
International Preliminary Report on Patentability received for PCT Patent Application No. PCT/US2015/019298, dated Mar. 16, 2017, 12 pages.
International Preliminary Report on Patentability received for PCT Patent Application No. PCT/US2017/035321, dated Dec. 27, 2018, 11 pages.
International Preliminary Report on Patentability received for PCT Patent Application No. PCT/US2018/015591, dated Dec. 19, 2019, 10 pages.
International Preliminary Report on Patentability received for PCT Patent Application No. PCT/US2018/048151, dated Apr. 9, 2020, 14 pages.
International Preliminary Report on Patentability received for PCT Patent Application No. PCT/US2019/017363, dated Aug. 20, 2020, 9 pages.
International Preliminary Report on Patentability received for PCT Patent Application No. PCT/US2019/024067, dated Nov. 19, 2020, 12 pages.
International Preliminary Report on Patentability received for PCT Patent Application No. PCT/US2019/031202, dated Nov. 19, 2020, 13 pages.
International Preliminary Report on Patentability received for PCT Patent Application No. PCT/US2019/049101, dated Mar. 25, 2021, 17 pages.
International Search Report & Written Opinion received for PCT Patent Application No. PCT/US2016/029030, dated Aug. 5, 2016, 37 pages.
International Search Report and Written Opinion received for PCT Patent Application No. PCT/US2015/019298, dated Jul. 13, 2015, 17 pages.
International Search Report and Written Opinion received for PCT Patent Application No. PCT/US2017/035321, dated Oct. 6, 2017, 15 pages.
International Search Report and Written Opinion received for PCT Patent Application No. PCT/US2018/015591, dated Jun. 14, 2018, 14 pages.
International Search Report and Written Opinion received for PCT Patent Application No. PCT/US2018/048151, dated Jan. 10, 2019, 23 pages.
International Search Report and Written Opinion received for PCT Patent Application No. PCT/US2019/017363, dated Aug. 12, 2019, 12 pages.
International Search Report and Written Opinion received for PCT Patent Application No. PCT/US2019/024067, dated Oct. 9, 2019, 18 pages.
International Search Report and Written Opinion received for PCT Patent Application No. PCT/US2019/031202, dated Oct. 4, 2019, 19 pages.
International Search Report and Written Opinion received for PCT Patent Application No. PCT/US2019/049101, dated Dec. 16, 2019, 26 pages.

(56) References Cited

OTHER PUBLICATIONS

International Search Report and Written Opinion received for PCT Patent Application No. PCT/US2020/031643, dated Dec. 2, 2020, 33 pages.
International Search Report and Written Opinion received for PCT Patent Application No. PCT/US2020/031643, dated Nov. 2, 2020, 34 pages.
Invitation to Pay Addition Fees received for PCT Patent Application No. PCT/US2017/035321, dated Aug. 17, 2017, 3 pages.
Invitation to Pay Additional Fees and Partial International Search Report received for PCT Patent Application No. PCT/US2019/049101, dated Oct. 24, 2019, 17 pages.
Invitation to Pay Additional Fees received for PCT Patent Application No. PCT/US2018/048151, dated Nov. 6, 2018, 18 pages.
Invitation to Pay Additional Fees received for PCT Patent Application No. PCT/US2019/017363, dated Jun. 17, 2019, 8 pages.
Invitation to Pay Additional Fees received for PCT Patent Application No. PCT/US2019/024067, dated Jul. 16, 2019, 13 pages.
Invitation to Pay Additional Fees received for PCT Patent Application No. PCT/US2019/031202, dated Aug. 8, 2019, 12 pages.
Invitation to Pay Additional Fees received for PCT Patent Application No. PCT/US2020/031643, dated Sep. 9, 2020, 30 pages.
Invitation to Pay Search Fees received for European Patent Application No. 18704732.9, dated Jun. 2, 2021, 3 pages.
Invitation to Pay Search Fees received for European Patent Application No. 19724959.2, dated Feb. 25, 2020, 3 pages.
"iPhone User Guide for iOS 4.2 and 4.3 Software", Available at: https://manuals.info.apple.com/Manuals/1000/MA1539/en_US/iPhone_iOS4_User_Guide.pdf, 2011, 274 pages.
Johnson Dave, "What is the Clips app on an iPhone?': How to use your iPhone's free video-editing app, and make custom videos for social media", Available online at: https://www.businessinsidercom/what-is-clips-on-iphone?IR=T, Oct. 26, 2019, 14 pages.
KK World, "Redmi Note 7 Pro Night Camera Test I Night Photography with Night Sight & Mode", Online Available at: https:/lwww.youtube.com/watch?v=3EKjGBjX3PY, Mar. 26, 2019, 4 pages.
Kozak Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Lang Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Minutes of the Oral Proceedings received for European Patent Application No. 19724959.2, mailed on Jun. 14, 2021, 6 pages.
Minutes of the Oral Proceedings received for European Patent Application No. 19729395.4, mailed on Jul. 21, 2021, 6 pages.
Mobiscrub, "Galaxy S4 mini camera review", Available Online at: https://www.youtube.com/watch?v=KYKOydw8QT8, Aug. 10, 2013, 3 pages.
Mobiscrub, "Samsung Galaxy S5 Camera Review—Hd Video", Available Online on: https://www.youtube.com/watch?v=BFgwDtNKMjg, Mar. 27,2014, 3 pages.
Modifacechannel, "Sephora 3D Augmented Reality Mirror", Available Online at: https://www.youtube.com/watch?v=wwBO4PU9EXI, May 15, 2014, 1 page.
Neurotechnology, "Sentimask Sdk", Available at: https://www.neurotechnology.com/sentimask.html, Apr. 22, 2018, 5 pages.
Non-Final Office Action received for U.S. Appl. No. 16/035,422, dated Nov. 30, 2018, 13 pages.
Non-Final Office Action received for U.S. Appl. No. 17/157,166, dated Jul. 9, 2021, 12 pages.
Non-Final Office Action received for U.S. Appl. No. 14/869,807, dated Dec. 2, 2016, 23 pages.
Non-Final Office Action received for U.S. Appl. No. 15/136,323, dated Apr. 6, 2017, 27 pages.
Non-Final Office Action received for U.S. Appl. No. 15/268,115, dated Apr. 13, 2017, 44 pages.
Non-Final Office Action received for U.S. Appl. No. 15/273,522, dated Nov. 30, 2016, 15 pages.
Non-Final Office Action received for U.S. Appl. No. 15/273,544, dated May 25, 2017, 18 pages.
Non-Final Office Action received for U.S. Appl. No. 15/728,147, dated Feb. 22, 2018, 20 pages.
Non-Final Office Action received for U.S. Appl. No. 15/728,147, dated Jan. 31, 2019, 41 pages.
Non-Final Office Action received for U.S. Appl. No. 15/863,369, dated Apr. 4, 2018, 15 pages.
Non-Final Office Action received for U.S. Appl. No. 15/995,040, dated Apr. 15, 2020, 19 pages.
Non-Final Office Action received for U.S. Appl. No. 15/995,040, dated May 16, 2019, 24 pages.
Non-Final Office Action received for U.S. Appl. No. 16/109,552, dated Oct. 17, 2018, 16 pages.
Non-Final Office Action received for U.S. Appl. No. 16/143,097, dated Feb. 28, 2019, 17 pages.
Non-Final Office Action received for U.S. Appl. No. 16/143,396, dated Jan. 7, 2019, 13 pages.
Non-Final Office Action received for U.S. Appl. No. 16/144,572, dated Nov. 30, 2018, 8 pages.
Non-Final Office Action received for U.S. Appl. No. 16/144,629, dated Mar. 13, 2020, 24 pages.
Non-Final Office Action received for U.S. Appl. No. 16/144,629, dated Mar. 29, 2019, 18 pages.
Non-Final Office Action received for U.S. Appl. No. 16/271,583, dated May 6, 2020, 24 pages.
Non-Final Office Action received for U.S. Appl. No. 16/271,583, dated Nov. 29, 2019, 18 pages.
Non-Final Office Action received for U.S. Appl. No. 16/383,403, dated Aug. 23, 2019, 10 pages.
Non-Final Office Action received for U.S. Appl. No. 16/528,941, dated Dec. 7, 2020, 15 pages.
Non-Final Office Action received for U.S. Appl. No. 16/528,941, dated Jan. 30, 2020, 14 pages.
Non-Final Office Action received for U.S. Appl. No. 16/582,595, dated Nov. 26, 2019, 17 pages.
Non-Final Office Action received for U.S. Appl. No. 16/583,020, dated Nov. 14, 2019, 9 pages.
Non-Final Office Action received for U.S. Appl. No. 16/599,433, dated Jan. 28, 2021, 16 pages.
Non-Final Office Action received for U.S. Appl. No. 16/733,718, dated Sep. 16, 2020, 25 pages.
Non-Final Office Action received for U.S. Appl. No. 16/790,619, dated May 4, 2020, 13 pages.
Non-Final Office Action received for U.S. Appl. No. 16/799,481, dated May 1, 2020, 13 pages.
Non-Final Office Action received for U.S. Appl. No. 16/825,879, dated May 5, 2021, 12 pages.
Non-Final Office Action received for U.S. Appl. No. 17/027,317, dated Nov. 17, 2020, 17 pages.
Non-Final Office Action received for U.S. Appl. No. 17/121,610, dated May 13, 2021, 17 pages.
Notice of Acceptance received for Australian Patent Application No. 2016252993, dated Dec. 19, 2017, 3 pages.
Notice of Acceptance received for Australian Patent Application No. 2017286130, dated Apr. 26, 2019, 3 pages.
Notice of Acceptance received for Australian Patent Application No. 2018279787, dated Dec. 10, 2019, 3 pages.
Notice of Acceptance received for Australian Patent Application No. 2019213341, dated Aug. 25, 2020, 3 pages.
Notice of Acceptance received for Australian Patent Application No. 2019266049, dated Nov. 24, 2020, 3 pages.
Notice of Acceptance received for Australian Patent Application No. 2019266225, dated Dec. 23, 2020, 3 pages.
Notice of Acceptance received for Australian Patent Application No. 2020201969, dated Mar. 26, 2021, 3 pages.
Notice of Acceptance received for Australian Patent Application No. 2020267151, dated Dec. 9, 2020, 3 pages.
Notice of Acceptance received for Australian Patent Application No. 2020277216, dated Mar. 15, 2021, 3 pages.

(56) References Cited

OTHER PUBLICATIONS

Notice of Acceptance received for Australian Patent Application No. 2021200789, dated Feb. 26, 2021, 3 pages.
Notice of Acceptance received for Australian Patent Application No. 2021201167, dated Mar. 15, 2021, 3 pages.
Notice of Acceptance received for Australian Patent Application No. 2021203210, dated Jul. 9, 2021, 3 pages.
Notice of Allowance received for Brazilian Patent Application No. 112018074765-3, dated Oct. 8, 2019, 2 pages.
Notice of Allowance received for Chinese Patent Application No. 201580046237.6, dated Aug. 29, 2018, 4 pages.
Notice of Allowance received for Chinese Patent Application No. 201680023520.1, dated Jun. 28, 2019, 2 pages.
Notice of Allowance received for Chinese Patent Application No. 201710657424.9, dated May 8, 2020, 2 pages.
Notice of Allowance received for Chinese Patent Application No. 201780002533.5, dated Apr. 14, 2020, 2 pages.
Notice of Allowance received for Chinese Patent Application No. 201810566134.8, dated Apr. 7, 2020, 3 pages.
Notice of Allowance received for Chinese Patent Application No. 201810664927.3, dated Jul. 19, 2019, 2 pages.
Notice of Allowance received for Chinese Patent Application No. 201811512767.7, dated Jul. 27, 2020, 4 pages.
Notice of Allowance received for Chinese Patent Application No. 201880056514.5, dated Jan. 11, 2021, 2 pages.
Notice of Allowance received for Chinese Patent Application No. 201910400180.5, dated Nov. 5, 2020, 2 pages.
Notice of Allowance received for Chinese Patent Application No. 201910692978.1, dated Feb. 4, 2021, 6 pages.
Notice of Allowance received for Chinese Patent Application No. 201910864074.2, dated Mar. 10, 2021, 2 pages.
Notice of Allowance received for Chinese Patent Application No. 201911202668.3, dated Feb. 4, 2021, 5 pages.
Notice of Allowance received for Chinese Patent Application No. 201911219525.3, dated Sep. 29, 2020, 2 pages.
Notice of Allowance received for Chinese Patent Application No. 202010287953.6, dated Mar. 18, 2021, 7 pages.
Notice of Allowance received for Chinese Patent Application No. 202010287961.0, dated Mar. 9, 2021, 8 pages.
Notice of Allowance received for Chinese Patent Application No. 202010287975.2, dated Mar. 1, 2021, 7 pages.
Notice of Allowance received for Japanese Patent Application No. 2018-171188, dated Jul. 16, 2019, 3 pages.
Notice of Allowance received for Japanese Patent Application No. 2018-183504, dated Sep. 27, 2019, 4 pages.
Notice of Allowance received for Korean Patent Application No. 10-2018-7026743, dated Mar. 20, 2019, 7 pages.
Notice of Allowance received for Korean Patent Application No. 10-2018-7028849, dated Feb. 1, 2019, 4 pages.
Notice of Allowance received for Korean Patent Application No. 10-2018-7034780, dated Jun. 19, 2019, 4 pages.
Notice of Allowance received for Korean Patent Application No. 10-2018-7036893, dated Jun. 12, 2019, 4 pages.
Notice of Allowance received for Korean Patent Application No. 10-2019-7027042, dated Nov. 26, 2020, 4 pages.
Notice of Allowance received for Korean Patent Application No. 10-2019-7035478, dated Apr. 24, 2020, 4 pages.
Notice of Allowance received for Korean Patent Application No. 10-2020-0052618, dated Mar. 23, 2021, 5 pages.
Notice of Allowance received for Korean Patent Application No. 10-2020-0143726, dated Nov. 10, 2020, 5 pages.
Notice of Allowance received for Korean Patent Application No. 10-2020-0155924, dated Nov. 23, 2020, 7 pages.
Notice of Allowance received for Korean Patent Application No. 10-2020-7021870, dated Apr. 26, 2021, 4 pages.
Notice of Allowance received for Korean Patent Application No. 10-2020-7031855, dated Mar. 22, 2021, 5 pages.
Notice of Allowance received for Korean Patent Application No. 10-2020-7032110, dated Mar. 8, 2021, 4 pages.
Notice of Allowance received for Korean Patent Application No. 10-2021-7019525, dated Jul. 13, 2021, 5 pages.
Notice of Allowance received for Taiwanese Patent Application No. 104107328, dated Jun. 12, 2017, 3 pages.
Notice of Allowance received for U.S. Appl. No. 16/035,422, dated Apr. 10, 2019, 6 pages.
Notice of Allowance received for U.S. Appl. No. 16/528,941, dated Aug. 10, 2021, 5 pages.
Notice of Allowance received for U.S. Appl. No. 16/528,941, dated May 19, 2021, 5 pages.
Notice of Allowance received for U.S. Appl. No. 14/641,251, dated May 18, 2016, 13 pages.
Notice of Allowance received for U.S. Appl. No. 14/869,807, dated Jun. 21, 2017, 9 pages.
Notice of Allowance received for U.S. Appl. No. 14/869,807, dated Oct. 10, 2017, 9 pages.
Notice of Allowance received for U.S. Appl. No. 15/136,323, dated Feb. 28, 2016, 9 pages.
Notice of Allowance received for U.S. Appl. No. 15/136,323, dated Oct. 12, 2017, 8 pages.
Notice of Allowance received for U.S. Appl. No. 15/268,115, dated Mar. 7, 2018, 15 pages.
Notice of Allowance received for U.S. Appl. No. 15/273,453, dated Oct. 12, 2017, 11 pages.
Notice of Allowance received for U.S. Appl. No. 15/273,503, dated Aug. 14, 2017, 9 pages.
Notice of Allowance received for U.S. Appl. No. 15/273,522, dated Mar. 28, 2017, 9 pages.
Notice of Allowance received for U.S. Appl. No. 15/273,522, dated May 19, 2017, 2 pages.
Notice of Allowance received for U.S. Appl. No. 15/273,522, dated May 23, 2017, 2 pages.
Notice of Allowance received for U.S. Appl. No. 15/273,544, dated Mar. 13, 2018, 8 pages.
Notice of Allowance received for U.S. Appl. No. 15/273,544, dated Oct. 27, 2017, 8 pages.
Notice of Allowance received for U.S. Appl. No. 15/728,147, dated Aug. 19, 2019, 13 pages.
Notice of Allowance received for U.S. Appl. No. 15/858,175, dated Jun. 1, 2018, 8 pages.
Notice of Allowance received for U.S. Appl. No. 15/858,175, dated Sep. 12, 2018, 8 pages.
Notice of Allowance received for U.S. Appl. No. 15/863,369, dated Jun. 28, 2018, 8 pages.
Notice of Allowance received for U.S. Appl. No. 15/975,581, dated Oct. 3, 2018, 25 pages.
Notice of Allowance received for U.S. Appl. No. 16/109,552, dated Mar. 13, 2019, 25 pages.
Notice of Allowance received for U.S. Appl. No. 16/109,552, dated May 13, 2019, 2 pages.
Notice of Allowance received for U.S. Appl. No. 16/110,514, dated Apr. 29, 2019, 9 pages.
Notice of Allowance received for U.S. Appl. No. 16/110,514, dated Mar. 13, 2019, 11 pages.
Notice of Allowance received for U.S. Appl. No. 16/143,097, dated Aug. 29, 2019, 23 pages.
Notice of Allowance received for U.S. Appl. No. 16/143,201, dated Feb. 8, 2019, 9 pages.
Notice of Allowance received for U.S. Appl. No. 16/143,201, dated Nov. 28, 2018, 14 pages.
Notice of Allowance received for U.S. Appl. No. 16/143,396, dated Nov. 27, 2019, 8 pages.
Notice of Allowance received for U.S. Appl. No. 16/144,572, dated Feb. 28, 2019, 7 pages.
Notice of Allowance received for U.S. Appl. No. 16/147,432, dated Dec. 18, 2018, 13 pages.
Notice of Allowance received for U.S. Appl. No. 16/147,432, dated May 20, 2019, 6 pages.
Notice of Allowance received for U.S. Appl. No. 16/191,117, dated Oct. 29, 2019, 9 pages.
Notice of Allowance received for U.S. Appl. No. 16/271,583, dated Apr. 14, 2021, 6 pages.

(56) References Cited

OTHER PUBLICATIONS

Notice of Allowance received for U.S. Appl. No. 16/271,583, dated Dec. 9, 2020, 6 pages.
Notice of Allowance received for U.S. Appl. No. 16/271,583, dated Jul. 23, 2021, 6 pages.
Notice of Allowance received for U.S. Appl. No. 16/271,583, dated May 10, 2021, 3 pages.
Notice of Allowance received for U.S. Appl. No. 16/383,403, dated Jan. 10, 2020, 11 pages.
Notice of Allowance received for U.S. Appl. No. 16/511,578, dated Nov. 18, 2019, 12 pages.
Notice of Allowance received for U.S. Appl. No. 16/582,595, dated Mar. 20, 2020, 9 pages.
Notice of Allowance received for U.S. Appl. No. 16/583,020, dated Apr. 1, 2020, 5 pages.
Notice of Allowance received for U.S. Appl. No. 16/583,020, dated Feb. 28, 2020, 5 pages.
Notice of Allowance received for U.S. Appl. No. 16/584,044, dated Dec. 11, 2019, 15 pages.
Notice of Allowance received for U.S. Appl. No. 16/584,044, dated Mar. 30, 2020, 16 pages.
Notice of Allowance received for U.S. Appl. No. 16/584,044, dated Nov. 14, 2019, 13 pages.
Notice of Allowance received for U.S. Appl. No. 16/584,100, dated Apr. 8, 2020, 12 pages.
Notice of Allowance received for U.S. Appl. No. 16/584,100, dated Jan. 14, 2020, 13 pages.
Notice of Allowance received for U.S. Appl. No. 16/584,693, dated Jan. 15, 2020, 15 pages.
Notice of Allowance received for U.S. Appl. No. 16/584,693, dated May 4, 2020, 12 pages.
Notice of Allowance received for U.S. Appl. No. 16/586,314, dated Apr. 1, 2020, 8 pages.
Notice of Allowance received for U.S. Appl. No. 16/586,314, dated Jan. 9, 2020, 10 pages.
Notice of Allowance received for U.S. Appl. No. 16/586,344, dated Dec. 16, 2019, 12 pages.
Notice of Allowance received for U.S. Appl. No. 16/586,344, dated Mar. 27, 2020, 12 pages.
Notice of Allowance received for U.S. Appl. No. 16/599,433, dated May 14, 2021, 11 pages.
Notice of Allowance received for U.S. Appl. No. 16/733,718, dated Feb. 5, 2021, 14 pages.
Notice of Allowance received for U.S. Appl. No. 16/790,619, dated Sep. 8, 2020, 6 pages.
Notice of Allowance received for U.S. Appl. No. 16/799,481, dated Sep. 8, 2020, 6 pages.
Notice of Allowance received for U.S. Appl. No. 16/825,879, dated Jul. 13, 2021, 9 pages.
Notice of Allowance received for U.S. Appl. No. 16/835,651, dated Jul. 23, 2021, 8 pages.
Notice of Allowance received for U.S. Appl. No. 16/835,651, dated Jun. 1, 2021, 10 pages.
Notice of Allowance received for U.S. Appl. No. 16/840,719, dated Apr. 30, 2021, 13 pages.
Notice of Allowance received for U.S. Appl. No. 17/027,317, dated Apr. 12, 2021, 7 pages.
Notice of Allowance received for U.S. Appl. No. 17/027,317, dated Jan. 13, 2021, 10 pages.
Notice of Allowance received for U.S. Appl. No. 17/027,484, dated May 3, 2021, 11 pages.
Office Action received for Australian Patent Application No. 2017100683, dated Sep. 20, 2017, 3 pages.
Office Action received for Australian Patent Application No. 2017100684, dated Jan. 24, 2018, 4 pages.
Office Action received for Australian Patent Application No. 2017100684, dated Oct. 5, 2017, 4 pages.
Office Action Received for Australian Patent Application No. 2017286130, dated Jan. 21, 2019, 4 pages.
Office Action received for Australian Patent Application No. 2019100499, dated Jun. 28, 2019, 4 pages.
Office Action received for Australian Patent Application No. 2019100794, dated Oct. 3, 2019, 4 pages.
Office Action received for Australian Patent Application No. 2019101062, dated Apr. 22, 2020, 2 pages.
Office Action received for Australian Patent Application No. 2019101062, dated Dec. 5, 2019, 3 pages.
Office Action received for Australian Patent Application No. 2019213341, dated Jun. 30, 2020, 6 pages.
Office Action received for Australian Patent Application No. 2019218241, dated Apr. 1, 2021, 3 pages.
Office Action received for Australian Patent Application No. 2019266225, dated Nov. 23, 2020, 4 pages.
Office Action received for Australian Patent Application No. 2020100189, dated Apr. 1, 2020, 3 pages.
Office Action received for Australian Patent Application No. 2020100720, dated Jul. 9, 2020, 7 pages.
Office Action received for Australian Patent Application No. 2020100720, dated Sep. 1, 2020, 5 pages.
Office Action received for Australian Patent Application No. 2020101043, dated Aug. 14, 2020, 5 pages.
Office Action received for Australian Patent Application No. 2020101043, dated Oct. 30, 2020, 4 pages.
Office Action received for Australian Patent Application No. 2020201969, dated Sep. 25, 2020, 5 pages.
Office Action received for Australian Patent Application No. 2020239717, dated Jun. 23, 2021, 7 pages.
Office Action received for Australian Patent Application No. 2020260413, dated Jun. 24, 2021, 2 pages.
Office Action received for Australian Patent Application No. 2020277216, dated Dec. 17, 2020, 5 pages.
Office Action received for Chinese Patent Application No. 201580046237.6, dated Feb. 6, 2018, 10 pages.
Office Action received for Chinese Patent Application No. 201680023520.1, dated Jan. 3, 2019, 10 pages.
Office Action received for Chinese Patent Application No. 201710657424.9, dated Sep. 17, 2019, 23 pages.
Office Action received for Chinese Patent Application No. 201780002533.5, dated Apr. 25, 2019, 17 pages.
Office Action received for Chinese Patent Application No. 201780002533.5, dated Feb. 3, 2020, 6 pages.
Office Action received for Chinese Patent Application No. 201780002533.5, dated Sep. 26, 2019, 21 pages.
Office Action received for Chinese Patent Application No. 201810566134.8, dated Aug. 13, 2019, 14 pages.
Office Action received for Chinese Patent Application No. 201810664927.3, dated Mar. 28, 2019, 11 pages.
Office Action received for Chinese Patent Application No. 201811446867.4, dated Dec. 31, 2019, 12 pages.
Office Action received for Chinese Patent Application No. 201811446867.4, dated May 6, 2020, 10 pages.
Office Action received for Chinese Patent Application No. 201811446867.4, dated Sep. 8, 2020, 9 pages.
Office Action received for Chinese Patent Application No. 201811512767.7, dated Dec. 20, 2019, 14 pages.
Office Action received for Chinese Patent Application No. 201811512767.7, dated Jun. 4, 2020, 6 pages.
Office Action received for Chinese Patent Application No. 201880056514.5, dated Sep. 2, 2020, 7 pages.
Office Action received for Chinese Patent Application No. 201910400180.5, dated Jun. 1, 2020, 11 pages.
Office Action received for Chinese Patent Application No. 201910692978.1, dated Apr. 3, 2020, 19 pages.
Office Action received for Chinese Patent Application No. 201910692978.1, dated Nov. 4, 2020, 4 pages.
Office Action received for Chinese Patent Application No. 201910704856.X, dated Apr. 6, 2021, 13 pages.
Office Action received for Chinese Patent Application No. 201910704856.X, dated Dec. 9, 2020, 23 pages.
Office Action received for Chinese Patent Application No. 201910704856.X, dated May 27, 2020, 26 pages.

(56) References Cited

OTHER PUBLICATIONS

Office Action received for Chinese Patent Application No. 201910864074.2, dated Sep. 23, 2020, 11 pages.
Office Action received for Chinese Patent Application No. 201911202668.3, dated Aug. 4, 2020, 13 pages.
Office Action received for Chinese Patent Application No. 201911219525.3, dated Jul. 10, 2020, 7 pages.
Office Action received for Chinese Patent Application No. 202010126661.4, dated Feb. 3, 2021, 16 pages.
Office Action received for Chinese Patent Application No. 202010218168.5, dated Feb. 9, 2021, 21 pages.
Office Action received for Chinese Patent Application No. 202010287950.2, dated Feb. 20, 2021, 22 pages.
Office Action received for Chinese Patent Application No. 202010287953.6, dated Jan. 14, 2021, 14 pages.
Office Action received for Chinese Patent Application No. 202010287958.9, dated Jan. 5, 2021, 16 pages.
Office Action received for Chinese Patent Application No. 202010287961.0, dated Dec. 30, 2020, 16 pages.
Office Action received for Chinese Patent Application No. 202010287975.2, dated Dec. 30, 2020, 17 pages.
Office Action received for Chinese Patent Application No. 202010600151.6, dated Apr. 29, 2021, 11 pages.
Office Action received for Chinese Patent Application No. 202010601484.0, dated Jun. 3, 2021, 13 pages.
Office Action received for Chinese Patent Application No. 202011243876.0, dated Apr. 6, 2021, 11 pages.
Office Action received for Danish Patent Application No. PA201570788, dated Apr. 8, 2016, 11 pages.
Office Action received for Danish Patent Application No. PA201570788, dated Sep. 13, 2016, 3 pages.
Office action received for Danish Patent Application No. PA201570791, dated Apr. 6, 2016, 12 pages.
Office action received for Danish Patent Application No. PA201570791, dated Sep. 6, 2016, 4 pages.
Office Action received for Danish Patent Application No. PA201670627, dated Apr. 5, 2017, 3 pages.
Office Action received for Danish Patent Application No. PA201670627, dated Nov. 6, 2017, 2 pages.
Office Action received for Danish Patent Application No. PA201670627, dated Oct. 11, 2016, 8 pages.
Office Action received for Danish Patent Application No. PA201670753, dated Dec. 20, 2016, 7 pages.
Office Action received for Danish Patent Application No. PA201670753, dated Jul. 5, 2017, 4 pages.
Office Action received for Danish Patent Application No. PA201670753, dated Mar. 23, 2018, 5 pages.
Office Action received for Danish Patent Application No. PA201670755, dated Apr. 6, 2017, 5 pages.
Office Action received for Danish Patent Application No. PA201670755, dated Apr. 20, 2018, 2 pages.
Office Action received for Danish Patent Application No. PA201670755, dated Dec. 22, 2016, 6 pages.
Office Action received for Danish Patent Application No. PA201670755, dated Oct. 20, 2017, 4 pages.
Office Action received for Danish Patent Application No. PA201770563, dated Aug. 13, 2018, 5 pages.
Office Action received for Danish Patent Application No. PA201770563, dated Jan. 28, 2020, 3 pages.
Office Action received for Danish Patent Application No. PA201770563, dated Jun. 28, 2019, 5 pages.
Office Action received for Danish Patent Application No. PA201770719, dated Aug. 14, 2018, 6 pages.
Office Action received for Danish Patent Application No. PA201770719, dated Feb. 19, 2019, 4 pages.
Office Action received for Danish Patent Application No. PA201770719, dated Jan. 17, 2020, 4 pages.
Office Action received for Danish Patent Application No. PA201770719, dated Jun. 30, 2021, 3 pages.
Office Action received for Danish Patent Application No. PA201770719, dated Nov. 16, 2020, 5 pages.
Office Action received for Danish Patent Application No. PA201870362, dated Aug. 22, 2019, 4 pages.
Office Action received for Danish Patent Application No. PA201870362, dated Dec. 18, 2018, 2 pages.
Office Action received for Danish Patent Application No. PA201870363, dated Mar. 26, 2019, 3 pages.
Office Action received for Danish Patent Application No. PA201870364, dated Jan. 28, 2019, 8 pages.
Office Action received for Danish Patent Application No. PA201870364, dated Jun. 11, 2019, 11 pages.
Office Action received for Danish Patent Application No. PA201870366, dated Aug. 22, 2019, 3 pages.
Office Action received for Danish Patent Application No. PA201870366, dated Dec. 12, 2018, 3 pages.
Office Action received for Danish Patent Application No. PA201870367, dated Dec. 20, 2018, 5 pages.
Office Action received for Danish Patent Application No. PA201870368, dated Dec. 20, 2018, 5 pages.
Office Action received for Danish Patent Application No. PA201870368, dated Oct. 1, 2019, 6 pages.
Office Action received for Danish Patent Application No. PA201870623, dated Jan. 30, 2020, 2 pages.
Office Action received for Danish Patent Application No. PA201870623, dated Jul. 12, 2019, 4 pages.
Office Action received for Danish Patent Application No. PA201970592, dated Mar. 2, 2020, 5 pages.
Office Action received for Danish Patent Application No. PA201970592, dated Oct. 26, 2020, 5 pages.
Office Action received for Danish Patent Application No. PA201970593, dated Apr. 16, 2020, 2 pages.
Office Action received for Danish Patent Application No. PA201970593, dated Feb. 2, 2021, 2 pages.
Office Action received for Danish Patent Application No. PA201970593, dated Mar. 10, 2020, 4 pages.
Office Action received for Danish Patent Application No. PA201970595, dated Mar. 10, 2020, 4 pages.
Office Action received for Danish Patent Application No. PA201970600, dated Mar. 9, 2020, 5 pages.
Office Action received for Danish Patent Application No. PA201970601, dated Aug. 13, 2020, 3 pages.
Office Action received for Danish Patent Application No. PA201970601, dated Jan. 31, 2020, 3 pages.
Office Action received for Danish Patent Application No. PA201970601, dated Nov. 11, 2019, 8 pages.
Office Action received for Danish Patent Application No. PA201970603, dated Nov. 4, 2020, 3 pages.
Office Action received for Danish Patent Application No. PA201970605, dated Mar. 10, 2020, 5 pages.
Office Action received for Danish Patent Application No. PA202070611, dated Dec. 22, 2020, 7 pages.
Office Action received for European Patent Application 17809168.2, dated Jan. 7, 2020, 5 pages.
Office Action received for European Patent Application 17809168.2, dated Oct. 8, 2020, 4 pages.
Office Action received for European Patent Application No. 15712218.5, dated Aug. 3, 2017, 4 pages.
Office Action received for European Patent Application No. 16784025.5, dated Jul. 17, 2020, 6 pages.
Office Action received for European Patent Application No. 17184710.6, dated Dec. 21, 2018, 7 pages.
Office Action received for European Patent Application No. 18176890.4, dated Oct. 16, 2018, 8 pages.
Office Action received for European Patent Application No. 18183054.8, dated Feb. 24, 2020, 6 pages.
Office Action received for European Patent Application No. 18183054.8, dated Nov. 16, 2018, 8 pages.
Office Action received for European Patent Application No. 18209460.7, dated Apr. 10, 2019, 7 pages.
Office Action received for European Patent Application No. 18209460.7, dated Apr. 21, 2020, 5 pages.

(56) References Cited

OTHER PUBLICATIONS

Office Action received for European Patent Application No. 18214698.5, dated Apr. 2, 2019, 8 pages.
Office Action received for European Patent Application No. 18779093.6, dated Dec. 11, 2020, 4 pages.
Office Action received for European Patent Application No. 19204230.7, dated Sep. 28, 2020, 6 pages.
Office Action received for European Patent Application No. 19724959.2, dated Apr. 23, 2020, 10 pages.
Office Action received for European Patent Application No. 19729395.4, dated Jul. 15, 2020, 4 pages.
Office Action received for European Patent Application No. 19729395.4, dated Sep. 29, 2020, 10 pages.
Office Action received for European Patent Application No. 20166552.8, dated Mar. 24, 2021, 8 pages.
Office Action received for European Patent Application No. 20168009.7, dated Apr. 20, 2021, 6 pages.
Office Action received for European Patent Application No. 20206196.6, dated Jan. 13, 2021, 10 pages.
Office Action received for European Patent Application No. 20206197.4, dated Jan. 12, 2021, 9 pages.
Office Action received for European Patent Application No. 20210373.5, dated May 10, 2021, 9 pages.
Office Action received for European Patent Application No. 21157252.4, dated Apr. 23, 2021, 8 pages.
Office Action received for European Patent Application No. 21163791.3, dated Jun. 2, 2021, 8 pages.
Office Action received for Indian Patent Application No. 201814036470, dated Feb. 26, 2021, 7 pages.
Office Action received for Indian Patent Application No. 201917053025, dated Mar. 19, 2021, 7 pages.
Office Action received for Indian Patent Application No. 202018006172, dated May 5, 2021, 6 pages.
Office Action received for Japanese Patent Application No. 2018-182607, dated Apr. 6, 2020, 6 pages.
Office Action received for Japanese Patent Application No. 2018-182607, dated Jul. 20, 2020, 5 pages.
Office Action received for Japanese Patent Application No. 2018-225131, dated Aug. 17, 2020, 21 pages.
Office Action received for Japanese Patent Application No. 2018-225131, dated Mar. 4, 2019, 10 pages.
Office Action received for Japanese Patent Application No. 2018-545502, dated Aug. 17, 2020, 14 pages.
Office Action received for Japanese Patent Application No. 2019-194597, dated Jan. 18, 2021, 10 pages.
Office Action received for Japanese Patent Application No. 2020-070418, dated Aug. 3, 2020, 22 pages.
Office Action received for Japanese Patent Application No. 2020-184470, dated May 10, 2021, 3 pages.
Office Action received for Japanese Patent Application No. 2020-184471, dated May 10, 2021, 3 pages.
Office Action received for Japanese Patent Application No. 2020-193703, dated Apr. 19, 2021, 4 pages.
Office Action received for Korean Patent Application No. 10-2018-7026743, dated Jan. 17, 2019, 5 pages.
Office Action received for Korean Patent Application No. 10-2018-7034780, dated Apr. 4, 2019, 11 pages.
Office Action received for Korean Patent Application No. 10-2018-7036893, dated Apr. 9, 2019, 6 pages.
Office Action received for Korean Patent Application No. 10-2019-7027042, dated May 13, 2020, 6 pages.
Office Action received for Korean Patent Application No. 10-2019-7035478, dated Jan. 17, 2020, 17 pages.
Office Action received for Korean Patent Application No. 10-2020-0052618, dated Aug. 18, 2020, 11 pages.
Office Action received for Korean Patent Application No. 10-2020-7021870, dated Nov. 11, 2020, 11 pages.
Office Action received for Korean Patent Application No. 10-2020-7031855, dated Nov. 24, 2020, 6 pages.
Office Action received for Korean Patent Application No. 10-2020-7032110, dated Dec. 15, 2020, 6 pages.
Office Action received for Korean Patent Application No. 10-2021-0022053, dated Mar. 1, 2021, 11 pages.
Office Action received for Korean Patent Application No. 10-2021-7000954, dated Jan. 28, 2021, 5 pages.
Office Action received for Taiwanese Patent Application No. 104107328, dated Dec. 28, 2016, 4 pages.
Osxdaily, "How to Zoom the Camera on iPhone", Available Online at: https://osxdaily.com/2012/04/18/zoom-camera-iphone1, Apr. 18, 2012, 6 pages.
Paine Steve, "Samsung Galaxy Camera Detailed Overview—User Interface", Retrieved from: <https://www.youtube.com/watch?v=td8UYSySulo&feature=youtu.be>, Sep. 18, 2012, pp. 1-2.
PC World, "How to make AR Emojis on the Samsung Galaxy S9", You Tube, Available Online: https://www.youtube.com/watch?v=8wQICfulkz0, Feb. 25, 2018, 2 pages.
Peckham James, "What is Apple Clips? Plus we teach you how to use it", Available online at: https://www.techradar.com/how-to/what-is-apple-clips-and-how-to-use-it, Jul. 20, 2017, 11 pages.
Phonearena, "Sony Xperia Z5 camera app and UI overview", Retrieved from <https://www.youtube.com/watch?v=UtDzdTsmkfU&feature=youtu.be>, Sep. 8, 2015, pp. 1-3.
PlayMemories Camera Apps, "PlayMemories Camera Apps Help Guide", Available at: <https://www.playmemoriescameraapps.com/portal/manual/IS9104-NPIA09014_00-F00002/en/index.html>, 2012, 3 pages.
Pre-Appeal Review Report received for Japanese Patent Application No. 2018-182607, dated Jan. 21, 2021, 4 pages.
PreAppeal Review Report received for Japanese Patent Application No. 2018-225131, dated Jan. 24, 2020, 8 pages.
PreAppeal Review Report received for Japanese Patent Application No. 2018-545502, dated Jan. 24, 2020, 8 pages.
"Procamera Capture the Moment", Online Available at: http://www.procamera-app.com/procamera_manual/ProCamera_Manual_EN.pdf, Apr. 21, 2016, 63 pages.
"Remote Shot for SmartWatch 2", Available online at: https://play.google.com/store/apps/details?id=net.watea.sw2.rshot&hl=en, Nov. 21, 2017, 3 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Result of Consultation received for European Patent Application No. 19204230.7, mailed on Nov. 16, 2020, 3 pages.
Result of Consultation received for European Patent Application No. 19204230.7, mailed on Sep. 24, 2020, 5 pages.
Result of Consultation received for European Patent Application No. 19724959.2, mailed on Sep. 4, 2020, 3 pages.
Result of Consultation received for European Patent Application No. 19729395.4, mailed on Jun. 22, 2021, 3 pages.
Result of Consultation received for European Patent Application No. 19729395.4, mailed on Jun. 23, 2021, 3 pages.
Ritchie Rene, "Clips app: The ultimate guide", Available online at: https://www.imore.com/clips, May 13, 2017, 16 pages.
Rossignol Joe, "iOS 10 Concept Simplifies Lock Screen with Collapsed Notifications", Available online at: https://www.macrumors.com/2016/06/16/ios-10-collapsed-notifications-concept/, Jun. 16, 2016, 10 pages.
Schiffhauer Alexander, "See the Light with Night Sight", Available online at: https://www.blog.google/products/pixel/see-light-night-sight, Nov. 14, 2018, 6 pages.
Search Report and Opinion received for Danish Patent Application No. PA201770563, dated Oct. 10, 2017, 9 pages.
Search Report and Opinion received for Danish Patent Application No. PA201870362, dated Sep. 7, 2018, 9 pages.
Search Report and Opinion received for Danish Patent Application No. PA201870363, dated Sep. 11, 2018, 12 pages.
Search Report and Opinion received for Danish Patent Application No. PA201870364, dated Sep. 4, 2018, 12 pages.
Search Report and Opinion received for Danish Patent Application No. PA201870366, dated Aug. 27, 2018, 9 pages.

(56) References Cited

OTHER PUBLICATIONS

Search Report and Opinion received for Danish Patent Application No. PA201870367, dated Aug. 27, 2018, 9 pages.
Search Report and Opinion received for Danish Patent Application No. PA201870368, dated Sep. 6, 2018, 7 pages.
Search Report and Opinion received for Danish Patent Application No. PA201870623, dated Dec. 20, 2018, 8 pages.
Search Report and Opinion received for Danish Patent Application No. PA201970592, dated Nov. 7, 2019, 8 pages.
Search Report and Opinion received for Danish Patent Application No. PA201970593, dated Oct. 29, 2019, 10 pages.
Search Report and Opinion received for Danish Patent Application No. PA201970595, dated Nov. 8, 2019, 16 pages.
Search Report and Opinion received for Danish Patent Application No. PA201970600, dated Nov. 5, 2019, 11 pages.
Search Report and Opinion received for Danish Patent Application No. PA201970603, dated Nov. 15, 2019, 9 pages.
Search Report and Opinion received for Danish Patent Application No. PA201970605, dated Nov. 12, 2019, 10 pages.
Search Report received for Danish Patent Application No. PA201770719, dated Oct. 17, 2017, 9 pages.
Shaw et al., ""Skills for Closeups Photography"", Watson-Guptill Publications, Nov. 1999, 5 pages.
shiftdelete.net, "Oppo Reno 10× Zoom Ön Inceleme—Huawei P30 Pro'ya rakip mi geliyor?", Available online at <https://www.youtube.com/watch?v=ev2wlUztdrg>, See especially 5:34-6:05., Apr. 24, 2019, 2 pages.
Smart Reviews, "Honor10 AI Camera's in Depth Review", See Especially 2:37-2:48; 6:39-6:49, Available Online at <https://www.youtube.com/watch?v=oKFqRvxeDBQ>, May 31, 2018, 2 pages.
Snapchat Lenses, "How to Get All Snapchat Lenses Face Effect Filter on Android", Retrived from: <https://www.youtube.com/watch?v=0PfnF1RInfw&feature=youtu.be>, Sep. 21, 2015, pp. 1-2.
"Sony Xperia XZ3 Camera Review—The Colors, Duke, the Colors!", Android Headlines—Android News & Tech News, Available online at: <https://www.youtube.com/watch?v=mwpYXzWVOgw>, See especially 1:02-1:27, 2:282:30, Nov. 3, 2018, 3 pages.
Sony, "User Guide, Xperia XZ3, H8416/H9436/H9493", Sony Mobile Communications Inc., Retrieved from <https://www-support-downloads.sonymobile.com/h8416/userguide_EN_H8416-H9436-H9493_2_Android9.0.pdf>, See pp. 86-102, 2018, 121 pages.
Summons to Attend Oral Proceedings received for European Patent Application No. 17184710.6, dated Sep. 17, 2019, 7 pages.
Summons to Attend Oral Proceedings received for European Patent Application No. 19204230.7, dated May 25, 2021, 10 pages.
Summons to Attend Oral Proceedings received for European Patent Application No. 19724959.2, dated Feb. 1, 2021, 9 pages.
Summons to Attend Oral Proceedings received for European Patent Application No. 19724959.2, dated Mar. 31, 2021, 3 pages.
Summons to Attend Oral Proceedings received for European Patent Application No. 19729395.4, dated Mar. 11, 2021, 7 pages.
Summons to Attend Oral Proceedings received for European Patent Application No. 19729395.4, dated Mar. 19, 2021, 9 pages.
Supplemental Notice of Allowance received for U.S. Appl. No. 15/136,323, dated Jan. 31, 2018, 6 pages.
Supplemental Notice of Allowance received for U.S. Appl. No. 15/863,369, dated Aug. 8, 2018, 4 pages.
Supplemental Notice of Allowance received for U.S. Appl. No. 16/143,201, dated Dec. 13, 2018, 2 pages.
Supplemental Notice of Allowance received for U.S. Appl. No. 16/143,201, dated Dec. 19, 2018, 2 pages.
Supplemental Notice of Allowance received for U.S. Appl. No. 16/143,201, dated Jan. 10, 2019, 2 pages.
Supplemental Notice of Allowance received for U.S. Appl. No. 16/733,718, dated Mar. 9, 2021, 21 pages.
Supplemental Notice of Allowance received for U.S. Appl. No. 16/733,718, dated Mar. 29, 2021, 2 pages.
Supplementary European Search Report received for European Patent Application No. 18176890.4, dated Sep. 20, 2018, 4 pages.
Supplementary European Search Report received for European Patent Application No. 18183054.8, dated Oct. 11, 2018, 4 pages.
Tech Smith, "Snagit 11 Snagit 11.4 Help", Available at: http://assets.techsmith.com/Downloads/ua-tutorials-snagit-11/Snagit_11.pdf, Jan. 2014, 2 pages.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
Techsmith, "Snagit® 11 Snagit 11.4 Help", Available at: <http://assets.techsmith.com/Downloads/ua-tutorials-snagit-11/Snagit_11.pdf>, Jan. 2014, 146 pages.
Techtag, "Samsung J5 Prime Camera Review | True Review", Available online at: https://www.youtube.com/watch?v=a_p906ai6PQ, Oct. 26, 2016, 3 pages.
Techtag, "Samsung J7 Prime Camera Review (Technical Camera)", Available Online at: https://www.youtube.com/watch?v=AJPcLP8GpFQ, Oct. 4, 2016, 3 pages.
Telleen et al., "Synthetic Shutter Speed Imaging", University of California, Santa Cruz, vol. 26, No. 3, 2007, 8 pages.
The Nitpicker, "Sony Xperia XZ3 | in-depth Preview", Available online at: <https://www.youtube.com/watch?v=TGCKxBuiO5c>, See especially 12:40-17:25, Oct. 07, 2018, 3 pages.
Tico et al., "Robust method of digital image stabilization", Nokia Research Center, ISCCSP, Malta, Mar. 12-14, 2008, pp. 316-321.
Travel Tech Sports Channel, "New Whatsapp update-voice message recording made easy—Want to record long voice messages", Available Online at: https://www.youtube.com/watch?v=SEviqgsAdUk, Nov. 30, 2017, 13 pages.
Vickgeek, "Canon 80D Live View Tutorial | Enhance your image quality", Available online at: https://www.youtube.com/watch?v=JGNCiy6Wt9c, Sep. 27, 2016, 3 pages.
Vivo India, "Bokeh Mode | Vivo V9", Available Online at <https://www.youtube.com/watch?v=B5AIHhH5Rxs>, Mar. 25, 2018, 3 pages.
Wong Richard, "Huawei Smartphone (P20/P10/P9, Mate 10/9) Wide Aperture Mode Demo", Available Online at <https://www.youtube.com/watch?v=eLY3LsZGDPA>, May 7, 2017, 2 pages.
Xeetechcare, "Samsung Galaxy S10—Super Night Mode & Ultra Fast Charging!", Online Available at: https://www.youtube.com/watch?v=3bguV4FX6aA, Mar. 28, 2019, 4 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at: <http://www.xperiablog.net/2014/06/13/action-camera-extension-gives-smartwatchsmartband-owners-ability-to-control-sony-wireless-cameras/>, Jun. 13, 2014, 10 pages.
X-Tech, "Test Make up via Slick Augmented Reality Mirror Without Putting It on", Available Online at: http://x-tech.am/test-make-up-via-slick-augmented-reality-mirror-without-putting-it-on/, Nov. 29, 2014, 5 pages.
Applicant-Initiated Interview Summary received for U.S. Appl. No. 17/483,564, dated Mar. 14, 2022, 2 pages.
Applicant-Initiated Interview Summary received for U.S. Appl. No. 17/483,679, dated Apr. 29, 2022, 2 pages.
Applicant-Initiated Interview Summary received for U.S. Appl. No. 17/484,899, dated Apr. 27, 2022, 5 pages.
Corrected Notice of Allowance received for U.S. Appl. No. 17/483,582, dated Feb. 15, 2022, 2 pages.
Final Office Action received for U.S. Appl. No. 17/483,564, dated Apr. 18, 2022, 23 pages.
Final Office Action received for U.S. Appl. No. 17/483,679, dated May 24, 2022, 21 pages.
Final Office Action received for U.S. Appl. No. 17/484,899, dated May 12, 2022, 29 pages.
Non-Final Office Action received for U.S. Appl. No. 17/483,549, dated Jan. 11, 2022, 5 pages.
Non-Final Office Action received for U.S. Appl. No. 17/483,564, dated Jan. 6, 2022, 23 pages.
Non-Final Office Action received for U.S. Appl. No. 17/483,679, dated Feb. 1, 2022, 19 pages.

(56) References Cited

OTHER PUBLICATIONS

Non-Final Office Action received for U.S. Appl. No. 17/484,899, dated Jan. 24, 2022, 24 pages.
Notice of Allowance received for U.S. Appl. No. 17/409,598, dated Jun. 21, 2022, 12 pages.
Notice of Allowance received for U.S. Appl. No. 17/483,549, dated Apr. 15, 2022, 10 pages.
Notice of Allowance received for U.S. Appl. No. 17/483,582, dated Apr. 19, 2022, 5 pages.
Notice of Allowance received for U.S. Appl. No. 17/483,582, dated Jan. 20, 2022, 10 pages.
Office Action received for Chinese Patent Application No. 202010126661.4, dated Jun. 2, 2022, 11 pages (7 pages of English Translation and 4 pages of Official Copy).
Office Action received for Japanese Patent Application No. 2021-565919, dated Jun. 13, 2022, 4 pages (2 pages of English Translation and 2 pages of Official Copy).
Office Action received for Korean Patent Application No. 10-2021-7017731, dated May 30, 2022, 5 pages (2 pages of English Translation and 3 pages of Official Copy).
Applicant-Initiated Interview Summary received for U.S. Appl. No. 15/995,040, dated Aug. 2, 2022, 5 pages.
Applicant-Initiated Interview Summary received for U.S. Appl. No. 17/476,404, dated Jul. 27, 2022, 6 pages.
Applicant-Initiated Interview Summary received for U.S. Appl. No. 17/483,564, dated Jul. 21, 2022, 5 pages.
Notice of Allowance received for Japanese Patent Application No. 2020-159338, dated Jul. 19, 2022, 3 pages (1 page of English Translation and 2 pages of Official Copy).
Notice of Allowance received for U.S. Appl. No. 16/144,629, dated Jul. 25, 2022, 10 pages.
Notice of Allowance received for U.S. Appl. No. 17/027,373, dated Aug. 2, 2022, 2 pages.
Corrected Notice of Allowance received for U.S. Appl. No. 17/027,373, dated Jul. 12, 2022, 2 pages.
Corrected Notice of Allowance received for U.S. Appl. No. 17/409,598, dated Jul. 7, 2022, 2 pages.
Corrected Notice of Allowance received for U.S. Appl. No. 17/409,598, dated Jul. 18, 2022, 3 pages.
Notice of Acceptance received for Australian Patent Application No. 2021203177, dated Jul. 14, 2022, 3 pages.
Notice of Allowance received for Japanese Patent Application No. 2020-159840, dated Jul. 8, 2022, 4 pages (1 page of English Translation and 3 pages of Official Copy).
Notice of Allowance received for U.S. Appl. No. 17/121,610, dated Jul. 7, 2022, 5 pages.
Notice of Allowance received for U.S. Appl. No. 17/121,610, dated Jul. 13, 2022, 4 pages.
Final Office Action received for U.S. Appl. No. 17/476,404, dated May 5, 2022, 30 pages.
Non-Final Office Action received for U.S. Appl. No. 17/466,824, dated May 11, 2022, 30 pages.
Notice of Acceptance received for Australian Patent Application No. 2021201295, dated May 10, 2022, 3 pages.
Notice of Allowance received for Chinese Patent Application No. 202180002106.3, dated May 5, 2022, 6 pages (3 pages of English Translation and 3 pages of Official Copy).
Office Action received for Australian Patent Application No. 2021203177, dated May 4, 2022, 7 pages.
Office Action received for Chinese Patent Application No. 202110328597.2, dated Apr. 15, 2022, 18 pages (9 pages of English Translation and 9 pages of Official Copy).
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Applicant-Initiated Interview Summary received for U.S. Appl. No. 17/223,794, dated Sep. 7, 2021, 3 pages.
Certificate of Examination received for Australian Patent Application No. 2021103004, dated Sep. 13, 2021, 2 pages.

Corrected Notice of Allowance received for U.S. Appl. No. 16/599,433, dated Aug. 13, 2021, 5 pages.
Corrected Notice of Allowance received for U.S. Appl. No. 16/599,433, dated Oct. 14, 2021, 3 pages.
Corrected Notice of Allowance received for U.S. Appl. No. 16/733,718, dated Aug. 18, 2021, 2 pages.
Corrected Notice of Allowance received for U.S. Appl. No. 16/825,879, dated Aug. 13, 2021, 2 pages.
Corrected Notice of Allowance received for U.S. Appl. No. 16/825,879, dated Sep. 15, 2021, 2 pages.
Corrected Notice of Allowance received for U.S. Appl. No. 16/835,651, dated Aug. 10, 2021, 4 pages.
Corrected Notice of Allowance received for U.S. Appl. No. 16/835,651, dated Aug. 13, 2021, 2 pages.
Decision to Grant received for Danish Patent Application No. PA201970593, dated Sep. 7, 2021, 2 pages.
Decision to Grant received for Japanese Patent Application No. 2020-193703, dated Aug. 10, 2021, 3 pages (1 page of English Translation and 2 pages of Official Copy).
Final Office Action received for U.S. Appl. No. 17/026,818, dated Jan. 2021, 21 pages.
Intention to Grant received for European Patent Application No. 19729395.4, dated Jul. 23, 2021, 10 pages.
International Search Report and Written Opinion received for PCT Patent Application No. PCT/US2021/031760, dated Sep. 16, 2021, 18 pages.
International Search Report and Written Opinion received for PCT Patent Application No. PCT/US2021/034304, dated Oct. 11, 2021, 24 pages.
Invitation to Pay Additional Fees received for PCT Patent Application No. PCT/US2021/034304, dated Aug. 20, 2021, 16 pages.
"Nikon Digital Camera D7200 User's Manual", Online available at: https://download.nikonimglib.com/archive3/dbHI400jWws903mGr6q98a4k8F90/D7200UM_SG(En)05.pdf, 2005, 416 pages.
Non-Final Office Action received for U.S. Appl. No. 16/528,257, dated Jul. 2021, 12 pages.
Non-Final Office Action received for U.S. Appl. No. 17/026,818, dated Nov. 25, 2020, 20 pages.
Non-Final Office Action received for U.S. Appl. No. 17/190,879, dated Oct. 13, 2021, 10 pages.
Non-Final Office Action received for U.S. Appl. No. 17/223,794, dated Jun. 16, 2021, 32 pages.
Notice of Allowance received for Chinese Patent Application No. 202010218168.5, dated Aug. 25, 2021, 6 pages (3 pages of English Translation and 3 pages of Official Copy).
Notice of Allowance received for Chinese Patent Application No. 202010287958.9, dated Aug. 27, 2021, 6 pages (3 pages of English Translation and 3 pages of Official Copy).
Notice of Allowance received for Chinese Patent Application No. 202010600151.6, dated Aug. 13, 2021, 2 pages (1 page of English Translation and 1 page of Official Copy).
Notice of Allowance received for Chinese Patent Application No. 202011243876.0, dated Sep. 8, 2021, 4 pages (1 page of English Translation and 3 pages of Official Copy).
Notice of Allowance received for Korean Patent Application No. 10-2021-7000954, dated Aug. 18, 2021, 5 pages (2 pages of English Translation and 3 pages of Official Copy).
Notice of Allowance received for U.S. Appl. No. 16/599,433, dated Oct. 4, 2021, 13 pages.
Notice of Allowance received for U.S. Appl. No. 16/733,718, dated Jul. 29, 2021, 26 pages.
Notice of Allowance received for U.S. Appl. No. 16/825,879, dated Sep. 28, 2021, 8 pages.
Notice of Allowance received for U.S. Appl. No. 17/026,818, dated May 13, 2021, 10 pages.
Office Action received for Australian Patent Application No. 2020239711, dated Sep. 13, 2021, 5 pages.
Office Action received for Australian Patent Application No. 2020239717, dated Sep. 28, 2021, 6 pages.
Office Action received for Australian Patent Application No. 2021103004, dated Aug. 12, 2021, 5 pages.

(56) References Cited

OTHER PUBLICATIONS

Office Action received for Chinese Patent Application No. 202010287950.2, dated Aug. 10, 2021, 12 pages (6 pages of English Translation and 6 pages of Official Copy).
Office Action received for Chinese Patent Application No. 202010600197.8, dated Jul. 2, 2021, 14 pages (6 pages of English Translation and 8 pages of Official Copy).
Office Action received for Chinese Patent Application No. 202011480411.7, dated Aug. 2, 2021, 12 pages (6 pages of English Translation and 6 pages of Official Copy).
Office Action received for Danish Patent Application No. PA202070617, dated Sep. 24, 2021, 4 pages.
Office Action received for European Patent Application No. 18704732.9, dated Sep. 7, 2021, 10 pages.
Office Action received for European Patent Application No. 20168009.7, dated Sep. 13, 2021, 8 pages.
Office Action received for European Patent Application No. 20206197.4, dated Aug. 27, 2021, 6 pages.
Office Action received for Indian Patent Application No. 201814036860, dated Jul. 29, 2021, 8 pages.
Office Action received for Indian Patent Application No. 201817024430, dated Sep. 27, 2021, 8 pages.
Office Action received for Indian Patent Application No. 201818045872, dated Oct. 13, 2021, 7 pages.
Office Action received for Japanese Patent Application No. 2018-182607, dated Sep. 8, 2021, 7 pages (4 pages of English Translation and 3 pages of Official Copy).
Office Action received for Japanese Patent Application No. 2019-203399, dated Aug. 10, 2021, 4 pages (2 pages of English Translation and 2 pages of Official Copy).
Office Action received for Japanese Patent Application No. 2020-542592, dated Sep. 21, 2021, 5 pages (3 pages of English Translation and 2 pages of Official Copy).
Office Action received for Korean Patent Application No. 10-2020-7022663, dated Aug. 17, 2021, 11 pages (5 pages of English Translation and 6 pages of Official Copy).
Office Action received for Korean Patent Application No. 10-2021-7020693, dated Jul. 14, 2021, 7 pages (3 pages of English Translation and 4 pages of Official Copy).
Search Report and Opinion received for Danish Patent Application No. PA202070617, dated Dec. 23, 2020, 8 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Corrected Notice of Allowance received for U.S. Appl. No. 16/144,629, dated Apr. 21, 2022, 5 pages.
Corrected Notice of Allowance received for U.S. Appl. No. 17/157,166, dated Apr. 25, 2022, 4 pages.
Office Action received for Indian Patent Application No. 202118046032, dated Apr. 25, 2022, 6 pages.
Office Action received for Indian Patent Application No. 202118046033, dated Apr. 25, 2022, 7 pages.
Office Action received for Indian Patent Application No. 202118046044, dated Apr. 25, 2022, 6 pages.
Messelodi et al., "A Kalman filter based background updating algorithm robust to sharp illumination changes.", International Conference on Image Analysis and Processing. Springer, Berlin, Heidelberg, 2005, pp. 163-170.
Certificate of Examination received for Australian Patent Application No. 2021107587, dated Apr. 29, 2022, 2 pages.
Corrected Notice of Allowance received for U.S. Appl. No. 17/121,610, dated May 20, 2022, 4 pages.
Corrected Notice of Allowance received for U.S. Appl. No. 17/484,279, dated Feb. 15, 2022, 2 pages.
Corrected Notice of Allowance received for U.S. Appl. No. 17/484,279, dated Feb. 28, 2022, 2 pages.
Corrected Notice of Allowance received for U.S. Appl. No. 17/484,307, dated Apr. 20, 2022, 2 pages.
Corrected Notice of Allowance received for U.S. Appl. No. 17/484,307, dated Feb. 10, 2022, 7 pages.
Corrected Notice of Allowance received for U.S. Appl. No. 17/484,321, dated Mar. 24, 2022, 2 pages.
Intention to Grant received for European Patent Application No. 20168009.7, dated May 17, 2022, 9 pages.
Notice of Acceptance received for Australian Patent Application No. 2021203903, dated May 25, 2022, 3 pages.
Notice of Acceptance received for Australian Patent Application No. 2022202377, dated May 11, 2022, 3 pages.
Notice of Allowance received for Japanese Patent Application No. 2021-510849, dated May 16, 2022, 4 pages (1 page of English Translation and 3 pages of Official Copy).
Notice of Allowance received for U.S. Appl. No. 17/483,684, dated Apr. 27, 2022, 10 pages.
Notice of Allowance received for U.S. Appl. No. 17/484,279, dated Jan. 26, 2022, 12 pages.
Notice of Allowance received for U.S. Appl. No. 17/484,279, dated May 13, 2022, 9 pages.
Notice of Allowance received for U.S. Appl. No. 17/484,307, dated Mar. 8, 2022, 11 pages.
Notice of Allowance received for U.S. Appl. No. 17/484,307, dated Nov. 30, 2021, 11 pages.
Notice of Allowance received for U.S. Appl. No. 17/484,321, dated Nov. 30, 2021, 10 pages.
Office Action received for Chinese Patent Application No. 202110327012.5, dated Apr. 29, 2022, 17 pages (10 pages of English Translation and 7 pages of Official Copy).
Supplemental Notice of Allowance received for U.S. Appl. No. 17/484,321, dated Mar. 1, 2022, 6 pages.
Corrected Notice of Allowance received for U.S. Appl. No. 16/144,629, dated Jun. 23, 2022, 5 pages.
Corrected Notice of Allowance received for U.S. Appl. No. 17/157,166, dated Jun. 29, 2022, 4 pages.
Notice of Acceptance received for Australian Patent Application No. 2019338180, dated Jun. 27, 2022, 3 pages.
Notice of Allowance received for Korean Patent Application No. 10-2020-0123805, dated Jun. 19, 2022, 5 pages (2 pages of English Translation and 3 pages of Official Copy).
Notice of Allowance received for Korean Patent Application No. 10-2020-7022663, dated Jun. 23, 2022, 6 pages (2 pages of English Translation and 4 pages of Official Copy).
Office Action received for Indian Patent Application No. 202118028159, dated Jun. 27, 2022, 6 pages.
Office Action received for Korean Patent Application No. 10-2022-7010505, dated Jun. 14, 2022, 5 pages (2 pages of English Translation and 3 pages of Official Copy).
Notice of Allowance received for U.S. Appl. No. 17/525,664, dated Oct. 27, 2022, 11 pages.
Office Action received for Chinese Patent Application No. 202110766668.7, dated Sep. 15, 2022, 18 pages (9 pages of English Translation and 9 pages of Official Copy).
Drunk Beauty Flower Digital Technology, "iPhone XS Max Camera Tips, Tricks, Features and Complete Tutorial", Available online at: https://www.ixigua.com/6606874981844386308?wid_try=1, Oct. 2, 2018, 2 pages (Official Copy Only). {See communication under 37 CFR § 1.98(a) (3)}.
Applicant-Initiated Interview Summary received for U.S. Appl. No. 17/482,987, dated Apr. 11, 2022, 4 pages.
Applicant-Initiated Interview Summary received for U.S. Appl. No. 17/484907, dated Jan. 10, 2022, 2 pages.
Corrected Notice of Allowance received for U.S. Appl. No. 17/484,907, dated Jun. 15, 2022, 2 pages.
Corrected Notice of Allowance received for U.S. Appl. No. 17/484,907, dated Mar. 18, 2022, 2 pages.
International Search Report and Written Opinion received for PCT Patent Application No. PCT/US2022/014271, dated Jul. 4, 2022, 23 pages.
International Search Report and Written Opinion received for PCT Patent Application No. PCT/US2022/024964, dated Aug. 4, 2022, 17 pages.

(56) References Cited

OTHER PUBLICATIONS

Invitation to Pay Additional Fees and Partial International Search Report received for PCT Patent Application No. PCT/US2022/014271, dated May 12, 2022, 20 pages.
Non-Final Office Action received for U.S. Appl. No. 17/356,322, dated Aug. 11, 2022, 17 pages.
Non-Final Office Action received for U.S. Appl. No. 17/482,987, dated Jan. 18, 2022, 25 pages.
Non-Final Office Action received for U.S. Appl. No. 17/484,907, dated Nov. 19, 2021, 24 pages.
Notice of Allowance received for U.S. Appl. No. 17/482,987, dated Jun. 23, 2022, 9 pages.
Notice of Allowance received for U.S. Appl. No. 17/482,987, dated May 11, 2022, 10 pages.
Notice of Allowance received for U.S. Appl. No. 17/483,684, dated Aug. 16, 2022, 9 pages.
Notice of Allowance received for U.S. Appl. No. 17/484,907, dated Jul. 25, 2022, 10 pages.
Notice of Allowance received for U.S. Appl. No. 17/484,907, dated Mar. 2, 2022, 13 pages.
Notice of Allowance received for U.S. Appl. No. 17/484,907, dated May 20, 2022, 13 pages.
Office Action received for Chinese Patent Application No. 202111323807.5, dated Jul. 15, 2022, 12 pages (6 pages of English Translation and 6 pages of Official Copy).
Office Action received for European Patent Application No. 20206196.6, dated Aug. 10, 2022, 13 pages.
Office Action received for Korean Patent Application No. 10-2022-7023077, dated Jul. 25, 2022, 6 pages (2 pages of English Translation and 4 pages of Official Copy).
Corrected Notice of Allowance received for U.S. Appl. No. 17/027,373, dated Oct. 26, 2022, 2 pages.
International Search Report and Written Opinion received for PCT Patent Application No. PCT/US2022/029261, dated Oct. 20, 2022, 18 pages.
Non-Final Office Action received for U.S. Appl. No. 17/482,977, dated Oct. 13, 2022, 20 pages.
Notice of Allowance received for Chinese Patent Application No. 201910400179.2, dated Oct. 9, 2022, 4 pages (1 page of English Translation and 3 pages of Official Copy).
Notice of Allowance received for Korean Patent Application No. 10-2022-0091730, dated Oct. 4, 2022, 5 pages (2 pages of English Translation and 3 pages of official copy).
Notice of Allowance received for U.S. Appl. No. 17/483,684, dated Oct. 24, 2022, 9 pages.
Notice of Allowance received for U.S. Appl. No. 17/740,032, dated Oct. 13, 2022, 11 pages.
Office Action received for Indian Patent Application No. 202215010325, dated Oct. 10, 2022, 7 pages.
Office Action received for Korean Patent Application No. 10-2021-7006145, dated Oct. 12, 2022, 14 pages (6 pages of English Translation and 8 pages of Official Copy).
Applicant-Initiated Interview Summary received for U.S. Appl. No. 17/483,679, dated Aug. 23, 2022, 3 pages.
Corrected Notice of Allowance received for U.S. Appl. No. 16/144,629, dated Aug. 24, 2022, 6 pages.
Corrected Notice of Allowance received for U.S. Appl. No. 17/483,549, dated Aug. 24, 2022, 3 pages.
Corrected Notice of Allowance received for U.S. Appl. No. 17/483,684, dated Aug. 24, 2022, 6 pages.
Corrected Notice of Allowance received for U.S. Appl. No. 17/484,907, dated Aug. 26, 2022, 2 pages.
Office Action received for Japanese Patent Application No. 2020-542592, dated Aug. 1, 2022, 5 pages (2 pages of English Translation and 3 pages of Official Copy).
Applicant-Initiated Interview Summary received for U.S. Appl. No. 17/484,899, dated Sep. 1, 2022, 5 pages.
Hourunranta et al., "Video and Audio Editing for Mobile Applications", IEEE International Conference on Multimedia and Expo, ICME 2006, Jul. 9, 2006, pp. 1305-1308.
Hurwitz, Jon, "Interface for Small-Screen Media Playback Control", Online available at: https://www.tdcommons.org/cgi/viewcontent.cgi?article=4231&context=dpubs_series, Technical Disclosure Commons, Apr. 17, 2020, pp. 1-9.
Non-Final Office Action received for U.S. Appl. No. 17/476,404, dated Sep. 14, 2022, 31 pages.
Notice of Allowance received for U.S. Appl. No. 17/409,598, dated Sep. 14, 2022, 9 pages.
Summons to Attend Oral Proceedings received for European Patent Application No. 20205496.1, dated Sep. 8, 2022, 9 pages.
Advisory Action received for U.S. Appl. No. 17/483,679, dated Sep. 20, 2022, 8 pages.
Intention to Grant received for European Patent Application No. 21733324.4, dated Sep. 13, 2022, 7 pages.
Invitation to Pay Additional Fees and Partial International Search Report received for PCT Patent Application No. PCT/US2022/029261, dated Aug. 29, 2022, 16 pages.
Non-Final Office Action received for U.S. Appl. No. 17/483,542, dated Sep. 22, 2022, 18 pages.
Office Action received for European Patent Application No. 21163791.3, dated Sep. 20, 2022, 6 pages.
Corrected Notice of Allowance received for U.S. Appl. No. 17/525,664, dated Nov. 3, 2022, 2 pages.
Corrected Notice of Allowance received for U.S. Appl. No. 17/740,032, dated Nov. 3, 2022, 6 pages.
European Search Report received for European Patent Application No. 22184844.3, dated Nov. 4, 2022, 4 pages.
Intention to Grant received for European Patent Application No. 20168009.7, dated Oct. 31, 2022, 9 pages.
Notice of Allowance received for Korean Patent Application No. 10-2022-7023077, dated Nov. 1, 2022, 8 pages (2 pages of English Translation and 6 pages of Official Copy).
Notice of Allowance received for U.S. Appl. No. 17/732,191, dated Nov. 9, 2022, 12 pages.
Office Action received for Chinese Patent Application No. 202110328597.2, dated Oct. 10, 2022, 13 pages (7 pages of English Translation and 6 pages of Official Copy).
Applicant-Initiated Interview Summary received for U.S. Appl. No. 17/482,977, dated Dec. 5, 2022, 2 pages.
Intention to Grant received for European Patent Application No. 18704732.9, dated Dec. 6, 2022, 10 pages.
International Search Report and Written Opinion received for PCT Patent Application No. PCT/US2022/030589, dated Sep. 5, 2022, 26 pages.
International Search Report and Written Opinion received for PCT Patent Application No. PCT/US2022/030704, dated Nov. 9, 2022, 19 pages.
Invitation to Pay Additional Fees and Partial International Search Report received for PCT Patent Application No. PCT/US2022/030704, dated Sep. 15, 2022, 12 pages.
Invitation to Pay Search Fees received for European Patent Application No. 21728781.2, dated Dec. 2, 2022, 3 pages.
Non-Final Office Action received for U.S. Appl. No. 17/041,412, dated Dec. 5, 2022, 13 pages.
Non-Final Office Action received for U.S. Appl. No. 17/483,679, dated Dec. 9, 2022, 31 pages.
Non-Final Office Action received for U.S. Appl. No. 17/510,168, dated Dec. 6, 2022, 11 pages.
Office Action received for Australian Patent Application No. 2021290292, dated Nov. 24, 2022, 2 pages.
Office Action received for Chinese Patent Application No. 202110328601.5, dated Nov. 2, 2022, 32 pages (19 pages of English Translation and 13 pages of Official Copy).
Office Action received for European Patent Application No. 22184853.4, dated Nov. 25, 2022, 7 pages.
QQ, "Method of QQ voice chat", Online Available at: https://www.taodocs.com/p-47909082.html, May 25, 2016, 3 pages (Official Copy only) See Communication under 37 CFR § 1.98(a) (3).
Applicant-Initiated Interview Summary received for U.S. Appl. No. 17/466,824, dated Oct. 5, 2022, 2 pages.
Corrected Notice of Allowance received for U.S. Appl. No. 17/409,598, dated Sep. 30, 2022, 2 pages.

(56) References Cited

OTHER PUBLICATIONS

Examiner-Initiated Interview Summary received for U.S. Appl. No. 17/356,322, dated Sep. 29, 2022, 4 pages.
Final Office Action received for U.S. Appl. No. 15/995,040, dated Oct. 6, 2022, 27 pages.
Notice of Acceptance received for Australian Patent Application No. 2022215297, dated Sep. 26, 2022, 3 pages.
Notice of Allowance received for Japanese Patent Application No. 2021-565919, dated Oct. 3, 2022, 3 pages (1 page of English Translation and 2 of pages Official Copy).
Notice of Allowance received for Korean Patent Application No. 10-2022-7006310, dated Sep. 20, 2022, 8 pages (2 pages of English Translation and 6 pages of Official Copy).
Notice of Allowance received for U.S. Appl. No. 17/027,373, dated Oct. 3, 2022, 5 pages.
Office Action received for Brazilian Patent Application No. BR122018076550-0, dated Sep. 28, 2022, 7 pages (1 page of English Translation and 6 pages of Official Copy).
Office Action received for Chinese Patent Application No. 202111652452.4, dated Aug. 29, 2022, 23 pages (12 pages of English Translation and 11 pages of Official Copy).
Office Action received for Japanese Patent Application No. 2021-166686, dated Oct. 3, 2022, 3 pages (2 pages of English Translation and 1 page of Official Copy).
Shareit, "WhatsApp Easy Way to Record Long Voice Messages—New Update", Retrieved from Internet: <https://www.youtube.com/watch?v=3MVnYGt8v1l>, Apr. 7, 2018, 39 pages.
Applicant-Initiated Interview Summary received for U.S. Appl. No. 15/995,040, dated Nov. 18, 2022, 5 pages.
Applicant-Initiated Interview Summary received for U.S. Appl. No. 17/483,542, dated Nov. 23, 2022, 4 pages.
European Search Report received for European Patent Application No. 22184853.4, dated Nov. 14, 2022, 5 pages.
Final Office Action received for U.S. Appl. No. 17/356,322, dated Nov. 29, 2022, 19 pages.
Final Office Action received for U.S. Appl. No. 17/466,824, dated Nov. 25, 2022, 35 pages.
International Preliminary Report on Patentability received for PCT Patent Application No. PCT/US2021/031760, dated Nov. 24, 2022, 11 pages.
International Search Report and Written Opinion received for PCT Patent Application No. PCT/US2022/029273, dated Oct. 27, 2022, 19 pages.
International Search Report and Written Opinion received for PCT Patent Application No. PCT/US2022/029580, dated Nov. 7, 2022, 20 pages.
Invitation to Pay Additional Fees and Partial International Search Report received for PCT Patent Application No. PCT/US2022/029580, dated Sep. 5, 2022, 13 pages.
Invitation to Pay Additional Fees received for PCT Patent Application No. PCT/US2022/029273, dated Sep. 2, 2022, 13 pages.
Non-Final Office Action received for U.S. Appl. No. 17/483,564, dated Nov. 28, 2022, 24 pages.
Notice of Allowance received for Japanese Patent Application No. 2020-542592, dated Nov. 14, 2022, 2 pages (1 page of English Translation and 1 page of Official Copy).
Notice of Allowance received for U.S. Appl. No. 17/566,094, dated Nov. 22, 2022, 10 pages.
Office Action received for European Patent Application No. 22184844.3, dated Nov. 16, 2022, 7 pages.
Office Action received for Japanese Patent Application No. 2022-027861, dated Nov. 21, 2022, 4 pages (2 pages of English Translation and 2 pages of Official Copy).
Applicant-Initiated Interview Summary received for U.S. Appl. No. 17/356,322, dated Dec. 27, 2022, 4 pages.
Applicant-Initiated Interview Summary received for U.S. Appl. No. 17/476,404, dated Dec. 20, 2022, 2 pages.
Intention to Grant received for European Patent Application No. 20206197.4, dated Dec. 15, 2022, 10 pages.
International Preliminary Report on Patentability received for PCT Patent Application No. PCT/US2021/034304, dated Dec. 15, 2022, 19 pages.
Office Action received for Australian Patent Application No. 2022201532, dated Dec. 19, 2022, 5 pages.
Office Action received for Chinese Patent Application No. 202110327012.5, dated Nov. 28, 2022, 16 pages (10 pages of English Translation and 6 pages of Official Copy).
Corrected Notice of Allowance received for U.S. Appl. No. 17/950,900, dated Jun. 30, 2023, 2 pages.
Notice of Allowance received for Korean Patent Application No. 10-2020-0124139, dated Jun. 19, 2023, 7 pages (2 pages of English Translation and 5 pages of Official Copy).
Office Action received for Australian Patent Application No. 2022221466, dated Jun. 16, 2023, 2 pages.
Office Action received for European Patent Application No. 18779093.6, dated Jun. 28, 2023, 4 pages.
Applicant-Initiated Interview Summary received for U.S. Appl. No. 17/483,542, dated May 22, 2023, 3 pages.
Applicant-Initiated Interview Summary received for U.S. Appl. No. 17/483,679, dated May 19, 2023, 3 pages.
Decision to Grant received for European Patent Application No. 20210373.5, dated May 19, 2023, 4 pages.
Final Office Action received for U.S. Appl. No. 17/483,564, dated May 25, 2023, 26 pages.
Final Office Action received for U.S. Appl. No. 17/542,947, dated May 25, 2023, 55 pages.
Intention to Grant received for European Patent Application No. 20206197.4, dated May 25, 2023, 9 pages.
Non-Final Office Action received for U.S. Appl. No. 17/466,824, dated May 25, 2023, 33 pages.
Notice of Acceptance received for Australian Patent Application No. 2022201532, dated May 22, 2023, 3 pages.
Notice of Acceptance received for Australian Patent Application No. 2022204465, dated May 26, 2023, 3 pages.
Notice of Allowance received for Japanese Patent Application No. 2021-206121, dated May 15, 2023, 4 pages (1 page of English Translation and 3 pages of Official Copy).
Office Action received for Chinese Patent Application No. 202110328597.2, dated May 15, 2023, 13 pages (6 pages of English Translation and 7 pages of Official Copy).
"6. Voice chat with friends through QQ", Online available at: https://v.qq.com/x/page/a0166p7xrt0.html, Sep. 22, 2015, 1 page (Official Copy Only). {See Communication under 37 CFR § 1.98(a) (3)}.
Applicant-Initiated Interview Summary received for U.S. Appl. No. 17/466,824, dated Apr. 20, 2023, 2 pages.
Applicant-Initiated Interview Summary received for U.S. Appl. No. 17/483,564, dated Apr. 21, 2023, 5 pages.
Brief Communication Regarding Oral Proceedings received for European Patent Application No. 20205496.1, dated Apr. 19, 2023, 1 page.
Corrected Notice of Allowance received for U.S. Appl. No. 17/041,412, dated Apr. 12, 2023, 2 pages.
Corrected Notice of Allowance received for U.S. Appl. No. 17/482,977, dated Apr. 24, 2023, 3 pages.
Corrected Notice of Allowance received for U.S. Appl. No. 17/950,900, dated Apr. 14, 2023, 2 pages.
Corrected Notice of Allowance received for U.S. Appl. No. 17/950,922, dated Apr. 14, 2023, 2 pages.
Decision to Grant received for Japanese Patent Application No. 2021-166686, dated Apr. 20, 2023, 2 pages (1 page of English Translation and 1 page of Official Copy).
Jiutian Technology, "Windows 8 Chinese version from entry to proficiency", Jan. 1, 2014, 5 pages (Official Copy Only). {See Communication under 37 CFR § 1.98(a) (3)}.
Non-Final Office Action received for U.S. Appl. No. 17/903,946, dated Apr. 14, 2023, 17 pages.
Notice of Acceptance received for Australian Patent Application No. 2022218463, dated Apr. 18, 2023, 3 pages.
Notice of Allowance received for U.S. Appl. No. 17/041,412, dated Apr. 26, 2023, 11 pages.

(56) References Cited

OTHER PUBLICATIONS

Notice of Allowance received for U.S. Appl. No. 17/525,664, dated Apr. 26, 2023, 10 pages.
Notice of Allowance received for U.S. Appl. No. 17/940,672, dated Apr. 27, 2023, 9 pages.
Office Action received for Chinese Patent Application No. 202110327012.5, dated Mar. 16, 2023, 12 pages (7 pages of English Translation and 5 pages of Official Copy).
Office Action received for Chinese Patent Application No. 202110328601.5, dated Mar. 24, 2023, 25 pages (15 pages of English Translation and 10 pages of Official Copy).
Office Action received for Chinese Patent Application No. 202211072958.2, dated Apr. 5, 2023, 11 pages (6 pages of English Translation and 5 pages of Official Copy).
Office Action received for Indian Patent Application No. 202215025361, dated Mar. 29, 2023, 6 pages.
Result of Consultation received for European Patent Application No. 20205496.1, dated Apr. 18, 2023, 3 pages.
Song, Jianhua, "Guidelines for Network", Feb. 29, 2008, 11 pages (Official Copy Only). {See Communication under 37 CFR § 1.98(a) (3)}.
Applicant-Initiated Interview Summary received for U.S. Appl. No. 17/476,404, dated Jun. 2, 2023, 2 pages.
Board Decision received for Chinese Patent Application No. 201811446867.4, dated Apr. 26, 2023, 21 pages (5 pages of English Translation and 16 pages of Official copy).
Computerhilfen, "WhatsApp: Voice Message without Holding the Button", Retrieved from Internet: < https://www.youtube.com/watch?v=ofFCKvs5URw>, Jan. 14, 2018, 9 pages.
Corrected Notice of Allowance received for U.S. Appl. No. 17/944,765, dated Jun. 1, 2023, 5 pages.
Decision to Grant received for European Patent Application No. 21733324.4, dated Jun. 2, 2023, 3 pages.
Final Office Action received for U.S. Appl. No. 17/483,679, dated Jun. 13, 2023, 33 pages.
International Search Report and Written Opinion received for PCT Patent Application No. PCT/US2022/050916, dated May 15, 2023, 23 pages.
Invitation to Pay Additional Fee received for PCT Patent Application No. PCT/US2022/050916, mailed on Mar. 23, 2023, 16 pages.
Non-Final Office Action received for U.S. Appl. No. 15/995,040, dated Jun. 7, 2023, 26 pages.
Non-Final Office Action received for U.S. Appl. No. 17/484,899, dated Jun. 14, 2023, 41 pages.
Office Action received for European Patent Application No. 21202358.4, dated Jun. 9, 2023, 7 pages.
Yuan, Ye, "Iphone 4s Original Secrets", China Railway Press, 2012, 15 pages (Official Copy Only). {See Communication under 37 CFR § 1.98(a) (3)}.
Applicant Initiated Interview Summary received for U.S. Appl. No. 17/721,039, dated Mar. 10, 2023, 3 pages.
Applicant-Initiated Interview Summary received for U.S. Appl. No. 17/041,412, dated Jan. 31, 2023, 7 pages.
Applicant-Initiated Interview Summary received for U.S. Appl. No. 17/950,900, dated Jan. 26, 2023, 5 pages.
Board Opinion received for Chinese Patent Application No. 201811446867.4, dated Feb. 14, 2023, 11 pages (4 pages of English Translation and 7 pages of Official Copy).
Corrected Notice of Allowance received for U.S. Appl. No. 17/041,412, dated Mar. 23, 2023, 7 pages.
Corrected Notice of Allowance received for U.S. Appl. No. 17/041,412, dated Mar. 31, 2023, 6 pages.
Corrected Notice of Allowance received for U.S. Appl. No. 17/356,322, dated Feb. 15, 2023, 2 pages.
Corrected Notice of Allowance received for U.S. Appl. No. 17/356,322, dated Mar. 8, 2023, 2 pages.
Corrected Notice of Allowance received for U.S. Appl. No. 17/510,168, dated Mar. 16, 2023, 2 pages.
Corrected Notice of Allowance received for U.S. Appl. No. 17/510,168, dated Mar. 29, 2023, 2 pages.
Corrected Notice of Allowance received for U.S. Appl. No. 17/525,664, dated Apr. 11, 2023, 2 pages.
Corrected Notice of Allowance received for U.S. Appl. No. 17/525,664, dated Feb. 23, 2023, 2 pages.
Corrected Notice of Allowance received for U.S. Appl. No. 17/566,094, dated Feb. 8, 2023, 2 pages.
Corrected Notice of Allowance received for U.S. Appl. No. 17/566,094, dated Jan. 5, 2023, 2 pages.
Corrected Notice of Allowance received for U.S. Appl. No. 17/566,094, dated Jan. 23, 2023, 2 pages.
Corrected Notice of Allowance received for U.S. Appl. No. 17/566,094, dated Mar. 7, 2023, 2 pages.
Corrected Notice of Allowance received for U.S. Appl. No. 17/740,032, dated Feb. 15, 2023, 6 pages.
Dolan, Tim, "How to Make a Laptop Webcam into a Document Camera—IPEVO Mirror-Cam Review", Retrieved from the Internet: URL: https://www.youtube.com/watch?v=-K8jyZ1hbbg, Aug. 29, 2020, 1 page.
Final Office Action received for U.S. Appl. No. 17/950,900, dated Jan. 23, 2023, 14 pages.
Hearing Notice received for Indian Patent Application No. 201817024430, dated Apr. 6, 2023, 2 pages.
Intention to Grant received for European Patent Application No. 20168009.7, dated Feb. 28, 2023, 10 pages.
Intention to Grant received for European Patent Application No. 20210373.5, dated Jan. 10, 2023, 12 pages.
Intention to Grant received for European Patent Application No. 21733324.4, dated Jan. 9, 2023, 9 pages.
International Preliminary Report on Patentability received for PCT Patent Application No. PCT/US2021/046877, dated Apr. 6, 2023, 12 pages.
International Search Report and Written Opinion received for PCT Patent Application No. PCT/US2022/044592, dated Mar. 14, 2023, 22 pages.
Invitation to Pay Additional Fees received for PCT Patent Application No. PCT/US2022/044592, dated Jan. 16, 2023, 21 pages.
Larson, Tom, "How to Turn your Webcam into a Document Camera", Retrieved from the Internet: URL: https://www.youtube.com/watchv=UlaW22FxRZM, Nov. 7, 2020, 1 page.
Non-Final Office Action received for U.S. Appl. No. 17/476,404, dated Mar. 30, 2023, 29 pages.
Non-Final Office Action received for U.S. Appl. No. 17/483,542, dated Jan. 31, 2023, 14 pages.
Non-Final Office Action received for U.S. Appl. No. 17/542,947, dated Mar. 2, 2023, 59 pages.
Non-Final Office Action received for U.S. Appl. No. 17/721,039, dated Feb. 2, 2023, 65 pages.
Non-Final Office Action received for U.S. Appl. No. 17/940,672, dated Mar. 16, 2023, 15 pages.
Non-Final Office Action received for U.S. Appl. No. 17/944,765, dated Jan. 18, 2023, 9 pages.
Non-Final Office Action received for U.S. Appl. No. 17/950,900, dated Dec. 1, 2022, 14 pages.
Notice of Acceptance received for Australian Patent Application No. 2021290292, dated Jan. 23, 2023, 3 pages.
Notice of Allowance received for Brazilian Patent Application No. BR122018076550-0, dated Jan. 3, 2022, 3 pages (1 page of English Translation and 2 pages of Official Copy).
Notice of Allowance received for Chinese Patent Application No. 202111323807.5, dated Jan. 10, 2023, 4 pages (1 page of English Translation and 3 pages of Official Copy).
Notice of Allowance received for Japanese Patent Application No. 2022-027861, dated Feb. 13, 2023, 3 pages (1 page of English Translation and 2 pages of Official Copy).
Notice of Allowance received for Japanese Patent Application No. 2022-125792, dated Jan. 27, 2023, 4 pages (1 page of English Translation and 3 pages of Official Copy).
Notice of Allowance received for Korean Patent Application No. 10-2021-7006145, dated Mar. 6, 2023, 5 pages (2 pages of English Translation and 3 pages of Official Copy).
Notice of Allowance received for Korean Patent Application No. 10-2021-7017731, dated Feb. 28, 2023, 5 pages (2 pages of English Translation and 3 pages of Official Copy).

(56) References Cited

OTHER PUBLICATIONS

Notice of Allowance received for Korean Patent Application No. 10-2022-7010505, dated Dec. 26, 2022, 7 pages (2 pages of English Translation and 5 pages of Official Copy).
Notice of Allowance received for U.S. Appl. No. 17/041,412, dated Mar. 15, 2023, 13 pages.
Notice of Allowance received for U.S. Appl. No. 17/356,322, dated Feb. 2, 2023, 11 pages.
Notice of Allowance received for U.S. Appl. No. 17/482,977, dated Jan. 24, 2023, 10 pages.
Notice of Allowance received for U.S. Appl. No. 17/510,168, dated Feb. 13, 2023, 10 pages.
Notice of Allowance received for U.S. Appl. No. 17/525,664, dated Feb. 14, 2023, 10 pages.
Notice of Allowance received for U.S. Appl. No. 17/566,094, dated Feb. 23, 2023, 8 pages.
Notice of Allowance received for U.S. Appl. No. 17/732,191, dated Feb. 27, 2023, 12 pages.
Notice of Allowance received for U.S. Appl. No. 17/740,032, dated Feb. 1, 2023, 9 pages.
Notice of Allowance received for U.S. Appl. No. 17/944,765, dated Apr. 5, 2023, 9 pages.
Notice of Allowance received for U.S. Appl. No. 17/950,900, dated Mar. 7, 2023, 10 pages.
Notice of Allowance received for U.S. Appl. No. 17/950,922, dated Apr. 5, 2023, 10 pages.
Office Action received for Australian Patent Application No. 2022204465, dated Mar. 10, 2023, 4 pages.
Office Action received for Australian Patent Application No. 2022218463, dated Mar. 17, 2023, 2 pages.
Office Action received for Chinese Patent Application No. 201980012481.9, dated Jan. 12, 2023, 18 pages (9 pages of English Translation and 9 pages of Official Copy).
Office Action received for Chinese Patent Application No. 202110328602.X, dated Dec. 1, 2022, 28 pages (17 pages of English Translation 11 pages of Official Copy).
Office Action received for Chinese Patent Application No. 202110766668.7, dated Jan. 20, 2023, 11 pages (6 pages of English Translation and 5 pages of Official Copy).
Office Action received for Chinese Patent Application No. 202111652452.4, dated Feb. 11, 2023, 28 pages (13 pages of English Translation and 15 pages of Official Copy).
Office Action received for Chinese Patent Application No. 202210063070.6, dated Jan. 5, 2023, 12 pages (6 pages of English Translation and 6 pages of Official Copy).
Office Action received for Chinese Patent Application No. 202210849242.2, dated Jan. 20, 2023, 12 pages (6 pages of English Translation and 6 pages of Official Copy).
Office Action received for European Patent Application No. 19769316.1, dated Jan. 12, 2023, 10 pages.
Office Action received for European Patent Application No. 21728781.2, dated Mar. 1, 2023, 13 pages.
Office Action received for Indian Patent Application No. 202015008746, dated Mar. 6, 2023, 7 pages.
Office Action received for Indian Patent Application No. 202015013360, dated Mar. 17, 2023, 7 pages.
Office Action received for Indian Patent Application No. 202117009020, dated Feb. 6, 2023, 7 pages.
Office Action received for Indian Patent Application No. 202215025360, dated Mar. 29, 2023, 6 pages.
Office Action received for Indian Patent Application No. 202215025363, dated Mar. 29, 2023, 6 pages.
Office Action received for Indian Patent Application No. 202215025364, dated Mar. 29, 2023, 6 pages.
Office Action received for Indian Patent Application No. 202215026045, dated Mar. 31, 2023, 8 pages.
Office Action received for Japanese Patent Application No. 2021-187533, dated Feb. 6, 2023, 7 pages (4 pages of English Translation and 3 pages of Official Copy).
Office Action received for Japanese Patent Application No. 2021-206121, dated Feb. 20, 2023, 7 pages (3 pages of English Translation and 4 pages of Official Copy).
Office Action received for Korean Patent Application No. 10-2020-0124139, dated Jan. 17, 2023, 10 pages (5 pages of English Translation and 5 pages of Official Copy).
Office Action received for Korean Patent Application No. 10-2022-7043663, dated Jan. 6, 2023, 12 pages (5 pages of English Translation and 7 pages of Official Copy).
Office Action received for Korean Patent Application No. 10-2022-7033119, dated Mar. 29, 2023, 5 pages (2 pages of English Translation and 3 pages of Official Copy).
Result of Consultation received for European Patent Application No. 22184844.3, dated Feb. 1, 2023, 3 pages.
Applicant-Initiated Interview Summary received for U.S. Appl. No. 17/483,564, dated Jun. 21, 2023, 4 pages.
Decision to Grant received for European Patent Application No. 20168009.7, dated Jun. 22, 2023, 4 pages.
Examiner Interview Summary received for U.S. Appl. No. 17/903,946, dated Jun. 28, 2023, 2 pages.
Notice of Allowance received for U.S. Appl. No. 17/950,900, dated Jun. 16, 2023, 6 pages.
Office Action received for Chinese Patent Application No. 202111652452.4, dated May 19, 2023, 15 pages (8 pages of English Translation and 7 pages of Official Copy).
Office Action received for Chinese Patent Application No. 202211072261.5, dated Apr. 29, 2023, 17 pages (9 pages of English Translation and 8 pages of Official Copy).
Applicant-Initiated Interview Summary received for U.S. Appl. No. 17/542,947, dated Apr. 28, 2023, 4 pages.
Corrected Notice of Allowance received for U.S. Appl. No. 17/041,412, dated May 17, 2023, 2 pages.
Corrected Notice of Allowance received for U.S. Appl. No. 17/525,664, dated May 17, 2023, 2 pages.
Decision to Refuse received for European Patent Application No. 202054961, dated May 12, 2023, 16 pages.
Minutes of the Oral Proceedings received for European Patent Application No. 20205496.1, mailed on May 9, 2023, 7 pages.
Non-Final Office Action received for U.S. Appl. No. 17/872,736, dated May 11, 2023, 17 pages.
Notice of Allowance received for Chinese Patent Application No. 202210063070.6, dated May 2, 2023, 2 pages (1 page of English Translation and 1 page of Official Copy).
Notice of Allowance received for U.S. Appl. No. 17/356,322, dated May 8, 2023, 10 pages.
Notice of Allowance received for U.S. Appl. No. 17/510, 168, dated May 3, 2023, 10 pages.
Office Action received for Australian Patent Application No. 2022228207, dated Apr. 28, 2023, 3 pages.
Office Action received for European Patent Application No. 22184844.3, dated Apr. 26, 2023, 5 pages.
Office Action received for European Patent Application No. 22184853.4, dated Apr. 26, 2023, 4 pages.
Summons to Attend Oral Proceedings received for European Patent Application No. 21163791.3, mailed on May 3, 2023, 6 pages.
Summons to Oral Proceedings received for European Patent Application No. 17184710.6, mailed on May 10, 2023, 3 pages.
Corrected Notice of Allowance received for U.S. Appl. No. 17/121,610, dated Jun. 7, 2022, 4 pages.
HuddleCamHD SimplTrack2 Auto Tracking Camera Installation & Operation Manual, Available Online at: https://huddlecamhd.com/wp-content/uploads/2021l01/SimplTrack2-User-Manual-v1_2-6-20.pdf, Jun. 2020, 41 pages.
Notice of Acceptance received for Australian Patent Application No. 2020239717, dated Jun. 1, 2022, 3 pages.
Notice of Allowance received for Korean Patent Application No. 10-2022-7016421, dated May 25, 2022, 6 pages (2 pages of English Translation and 4 pages of Official Copy).
Notice of Allowance received for U.S. Appl. No. 17/027,373, dated Jun. 3, 2022, 8 pages.
Office Action received for Chinese Patent Application No. 202110328601.5, dated Apr. 27, 2022, 25 pages (14 pages of English Translation and 11 pages of Official Copy).

(56) References Cited

OTHER PUBLICATIONS

Office Action received for European Patent Application No. 19707557.5, dated Jun. 3, 2022, 5 pages.
Office Action received for European Patent Application No. 20210373.5, dated May 31, 2022, 5 pages.
Abdulezer et al., "Skype for Dummies", Available Online at: https://ixn.es/Skype%20For%20Dummies.pdf, 2007, 361 pages.
Final Office Action received for U.S. Appl. No. 17/721,039, dated Jul. 6, 2023, 66 pages.
Intention to Grant received for European Patent Application No. 20166552.8, dated Jun. 29, 2023, 8 pages.
Notice of Allowance received for Australian Patent Application No. 2022228207, dated Jul. 3, 2023, 3 pages.
Notice of Allowance received for U.S. Appl. No. 17/483,564, dated Jul. 17, 2023, 46 pages.
Notice of Hearing received for Indian Patent Application No. 201818046896, dated Jul. 11, 2023, 2 pages.
Office Action received for Australian Patent Application No. 2022228121, dated Jul. 7, 2023, 3 pages.
Office Action received for Chinese Patent Application No. 202110766668.7, dated Jun. 7, 2023, 13 pages (9 pages of English Translation and 4 pages of Official Copy).
Office Action received for Japanese Patent Application No. 2021-187533, dated Jun. 26, 2023, 6 pages (3 pages of English Translation and 3 pages of Official Copy).
Summons to Oral Proceedings received for European Patent Application No. 19724959.2, mailed on Jul. 14, 2023, 6 pages.
Applicant-Initiated Interview Summary received for U.S. Appl. No. 17/483,679, dated Aug. 18, 2023, 2 pages.
Applicant-Initiated Interview Summary received for U.S. Appl. No. 17/484,899, dated Sep. 12, 2023, 6 pages.
Applicant-Initiated Interview Summary received for U.S. Appl. No. 17/542,947, dated Jul. 10, 2023, 4 pages.
Applicant-Initiated Interview Summary received for U.S. Appl. No. 17/721,039, dated Jul. 25, 2023, 3 pages.
Applicant-Initiated Interview Summary received for U.S. Appl. No. 17/872,736, dated Jul. 25, 2023, 2 pages.
Corrected Notice of Allowance received for U.S. Appl. No. 17/483,542, dated Aug. 25, 2023, 3 pages.
Corrected Notice of Allowance received for U.S. Appl. No. 17/944,765, dated Jul. 27, 2023, 5 pages.
Decision to Grant received for European Patent Application No. 18704732.9, dated Aug. 18, 2023, 3 pages.
Decision to Grant received for Japanese Patent Application No. 2023-083816, dated Aug. 9, 2023, 2 pages (1 page of English Translation and 1 page of Official Copy).
Ex-Parte Quayle Action received for U.S. Appl. No. 17/903,946, mailed on Aug. 4, 2023, 4 pages.
Extended European Search Report received for European Patent Application No. 23173036.7, dated Jul. 24, 2023, 13 pages.
Final Office Action received for U.S. Appl. No. 17/476,404, dated Sep. 12, 2023, 30 pages.
Garrison Dr., "An Analysis and Evaluation of Audio Teleconferencing to Facilitate Education at a Distance", Online Available at: https://doi.org/10.1080/08923649009526713, American journal of distance education, vol. 4, No. 3, Sep. 24, 2009, 14 pages.
Hearing Notice received for Indian Patent Application No. 201814036860, dated Sep. 8, 2023, 2 pages.
Intention to Grant received for European Patent Application No. 21728781.2, dated Jul. 28, 2023, 9 pages.
Intention to Grant received for European Patent Application No. 22151131.4, dated Aug. 4, 2023, 10 pages.
International Preliminary Report on Patentability received for PCT Patent Application No. PCT/US2022/014271, dated Aug. 10, 2023, 17 pages.
Non-Final Office Action received for U.S. Appl. No. 17/483,679, dated Sep. 13, 2023, 32 pages.
Non-Final Office Action received for U.S. Appl. No. 17/684,843, dated Aug. 11, 2023, 23 pages.
Non-Final Office Action received for U.S. Appl. No. 17/732,204, dated Aug. 4, 2023, 18 pages.
Non-Final Office Action received for U.S. Appl. No. 17/740,104, dated Aug. 2, 2023, 15 pages.
Non-Final Office Action received for U.S. Appl. No. 18/114,880, dated Aug. 29, 2023, 10 pages.
Notice of Acceptance received for Australian Patent Application No. 2022221466, dated Aug. 31, 2023, 3 pages.
Notice of Allowance received for Chinese Patent Application No. 202110328601.5, dated Jul. 5, 2023, 5 pages (1 page of English Translation and 4 pages of Official Copy).
Notice of Allowance received for Korean Patent Application No. 10-2022-7033119, dated Jul. 26, 2023, 7 pages (2 pages of English Translation and 5 pages of Official Copy).
Notice of Allowance received for Korean Patent Application No. 10-2022-7043663, dated Jul. 25, 2023, 8 pages (2 pages of English Translation and 6 pages of Official Copy).
Notice of Allowance received for Korean Patent Application No. 10-2023-7009943, dated Aug. 31, 2023, 7 pages (2 pages of English Translation and 5 pages of Official Copy).
Notice of Allowance received for U.S. Appl. No. 17/483,542, dated Aug. 11, 2023, 9 pages.
Notice of Allowance received for U.S. Appl. No. 17/872,736, dated Aug. 21, 2023, 6 pages.
Notice of Allowance received for U.S. Appl. No. 17/872,736, dated Aug. 30, 2023, 4 pages.
Office Action received for Australian Patent Application No. 2022228191, dated Aug. 16, 2023, 4 pages.
Office Action received for Chinese Patent Application No. 201980012481.9, dated Jun. 8, 2023, 16 pages (9 pages of English Translation and 7 pages of Official Copy).
Office Action received for Chinese Patent Application No. 202110328597.2, dated Jul. 18, 2023, 21 pages (6 pages of English Translation and 15 pages of Official Copy).
Office Action received for Chinese Patent Application No. 202110328602.X, dated Jun. 29, 2023, 27 pages (18 pages of English Translation and 9 pages of Official Copy).
Office Action received for Chinese Patent Application No. 202211072958.2, dated Jun. 20, 2023, 48 pages (24 pages of English Translation and 24 pages of Official Copy).
Office Action received for Chinese Patent Application No. 202211073034.4, dated May 30, 2023, 21 pages (10 pages of English Translation and 11 pages of Official Copy).
Office Action received for European Patent Application No. 21157252.4, dated Jul. 24, 2023, 5 pages.
Office Action received for Japanese Patent Application No. 2022-130725, dated Sep. 4, 2023, 2 pages (1 page of English Translation and 1 page of Official Copy).
Result of Consultation received for European Patent Application No. 22184844.3, mailed on Aug. 28, 2023, 3 pages.
Shangmeng Li, "The Design and Implementation of Mobile Terminal System of Multimedia Conference Based on Symbian Operating System", China Academic Journal Electronic Publishing House, Online available at: http://www.cnki.net, 2011, 66 pages (Official Copy only). See Communication under 37 CFR § 1.98(a) (3).

* cited by examiner

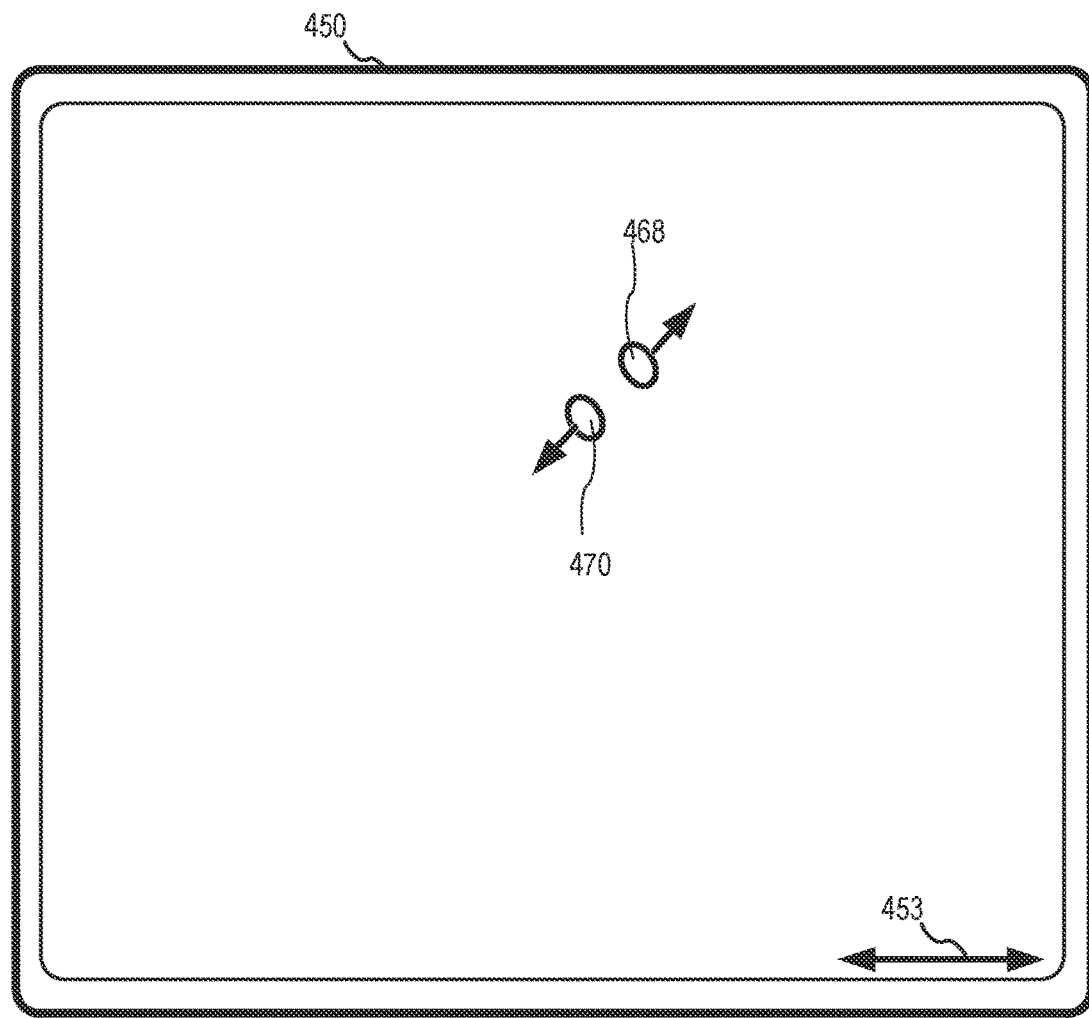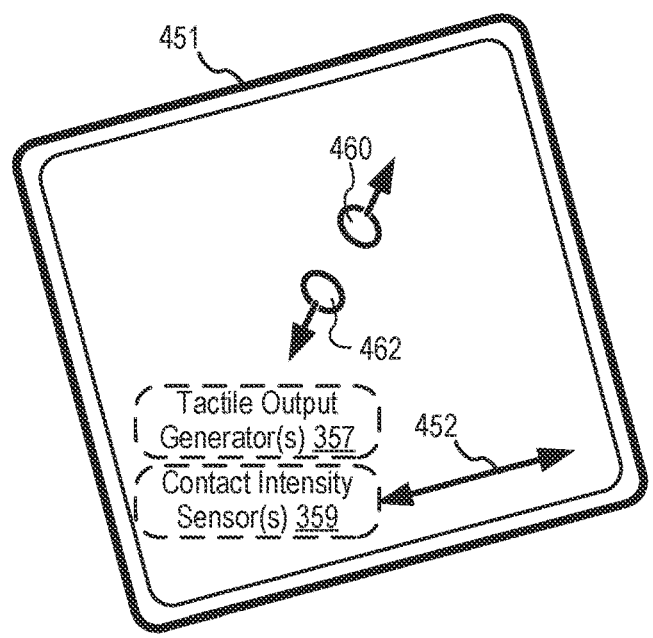
*FIG. 4B*

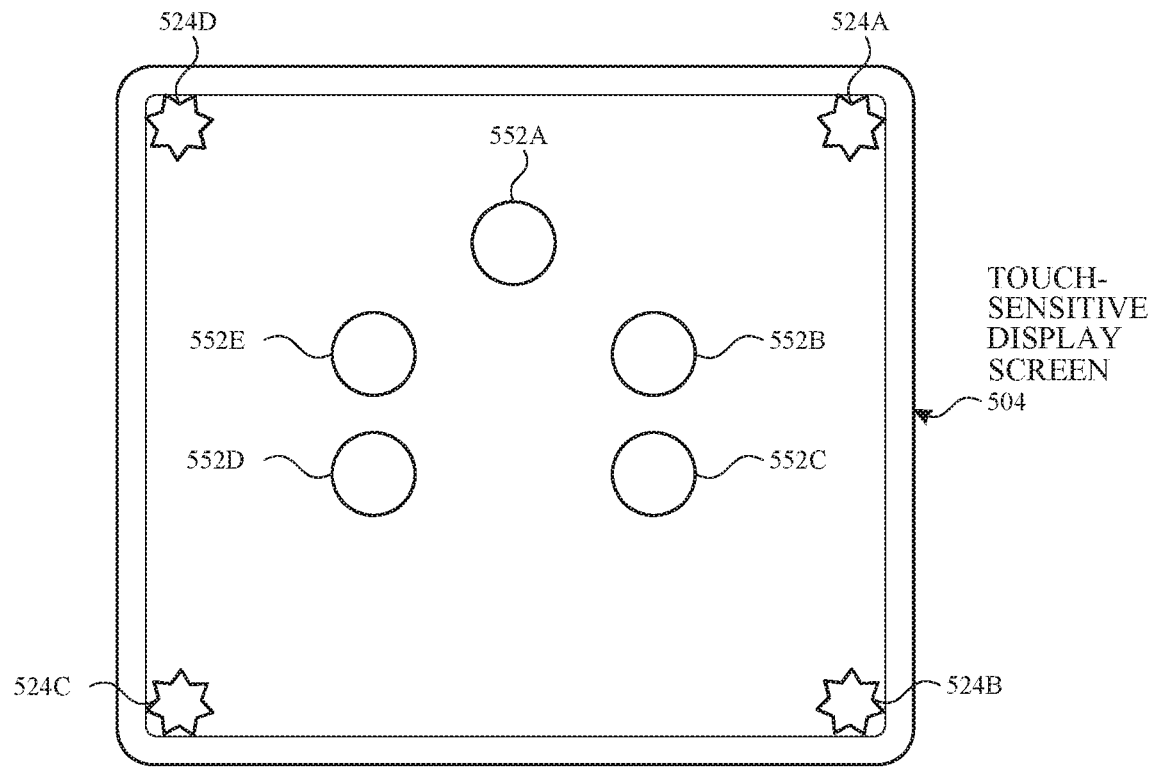
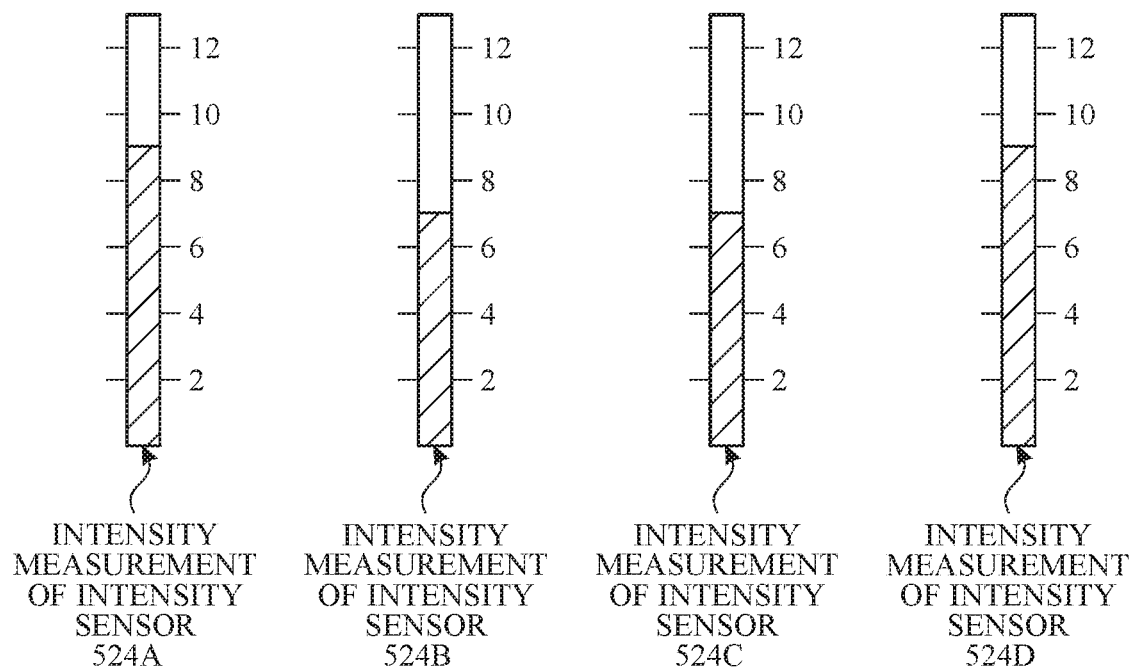
FIG. 5C

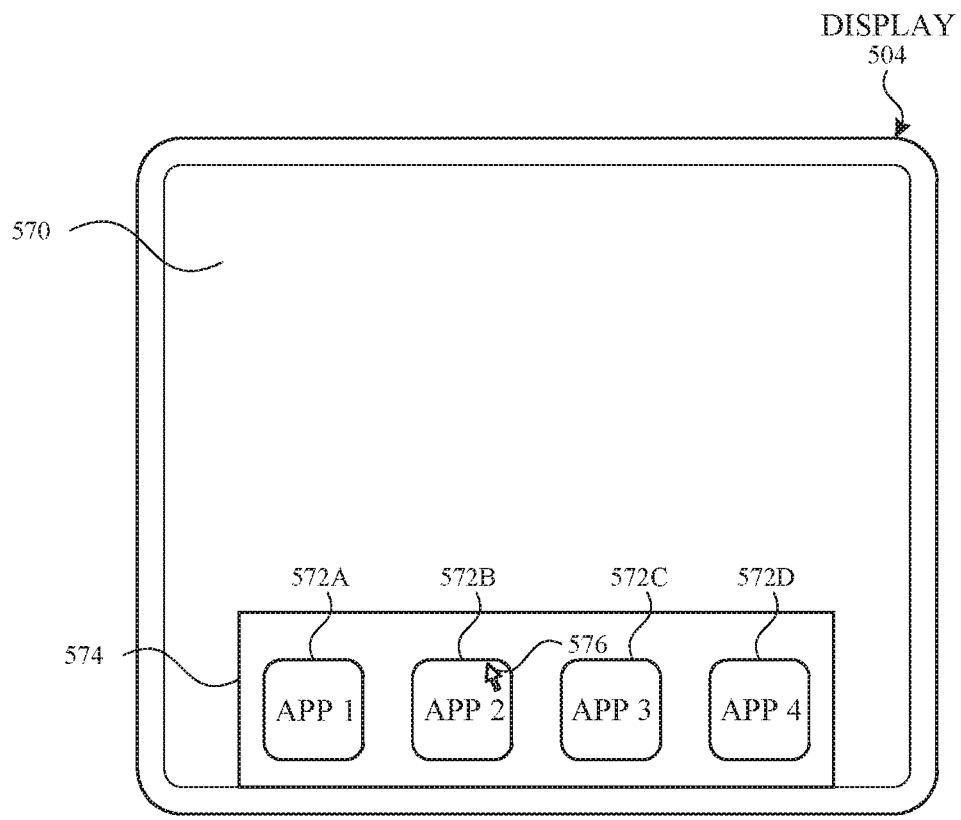
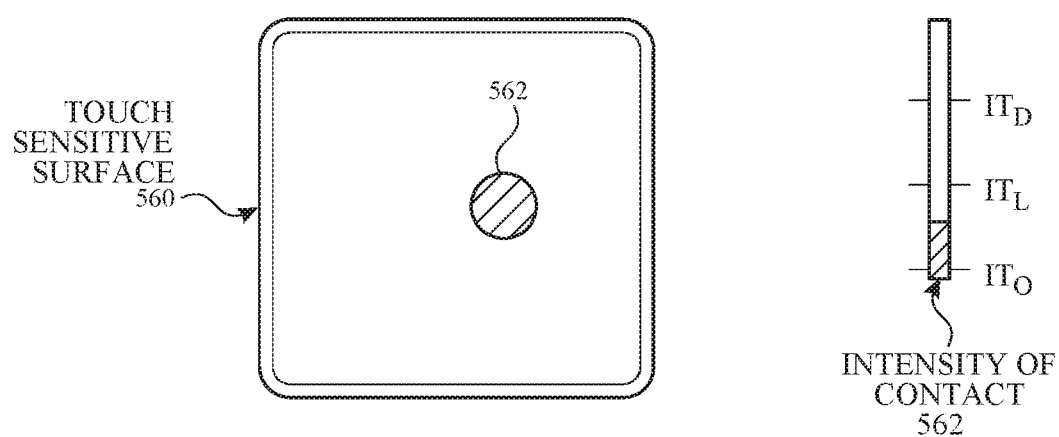
FIG. 5E

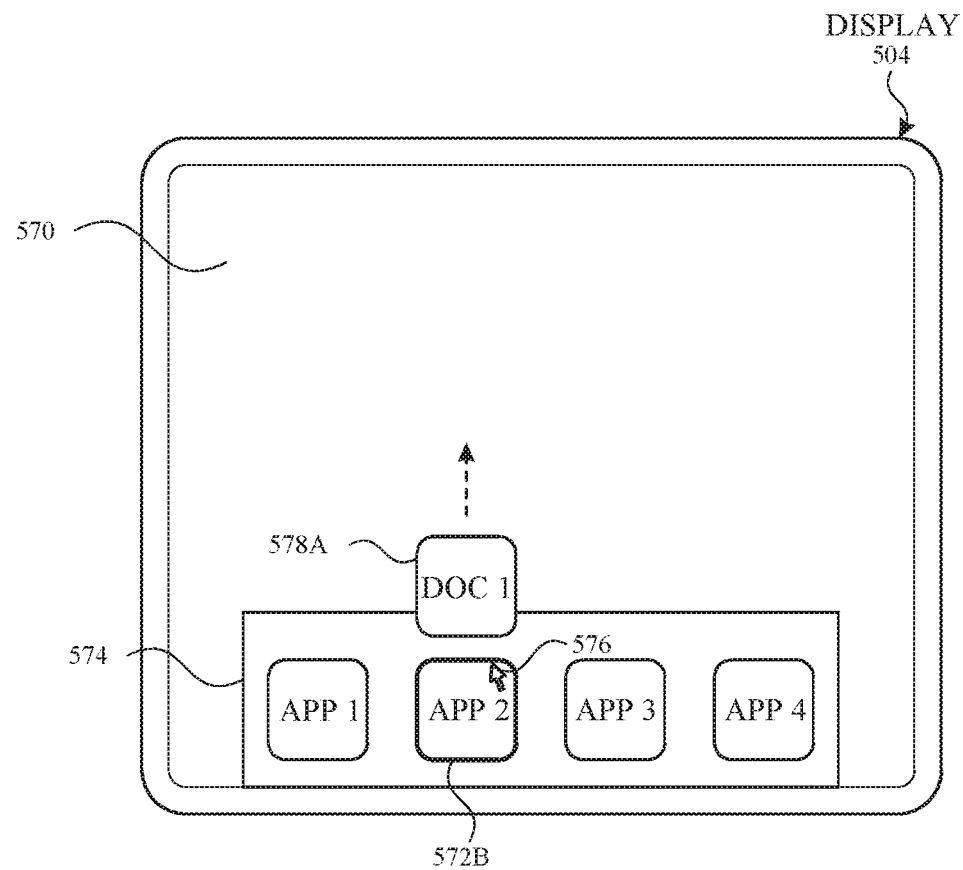
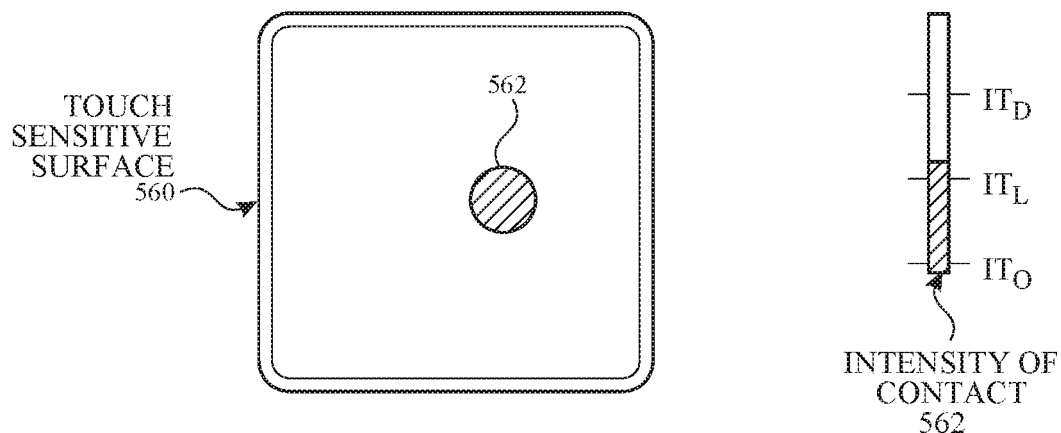
FIG. 5F

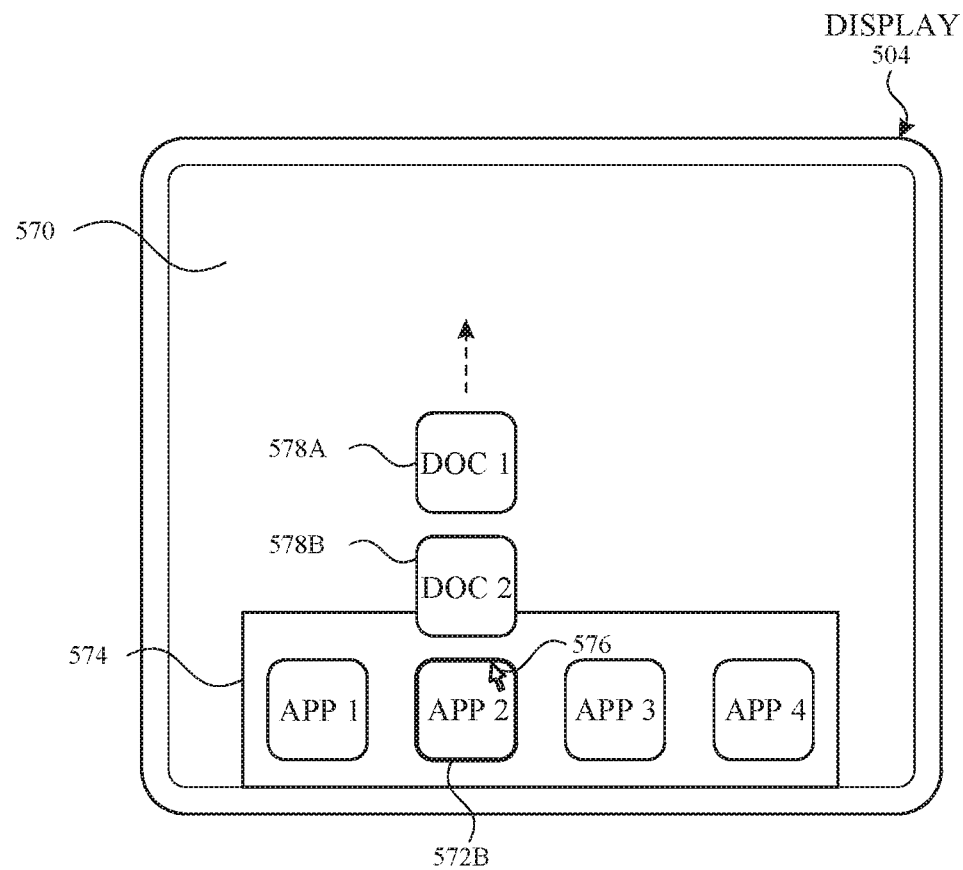
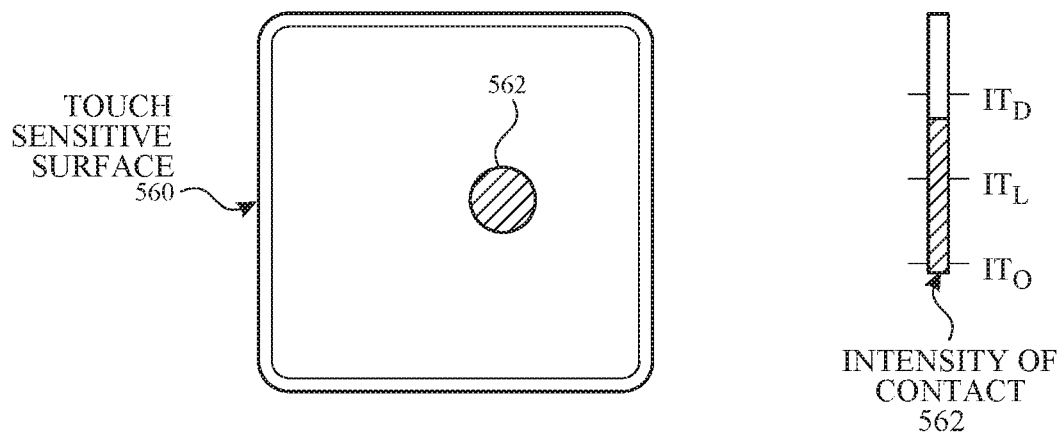
*FIG. 5G*

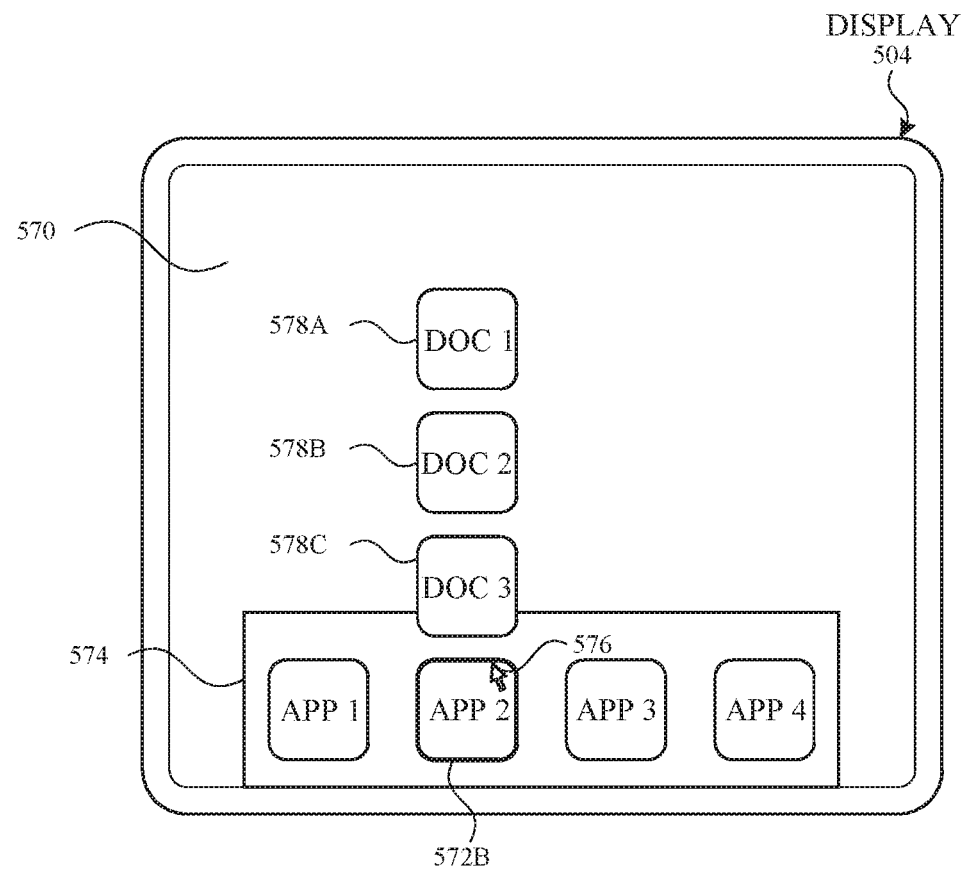
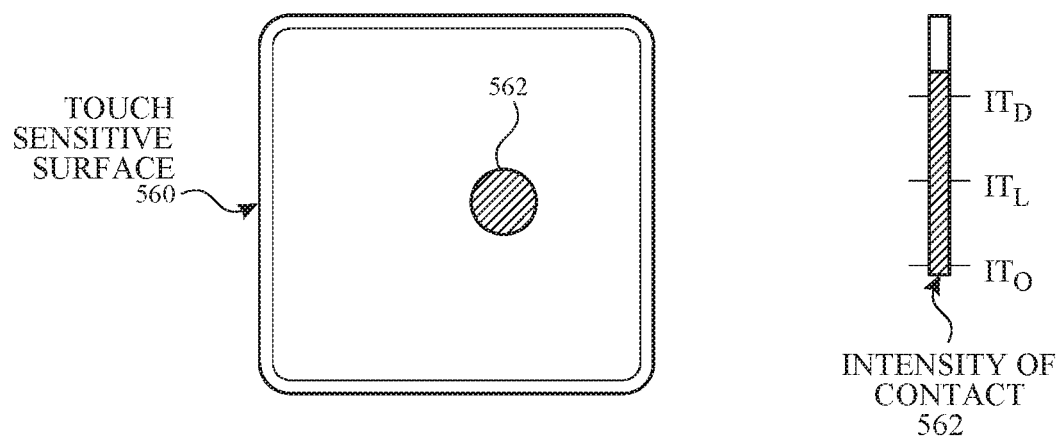
FIG. 5H

700 ⤴

702
Display video for a live communication session, wherein the video includes a subject of the live communication session with a predefined portion of the subject identified in a first focal region

704
In accordance with a determination that a set of one or more conditions is met, display the video with a focal plane of the video selected to be outside of the first focal region

710
While displaying the video for the live communication session with the focal plane of the video selected to be outside of the first focal region and while the set of one or more conditions is met:

712
Detect a change in position of the predefined portion of the subject

714
Modify the first focal region based on the change in position of the predefined portion of the subject

716
Display the video for the live communication session with the focal plane of the video adjusted to continue being outside of the first focal region

706
While displaying the video for the live communication session with the focal plane of the video selected to be outside of the first focal region, determine that the set of one or more conditions is no longer met

*FIG. 7A*

708
In response to the determination that the set of one or more conditions is no longer met, display the video for the live communication session with the focal plane of the video selected to be inside of the first focal region

718
While the set of one or more conditions is no longer met and while displaying the video for the live communication session with the focal plane of the video selected to be inside of the first focal region:

720
Detect a change in position of the predefined portion of the subject

722
Modify the first focal region based on the change in position of the predefined portion of the subject

724
Display the video for the live communication session with the focal plane of the video adjusted to continue being inside the first focal region

726
While displaying the video for the live communication session, detect an input on the touch-sensitive display

728
Display the video for the live communication session with the focal plane of the video selected based on one or properties of the input

*FIG. 7B*

CAPTURING AND DISPLAYING IMAGES WITH MULTIPLE FOCAL PLANES

CROSS-REFERENCE TO RELATED APPLICATIONS

This application is a continuation of U.S. patent application Ser. No. 16/528,941, filed Aug. 1, 2019, entitled "CAPTURING AND DISPLAYING IMAGES WITH MULTIPLE FOCAL PLANES", which claims priority to U.S. Provisional Application No. 62/739,093, filed Sep. 28, 2018, entitled "CAPTURING AND DISPLAYING IMAGES WITH MULTIPLE FOCAL PLANES", the contents of which are hereby incorporated by reference in their entireties.

FIELD

The present disclosure relates generally to user interfaces, and more specifically to techniques for capturing and displaying images with multiple focal planes.

BACKGROUND

Users are increasingly using electronic devices to capture images and virtually communicate with others for personal and business reasons. Most electronic devices are capable of capturing images for live communication between users. As an example, some electronic devices provide interactive interfaces to display and control the live communication.

BRIEF SUMMARY

Some techniques for capturing and displaying images, however, are generally cumbersome and inefficient. For example, some existing techniques use a complex and time-consuming user interface to capture or display images with different focal planes, which may include multiple key presses or other physical inputs. Existing techniques require more time than necessary, wasting user time and device energy. This latter consideration is particularly important in battery-operated devices.

Accordingly, the present technique provides electronic devices with faster, more efficient methods and interfaces for capturing and displaying images with multiple focal planes. Such methods and interfaces optionally complement or replace other methods for capturing and displaying images. Such methods and interfaces reduce the cognitive burden on a user and produce a more efficient human-machine interface. For battery-operated computing devices, such methods and interfaces conserve power and increase the time between battery charges.

In some embodiments, a method is performed at an electronic device with a display. The method includes: displaying video for a live communication session, wherein the video includes a subject of the live communication session with a predefined portion of the subject identified in a first focal region, including, in accordance with a determination that a set of one or more conditions is met, displaying the video with a focal plane of the video selected to be outside of the first focal region; and while displaying the video for the live communication session with the focal plane of the video selected to be outside of the first focal region, determining that the set of one or more conditions is no longer met; and in response to the determination that the set of one or more conditions is no longer met, displaying the video for the live communication session with the focal plane of the video selected to be inside of the first focal region.

In some embodiments, a non-transitory computer-readable storage medium stores one or more programs configured to be executed by one or more processors of an electronic device with a display. The one or more programs include instructions for: displaying video for a live communication session, wherein the video includes a subject of the live communication session with a predefined portion of the subject identified in a first focal region, including, in accordance with a determination that a set of one or more conditions is met, displaying the video with a focal plane of the video selected to be outside of the first focal region; and while displaying the video for the live communication session with the focal plane of the video selected to be outside of the first focal region, determining that the set of one or more conditions is no longer met; and in response to the determination that the set of one or more conditions is no longer met, displaying the video for the live communication session with the focal plane of the video selected to be inside of the first focal region.

In some embodiments, a transitory computer-readable storage medium stores one or more programs configured to be executed by one or more processors of an electronic device with a display. The one or more programs include instructions for: displaying video for a live communication session, wherein the video includes a subject of the live communication session with a predefined portion of the subject identified in a first focal region, including, in accordance with a determination that a set of one or more conditions is met, displaying the video with a focal plane of the video selected to be outside of the first focal region; and while displaying the video for the live communication session with the focal plane of the video selected to be outside of the first focal region, determining that the set of one or more conditions is no longer met; and in response to the determination that the set of one or more conditions is no longer met, displaying the video for the live communication session with the focal plane of the video selected to be inside of the first focal region.

In some embodiments, an electronic device includes a display, one or more processors, and memory. The memory stores one or more programs configured to be executed by the one or more processors. The one or more programs including instructions for: displaying video for a live communication session, wherein the video includes a subject of the live communication session with a predefined portion of the subject identified in a first focal region, including, in accordance with a determination that a set of one or more conditions is met, displaying the video with a focal plane of the video selected to be outside of the first focal region; and while displaying the video for the live communication session with the focal plane of the video selected to be outside of the first focal region, determining that the set of one or more conditions is no longer met; and in response to the determination that the set of one or more conditions is no longer met, displaying the video for the live communication session with the focal plane of the video selected to be inside of the first focal region.

In some embodiments, an electronic device includes: a display; means for displaying video for a live communication session, wherein the video includes a subject of the live communication session with a predefined portion of the subject identified in a first focal region, including, means for, in accordance with a determination that a set of one or more conditions is met, displaying the video with a focal plane of the video selected to be outside of the first focal region; and means for, while displaying the video for the live communication session with the focal plane of the video selected to be outside of the first focal region, determining that the set of one or more conditions is no longer met; and means for, in response to the determination that the set of one or more conditions is no longer met, displaying the video for the live communication session with the focal plane of the video selected to be inside of the first focal region.

In some embodiments, a method is performed at an electronic device with a camera. The method includes: detecting activation of a shutter button that is associated with capturing still images; and in response to the activation of the shutter button, capturing a plurality of still images with a plurality of different focal planes, including: capturing first image data with the camera focused at a first focal plane; and after capturing the first image data with the camera focused at the first focal plane, capturing second image data with the camera focused at a second focal plane, wherein the second focal plane is selected without reference to changes in objects in the field of view of the camera between the capture of the first image data and the capture of the second image data.

In some embodiments, a non-transitory computer-readable storage medium stores one or more programs configured to be executed by one or more processors of an electronic device with a camera. The one or more programs include instructions for: detecting activation of a shutter button that is associated with capturing still images; and in response to the activation of the shutter button, capturing a plurality of still images with a plurality of different focal planes, including: capturing first image data with the camera focused at a first focal plane; and after capturing the first image data with the camera focused at the first focal plane, capturing second image data with the camera focused at a second focal plane, wherein the second focal plane is selected without reference to changes in objects in the field of view of the camera between the capture of the first image data and the capture of the second image data.

In some embodiments, a transitory computer-readable storage medium stores one or more programs configured to be executed by one or more processors of an electronic device with a camera. The one or more programs include instructions for: detecting activation of a shutter button that is associated with capturing still images; and in response to the activation of the shutter button, capturing a plurality of still images with a plurality of different focal planes, including: capturing first image data with the camera focused at a first focal plane; and after capturing the first image data with the camera focused at the first focal plane, capturing second image data with the camera focused at a second focal plane, wherein the second focal plane is selected without reference to changes in objects in the field of view of the camera between the capture of the first image data and the capture of the second image data.

In some embodiments, an electronic device includes a camera, one or more processors, and memory. The memory stores one or more programs configured to be executed by the one or more processors. The one or more programs including instructions for: detecting activation of a shutter button that is associated with capturing still images; and in response to the activation of the shutter button, capturing a plurality of still images with a plurality of different focal planes, including: capturing first image data with the camera focused at a first focal plane; and after capturing the first image data with the camera focused at the first focal plane, capturing second image data with the camera focused at a second focal plane, wherein the second focal plane is selected without reference to changes in objects in the field of view of the camera between the capture of the first image data and the capture of the second image data.

In some embodiments, an electronic device includes: a camera; means for detecting activation of a shutter button that is associated with capturing still images; and means for, in response to the activation of the shutter button, capturing a plurality of still images with a plurality of different focal planes, including: means for capturing first image data with the camera focused at a first focal plane; and means for after capturing the first image data with the camera focused at the first focal plane, capturing second image data with the camera focused at a second focal plane, wherein the second focal plane is selected without reference to changes in objects in the field of view of the camera between the capture of the first image data and the capture of the second image data.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for capturing and displaying images with multiple focal planes, thereby increasing the effectiveness, efficiency, and user satisfaction with such devices. Such methods and interfaces may complement or replace other methods for capturing and displaying images.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 7A-7B are a flow diagram illustrating a method for displaying video for a live communication session with different focal planes, in accordance with some embodiments.

DESCRIPTION OF EMBODIMENTS

Figure 1A:
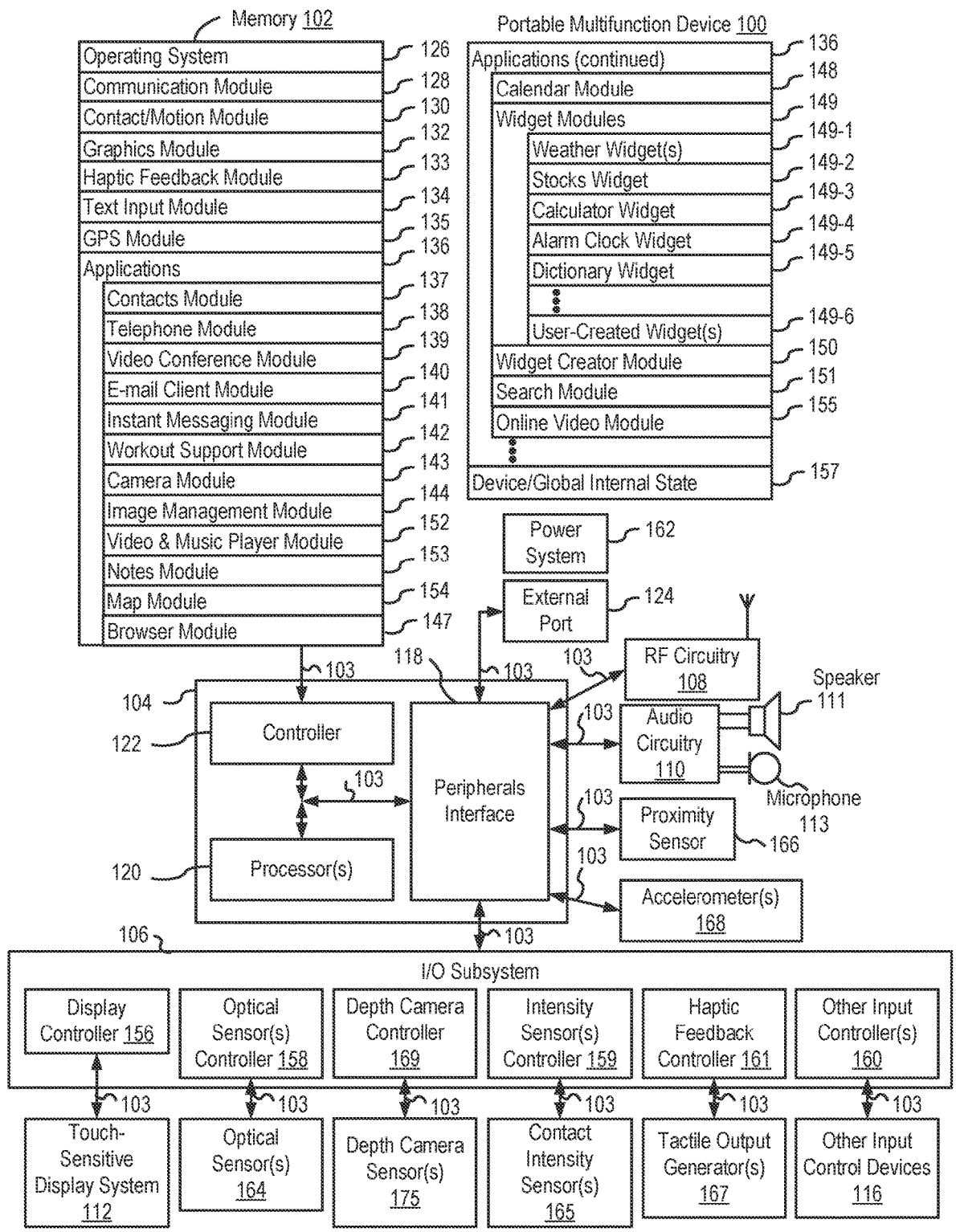
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for capturing and displaying images with multiple focal planes. Such techniques can reduce the cognitive burden on a user who participates in live communication sessions or edits images, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for capturing and displaying images with multiple focal planes. FIGS. 6A-6H illustrate exemplary user interfaces for displaying video for a live communication session with multiple focal planes. FIGS. 7A-7B are a flow diagram illustrating methods of displaying the video for the live communication session in accordance with some embodiments. The user interfaces in FIGS. 6A-6H are used to illustrate the processes described below, including the processes in FIGS. 7A-7B. FIGS. 8A-8E illustrate exemplary user interfaces for capturing images with multiple focal planes. FIG. 9 is a flow diagram illustrating methods of capturing the images in accordance with some embodiments. The user interfaces in FIGS. 8A-8E are used to illustrate the processes described below, including the processes in FIG. 9.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system."

Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/ output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser.

No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
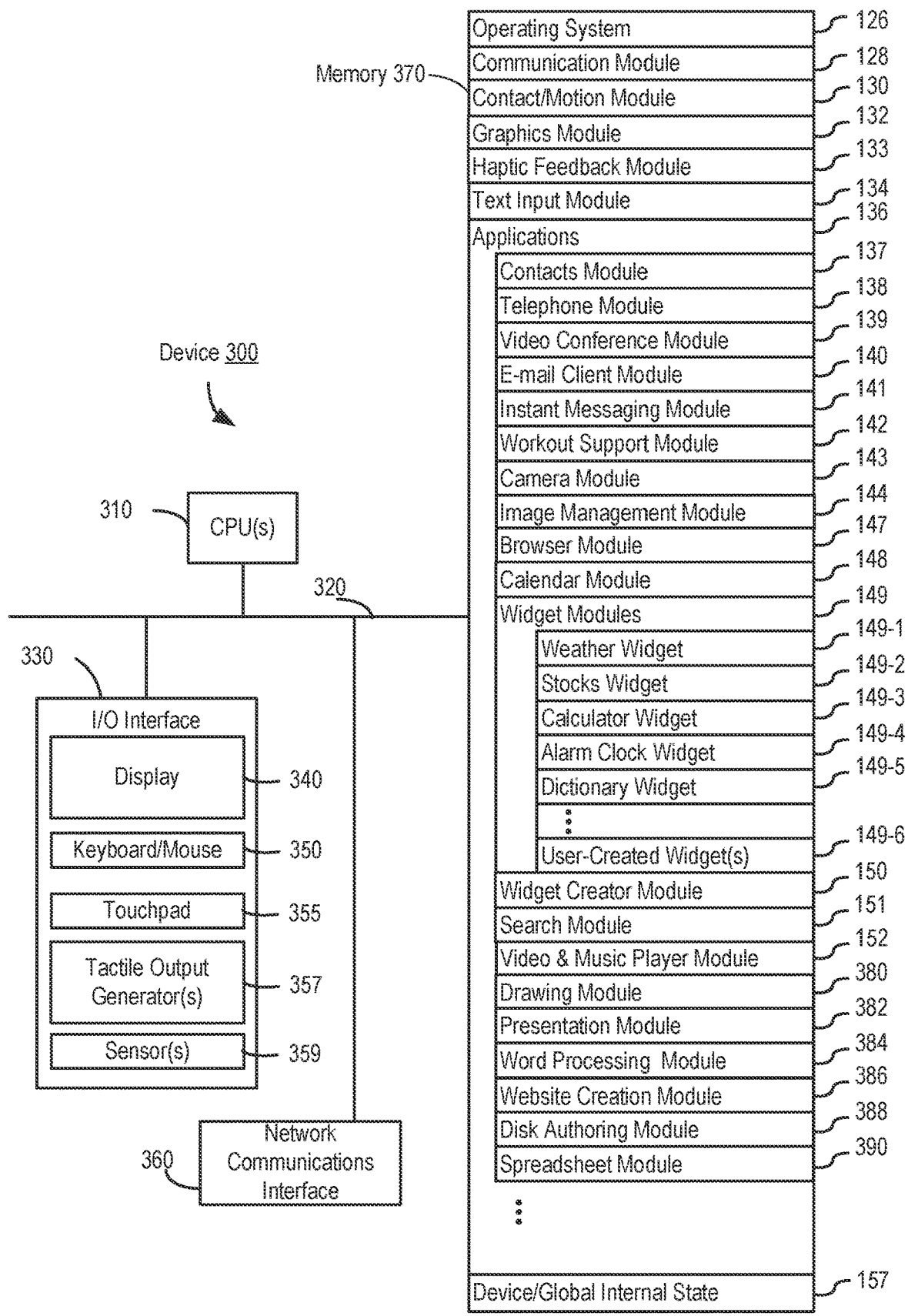
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
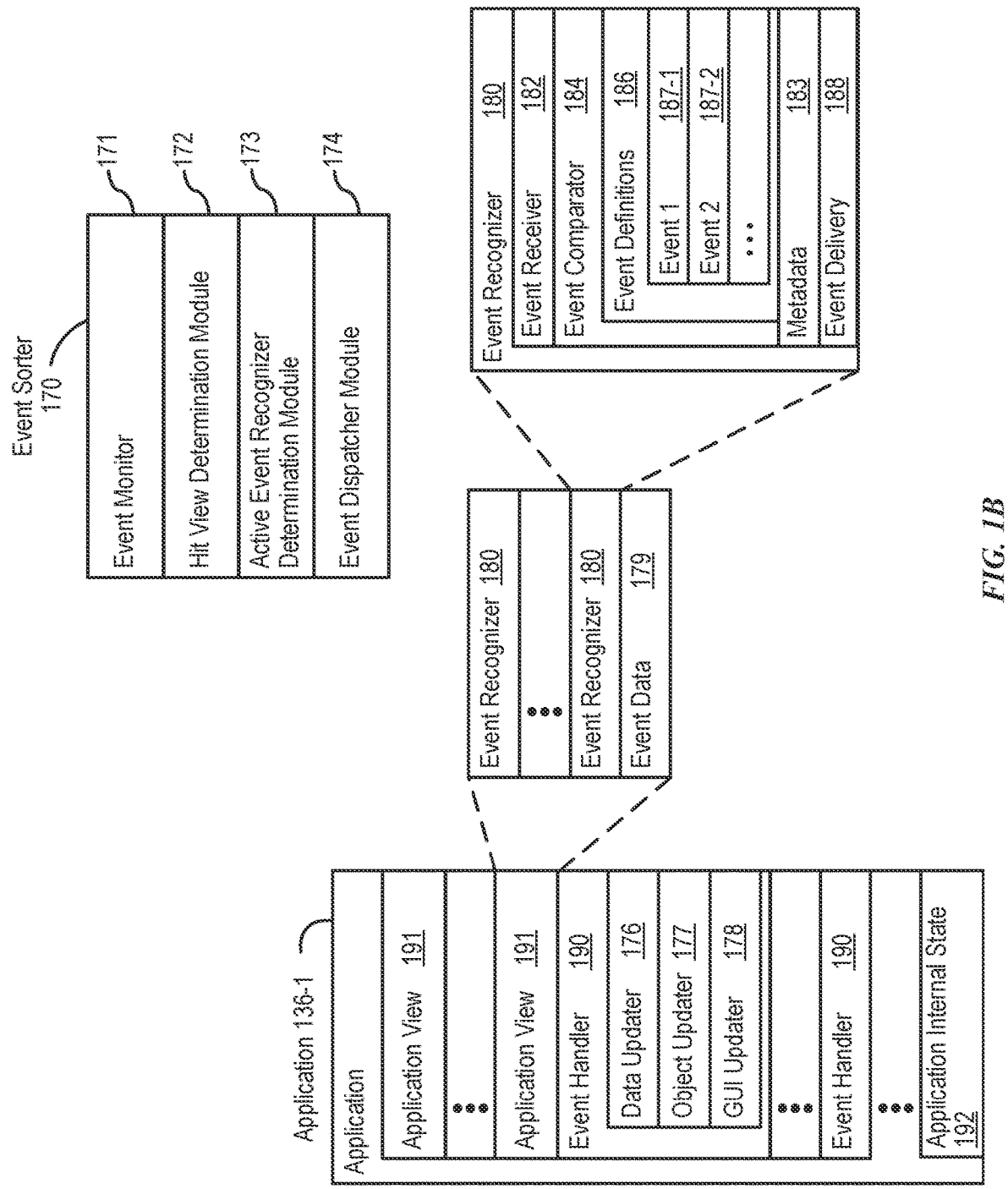
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
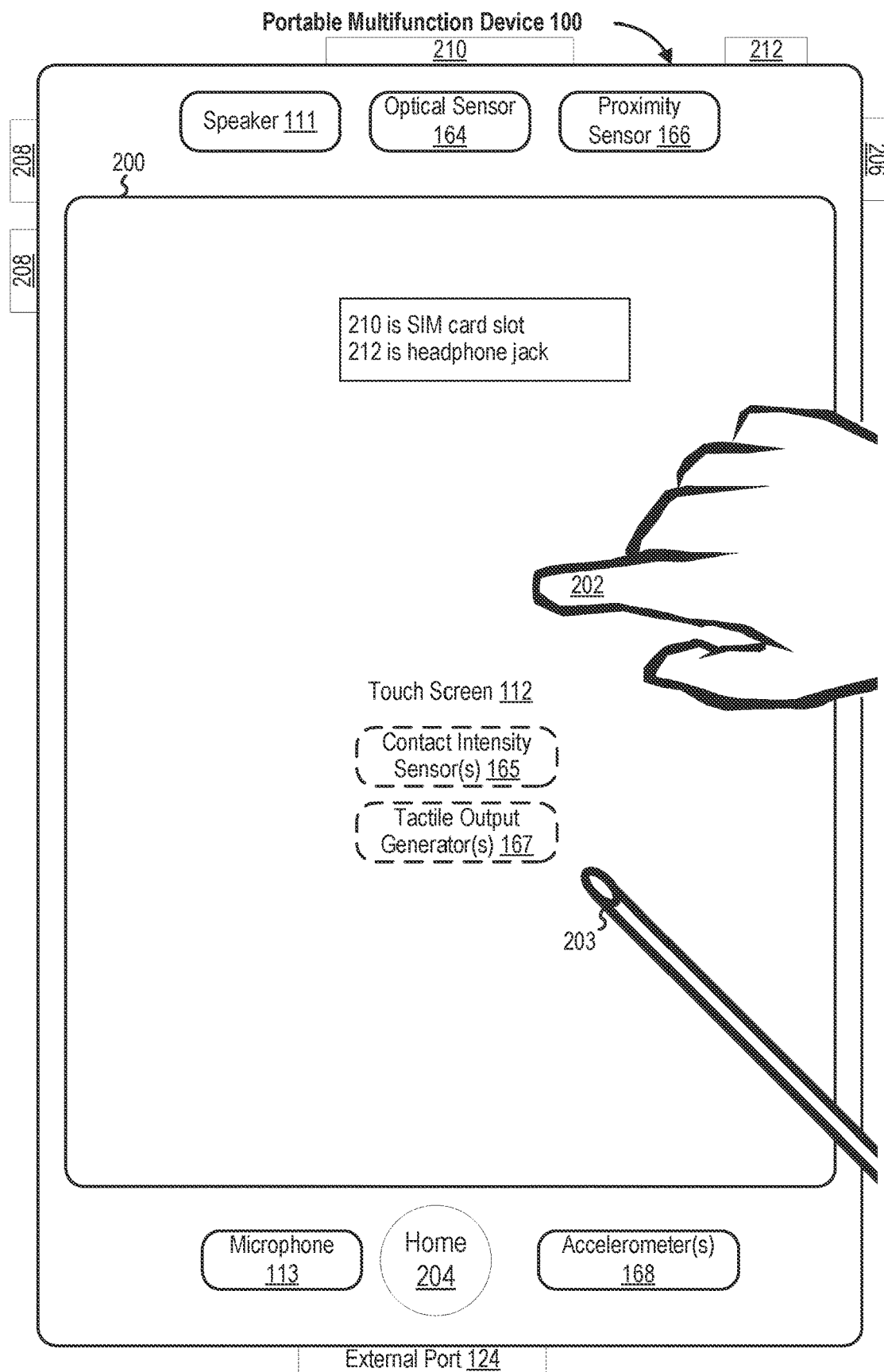
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
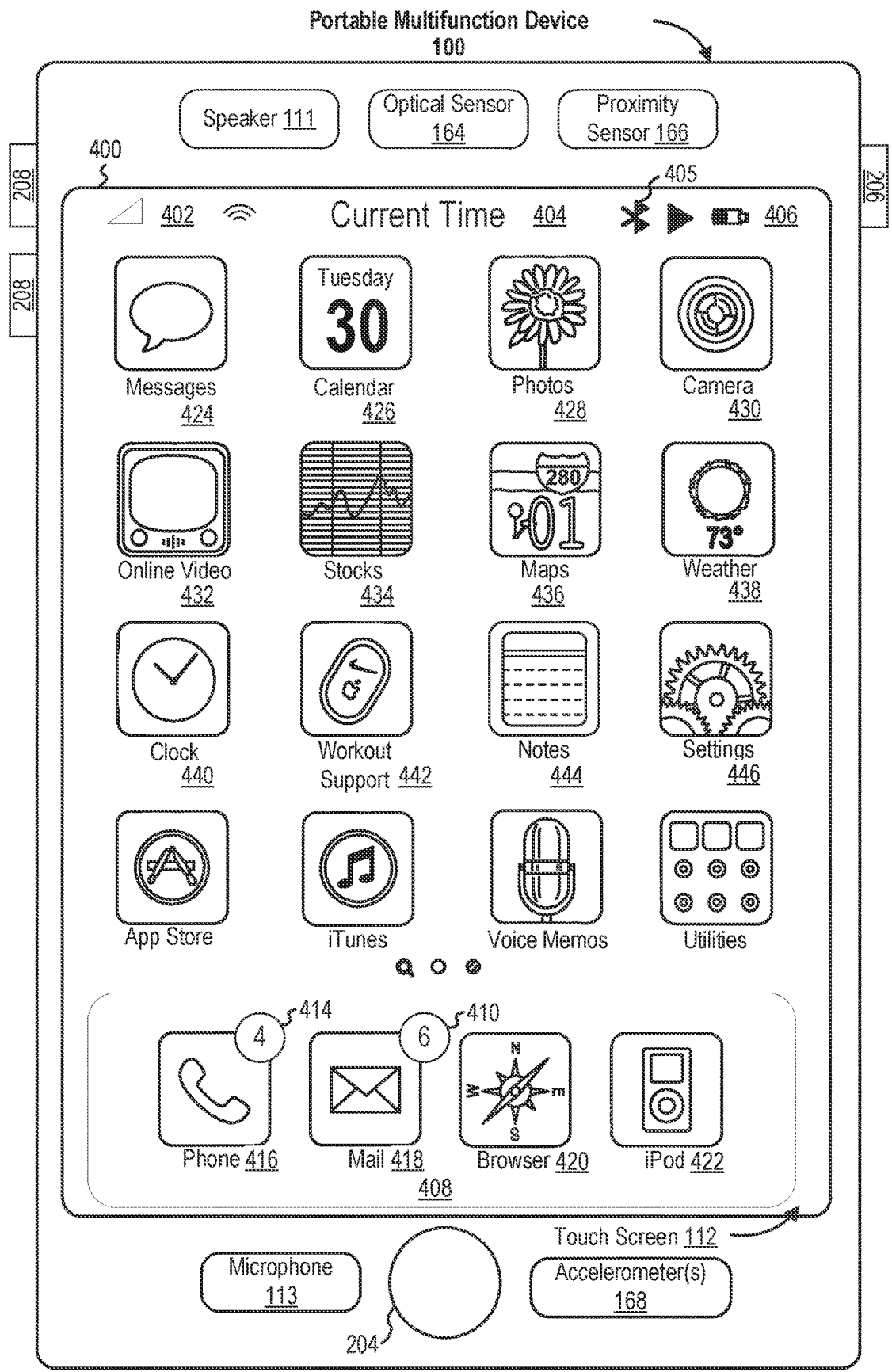
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
   Icon 416 for telephone module 138, labeled "Phone," which optionally includes an indicator 414 of the number of missed calls or voicemail messages;
   Icon 418 for e-mail client module 140, labeled "Mail," which optionally includes an indicator 410 of the number of unread e-mails;
   Icon 420 for browser module 147, labeled "Browser;" and
   Icon 422 for video and music player module 152, also referred to as iPod (trademark of Apple Inc.) module 152, labeled "iPod;" and
Icons for other applications, such as:
   Icon 424 for IM module 141, labeled "Messages;"
   Icon 426 for calendar module 148, labeled "Calendar;"
   Icon 428 for image management module 144, labeled "Photos;"
   Icon 430 for camera module 143, labeled "Camera;"
   Icon 432 for online video module 155, labeled "Online Video;"
   Icon 434 for stocks widget 149-2, labeled "Stocks;"
   Icon 436 for map module 154, labeled "Maps;"
   Icon 438 for weather widget 149-1, labeled "Weather;"
   Icon 440 for alarm clock widget 149-4, labeled "Clock;"
   Icon 442 for workout support module 142, labeled "Workout Support;"
   Icon 444 for notes module 153, labeled "Notes;" and
   Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
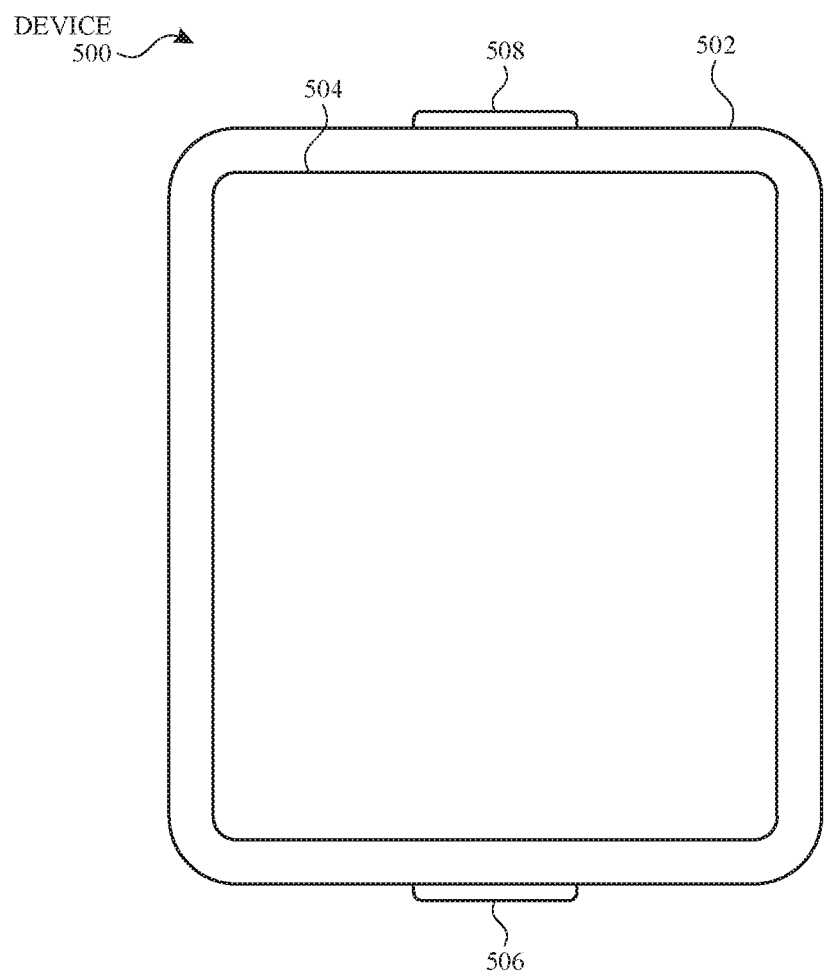
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
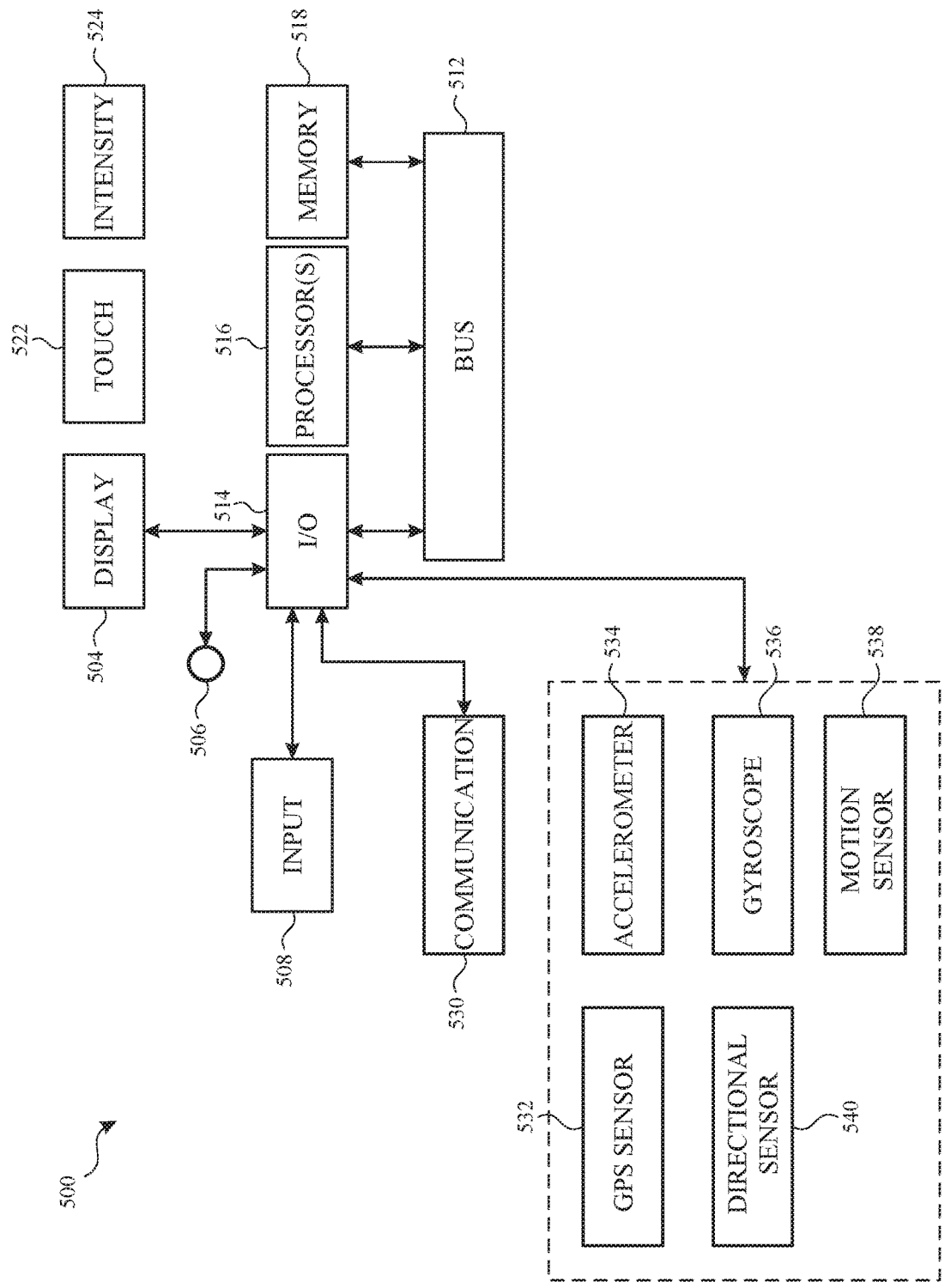
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7A-7B and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
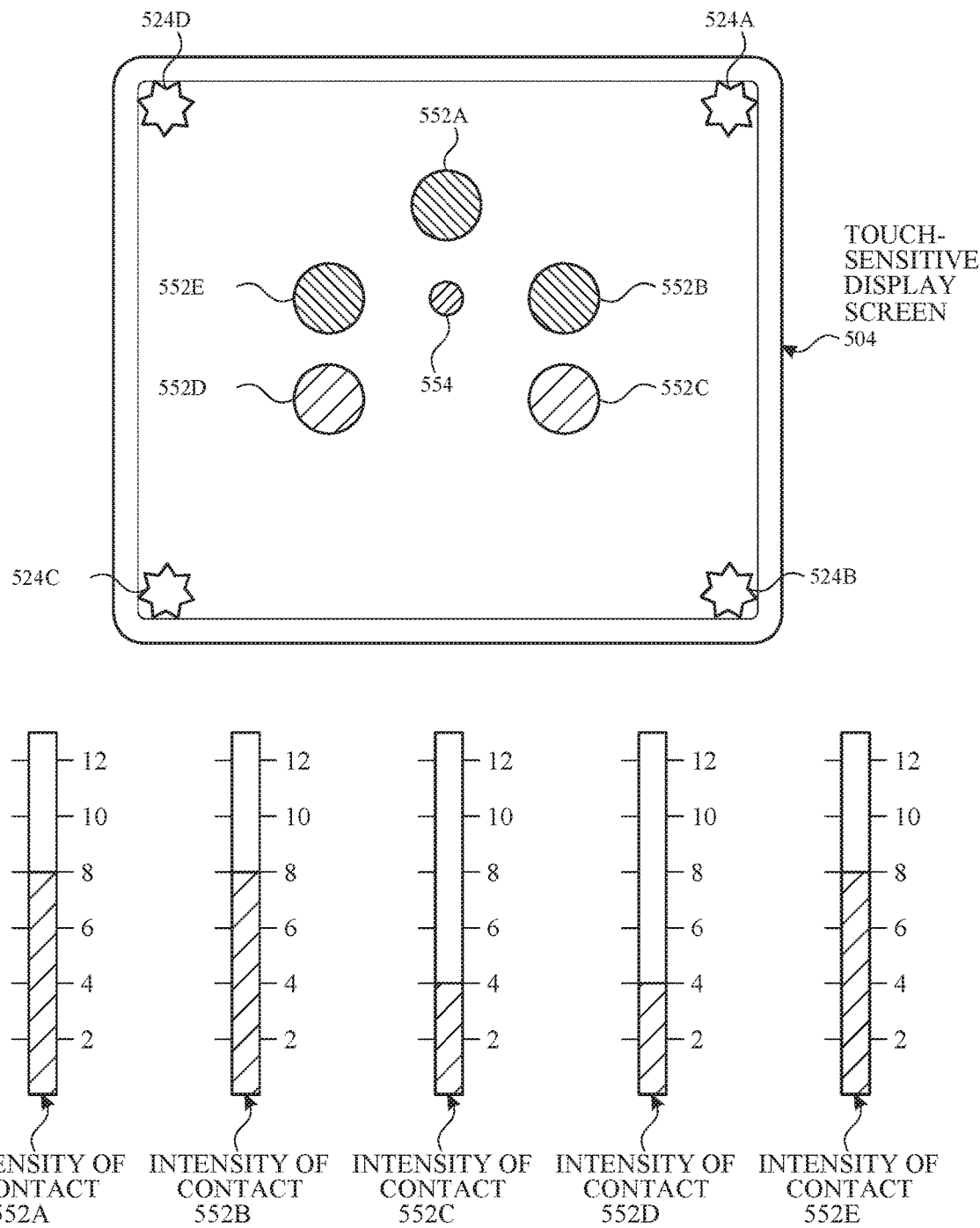

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITS") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6H illustrate exemplary user interfaces displaying video for a live communication session with multiple focal planes, in accordance with some embodiments. The user interfaces in these figures are used to illustrate the processes described below, including the processes in FIGS. 7A-7B.

Figure 6A:
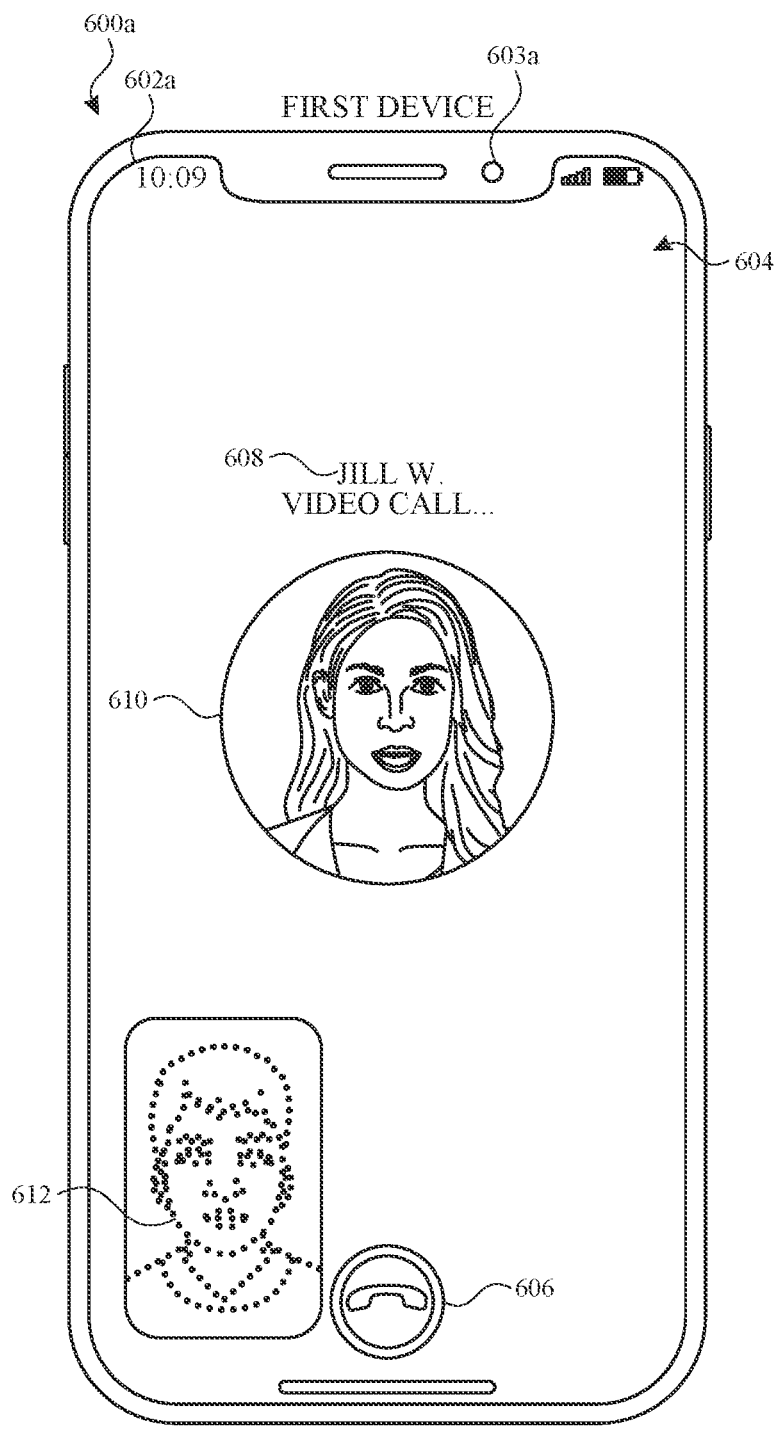
FIGS. 6A-6H illustrate exemplary user interfaces displaying video for a live communication session with multiple focal planes, in accordance with some embodiments.

FIG. 6A illustrates a first device 600a with first touch-sensitive display 602a. In some embodiments, first device 600a includes one or more features of devices 100, 300, and 500. First device 600a also includes first camera 603a, which, at a minimum, includes an image sensor that is capable of capturing data representing a portion of the light spectrum (e.g., visible light, infrared light, or ultraviolet light). First camera 603a includes at least one focal lens capable of being adjusted to focus first camera 603a on different focal planes (e.g., distances from first camera 603a at which the sharpest focus is attained). In some embodiments, first camera 603a includes a single focal lens for adjusting the focal plane. In some embodiments, the focal plane is adjusted by modifying the shape of the single focal lens. First camera 603a is capable of being adjusted to focus on different focal planes and capture images at different focal planes within a brief amount of time (e.g., less than 0.5 ms, 1 ms, 5 ms, 10 ms, 15 ms, or 20 ms). The images are captured at each of the different focal planes at a speed such that the multiple images with different focal planes can be associated with a single frame of video (e.g., the images are captured within a time period less than the time period of a frame of video). The content of the images associated with a frame of video appears substantially the same except for the difference in focal planes between the images. In some embodiments, one or more photographic properties of first camera 603a other than the focal plane (e.g., exposure, zoom level, white balance, contrast, ISO value) are kept constant during the capture of the multiple images.

In some embodiments, first camera 603a includes multiple image sensors and/or other types of sensors. In addition to capturing data representing sensed light, in some embodiments, first camera 603a is capable of capturing other types of data, such as depth data. For example, in some embodiments, first camera 603a also captures depth data using techniques based on speckle, time-of-flight, parallax, or focus. Image data that first device 600a captures using first camera 603a includes data corresponding to a portion of the light spectrum for a scene within the field of view of the camera. Additionally, in some embodiments, the captured image data also includes depth data for the light data. In some other embodiments, the captured image data contains data sufficient to determine or generate depth data for the data for the portion of the light spectrum.

In some examples, first device 600a includes a depth camera (e.g., as part of first camera 603a), such as an infrared camera, a thermographic camera, or a combination thereof. In some examples, first device 600a further includes a light-emitting device (e.g., light projector), such as an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of a subject captured by the visible light camera. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint.) In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

As illustrated in FIG. 6A, first device 600a displays outgoing notification 604 of a live communication application (e.g., a video chat application). The outgoing notification 604 is displayed in response to sending a request to a second device (e.g., second device 600b described in reference to FIG. 6B) to join a live communication session (e.g., a video chat). Outgoing notification 604 includes cancel affordance 606 for canceling the request to join the live communication session (e.g., to immediately end the live communication session). In some embodiments, outgoing notification 604 also includes a name 608 of a second participant being requested to join the live communication session and/or an avatar 610 for the second participant. Outgoing notification 604 also includes an image 612 (e.g., a frame of video) of the first participant sending the request (e.g., a user of first device 600a) (e.g., as a preview of video being sent to second device 600b, as described in reference to FIG. 6B). Image 612 is captured via first camera 603a and corresponds to an environment within the field-of-view of first camera 603a. In this example, the environment within the field-of-view of first camera 603a includes the first participant sending the request.

In some embodiments, first device 600a captures image 612 such that the first participant appears out-of-focus (as illustrated by the dashed lines shown in FIG. 6A). In some embodiments, first device 600a identifies a first focal region where a predefined portion of the first participant (e.g., the first participant's face) would be captured with a sharp focus, and sets a focal plane of first camera 603a to be outside of that first focal region (e.g., the focal plane of first camera 603a is set such that the first participant's face is captured out-of-focus). In some embodiments, first device 600a captures multiple images of the first participant, where each image is captured with the first camera 603a set to a different focal plane, and where at least one of the images is captured with the focal plane of first camera 603a set to be outside of the first focal region (e.g., the first participant's face is captured out-of-focus in at least one of the images). In some embodiments, one or more of the images captured by first camera 603a are transmitted to the second device with the request to join the live communication session.

Figure 6B:
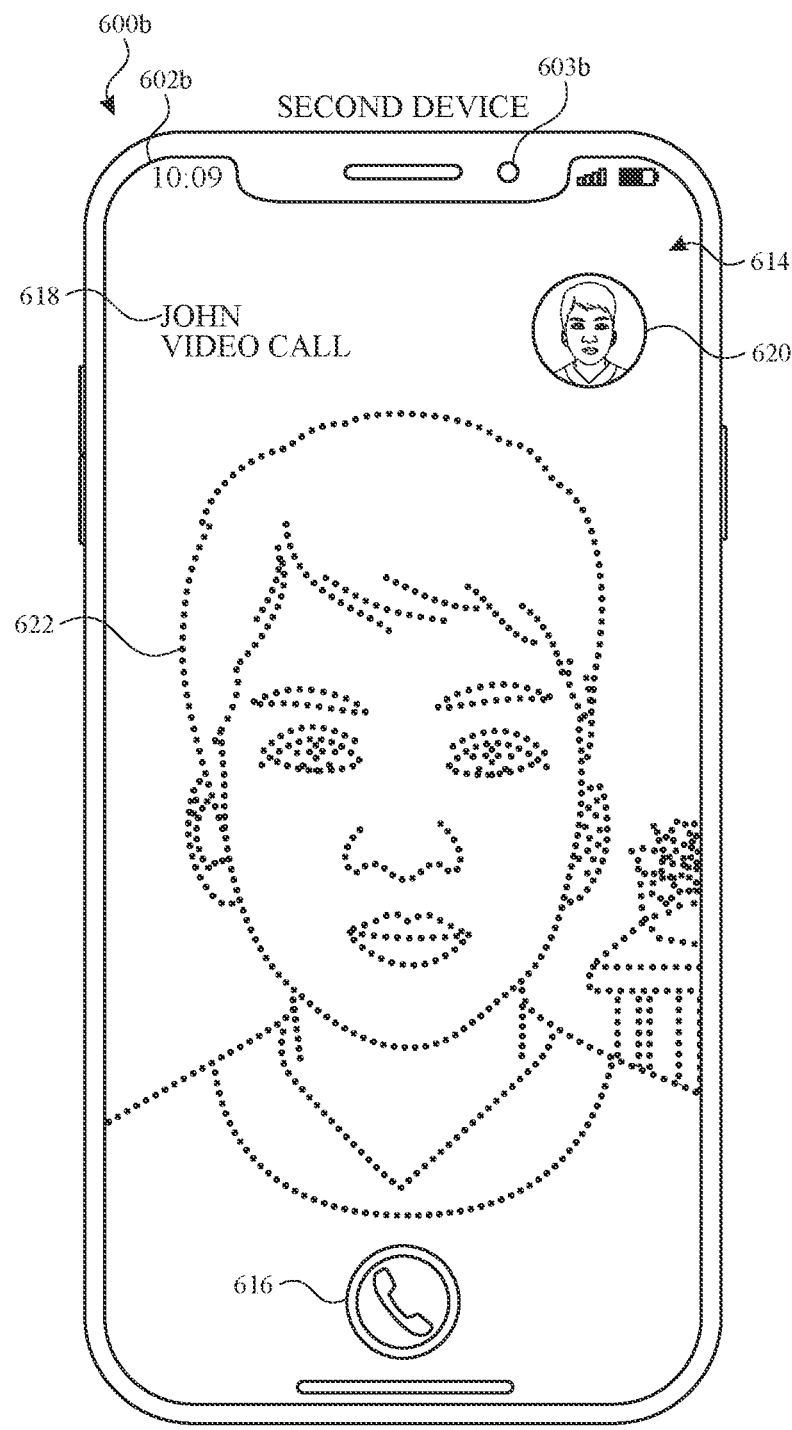

FIG. 6B illustrates a second device 600b with second touch-sensitive display 602b. In some embodiments, second device 600b includes one or more features of devices 100, 300, 500, and 600a. In some embodiments, second device 600b also includes second camera 603b. In some embodiments, second camera 603b includes one or more features of first camera 600a (e.g., at least one focal lens capable of being adjusted to focus second camera 603b on different focal planes).

As illustrated in FIG. 6B, second device 600b displays incoming notification 614 of a live communication application (e.g., a video chat application, such as a video chat application that is the same as, or compatible with, the video chat application generating notification outgoing notification 604 on device 600a). Incoming notification 614 is displayed in response to receiving a request to join a live communication session (e.g., a video chat) from first device 600a. Incoming notification 614 includes answer affordance 616 for joining the live communication session (e.g., to immediately join the live communication session or display a menu with options for joining the live communication session). In some embodiments, incoming notification 614 also includes a name 618 of the first participant sending the request and/or an avatar 620 for the first participant. Incoming notification 614 also includes an image 622 (e.g., a frame of video) of the first participant (e.g., the user of first device 600a).

While the request to join the live communication session is pending (e.g., before answer affordance 616 is selected), image 622 is displayed such that the first participant sending the request appears out-of-focus (e.g., blurry). In some embodiments, the first participant is displayed out-of-focus as a result of first device 600a setting the focal plane of first camera 603a to a focal region where the first participant is out-of-focus. In some embodiments, the participant is displayed out-of-focus as a result of second device 600b sending a request to first device 600a to set the focal plane of first camera 603a to a focal region where the first participant is out-of-focus. In some embodiments, the video data being sent by first device 600a to second device 600b includes image data of the first participant at multiple focal planes. Second device 600b then selects image data with a focal plane where the first participant is out-of-focus for display as image 622 in the incoming notification 614.

Figure 6C:
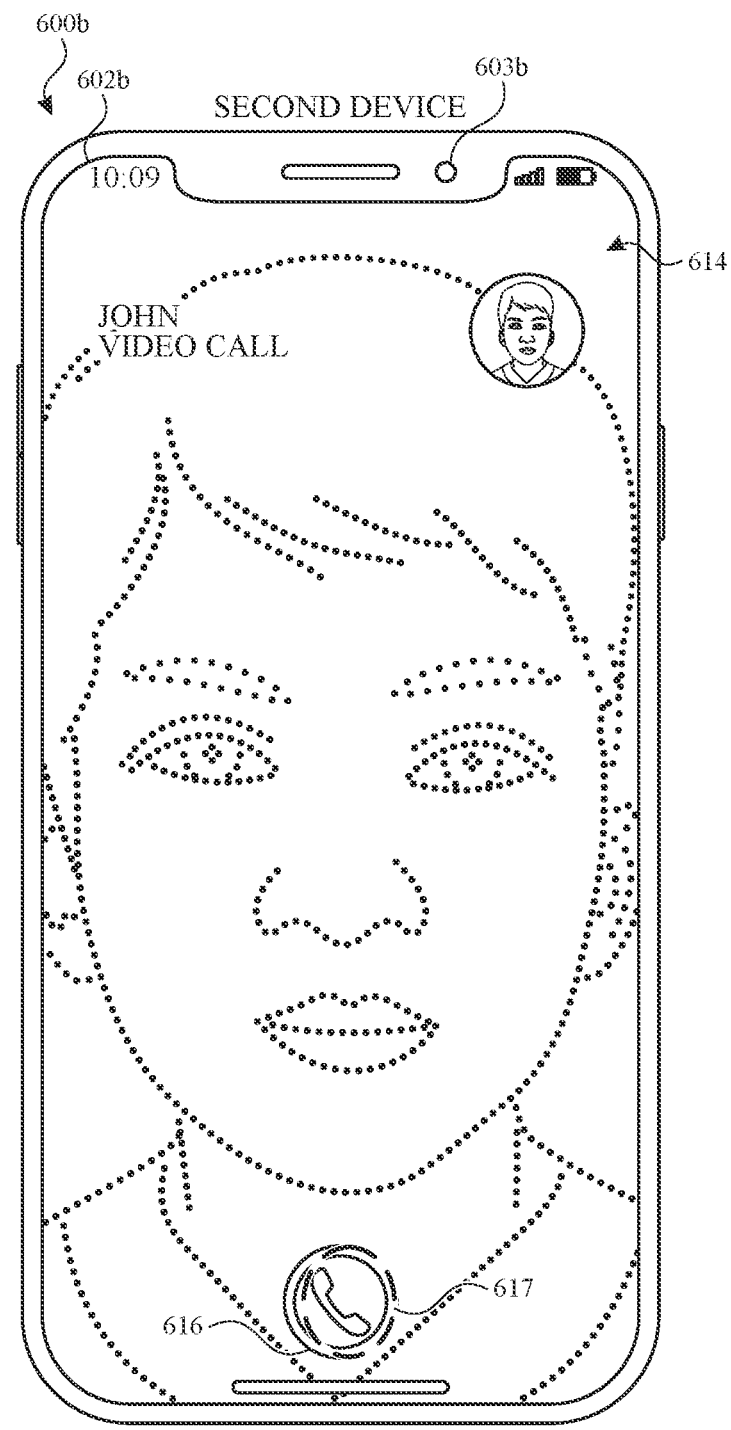

As illustrated in FIG. 6C, while the request to join the live communication session continues to be pending, image 622 is displayed by second device 600b such that the first participant continues to appear out-of-focus after the distance of the first participant from first camera 600a changes (e.g., the first participant moves closer to or further away from first camera 600a capturing image 622). In some embodiments, as first device 600a detects that the distance of the first participant from first camera 600a is changing, first device 600a modifies the focal plane of first camera 603a such that the first participant remains out-of-focus. In some embodiments, second device 600b detects that the distance of the first participant from the first camera 603a is changing, and sends a request to first device 600a to modify the focal plane of first camera 603a to keep the first participant out-of-focus. In some embodiments, the video data being sent by first device 600a to second device 600b includes image data of the first participant at multiple focal planes. Second device 600b then selects image data with a focal plane where the first participant is out-of-focus for display as the participant moves closer to or further away from first camera 603a.

In some embodiments, the live communication session is accepted in response to an input 617 (e.g., a contact on second touch-sensitive display 602b) on answer affordance 616. In response to second device 600b accepting the request to join the live communication session, image 622 changes to display the first participant in-focus (e.g., the first participant's face appears sharp), as shown in FIG. 6D.

Figure 6D:
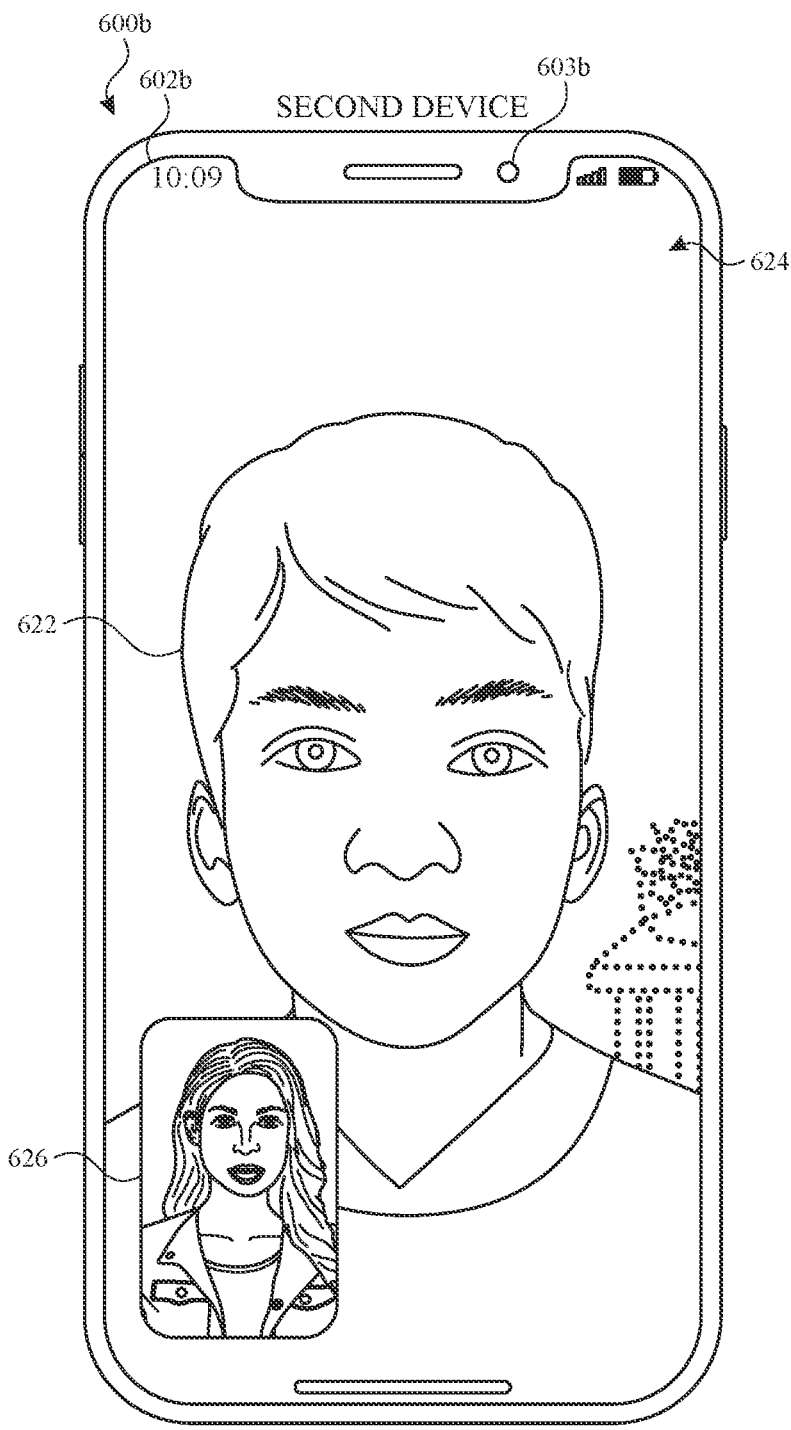

FIG. 6D illustrates second device 600b displaying live communication interface 624 on second touch-sensitive display 602b. Live communication interface 624 is displayed in response to an acceptance (e.g., input 617) of the request to join the live communication session sent by first device 600a. In response to second device 600b joining the live communication session, image 622 changes to display the first participant in-focus (e.g., the first participant's face appears sharp, as illustrated by the solid lines in FIG. 6D). Live communication interface 624 further includes a preview image 626 of the second participant.

In some embodiments, in response to second device 600b accepting the request to join the live communication session, first device 600a sets the focal plane of first camera 603a such that the first participant is captured in-focus. In some embodiments, first device 600a sets the focal plane in response to a request from second device 600b. Video data with the first participant captured in-focus is then transmitted to second device 600b for display as image 622 in live communication interface 624. In some embodiments, first device 600a captures multiple images of the first participant, where each image is captured with the first camera 603a set to a different focal plane, and where at least one of the images is captured with the focal plane of first camera 603a set to capture the first participant in-focus. The images of the first participant captured at different focal planes are transmitted to second device 600b, and second device 600b selects image 622 where the first participant is captured in-focus for display in the live communication interface 624.

Figure 6E:
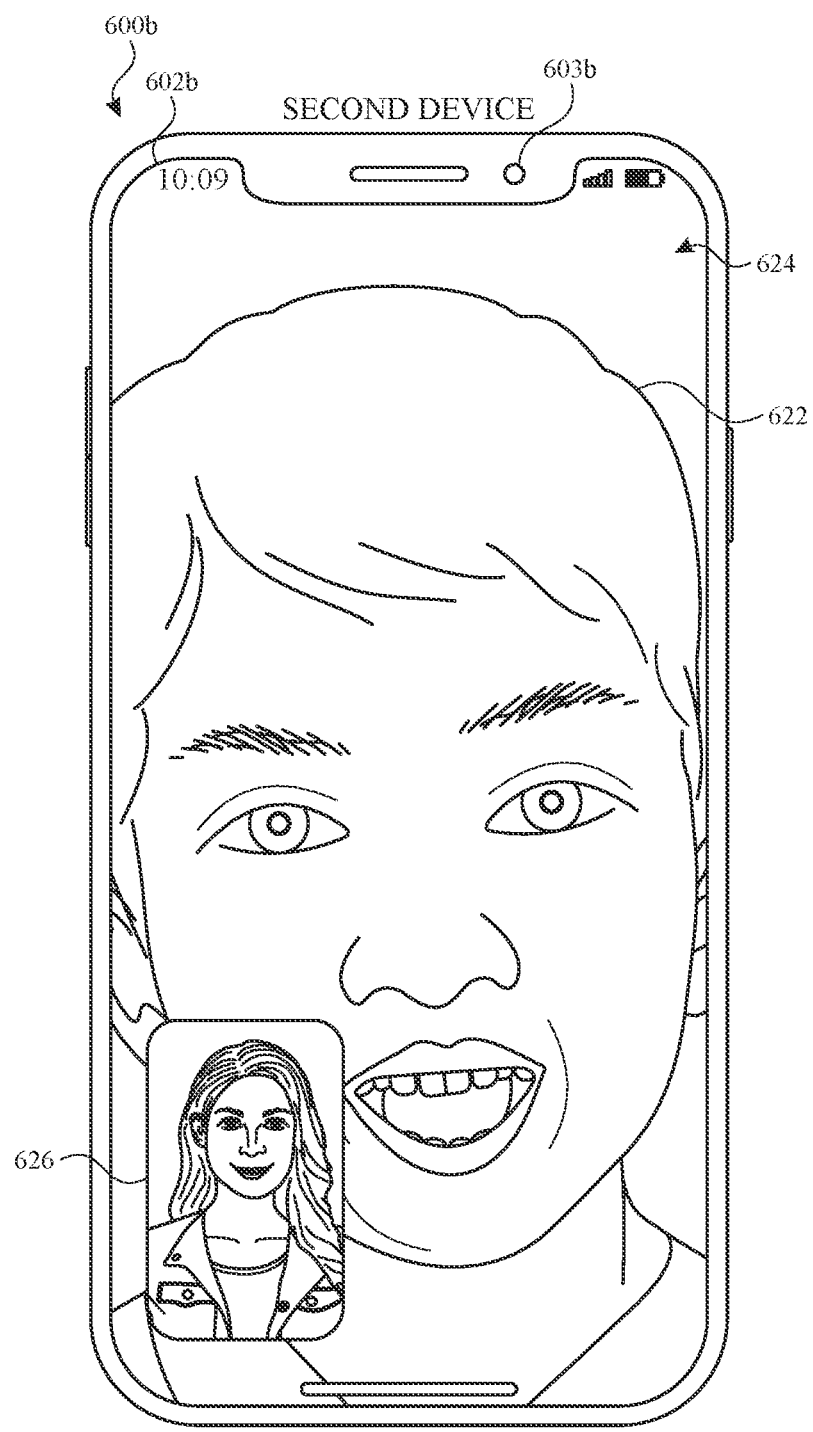

As illustrated in FIG. 6E, after the request to join the live communication session has been accepted, image 622 is displayed by second device 600b such that the first participant continues to appear in-focus after the distance of the first participant from first camera 600a changes (e.g., the first participant moves closer or further away from first camera 600a capturing image 622). In some embodiments, as first device 600a detects that the distance of the first participant from first camera 600a is changing, first device 600a modifies the focal plane of first camera 603a such that the first participant remains in-focus. In some embodiments, second device 600b detects that the distance of the first participant from the first camera 603a is changing, and sends a request to first device 600a to modify the focal plane of first camera 603a to keep the first participant in-focus. In some embodiments, first device 600a captures multiple images of the first participant, where each image is captured with the first camera 603a set to a different focal plane, and where at least one of the images is captured with the focal plane of first camera 603a set to capture the first participant in-focus at the changed distance from first camera 603a. The images of the first participant captured at different focal planes are transmitted to second device 600b, and second device 600b selects image 622 where the first participant is captured in-focus at the changed distance from first camera 603a for display in the live communication interface 624.

Figure 6F:
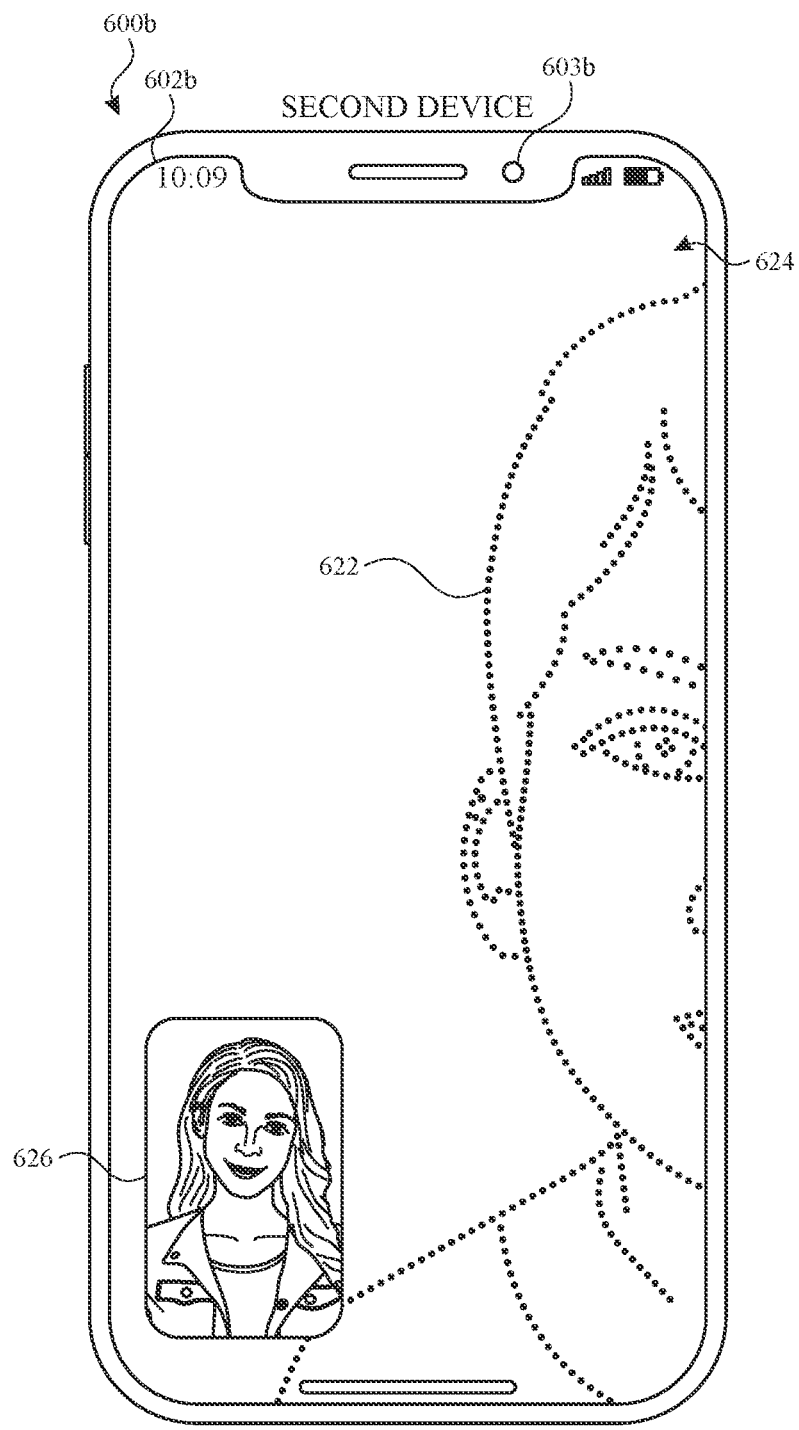

As illustrated in FIG. 6F, after the request to join the live communication session has been accepted, the first participant partially exits the frame of first camera 603a (as shown in FIG. 6A). When the first participant partially exits the camera frame (e.g., at least a portion of the first participant's face is out of view of first camera 603a), a lack of attention is detected. In response to detecting the lack of attention, image 622 is displayed by second device 600b such that the first participant appears out-of-focus. In some embodiments, the lack of attention is detected by first device 600a, and then first device 600a modifies the focal plane of first camera 603a such that the first participant appears out-of-focus. In some embodiments, the lack of attention is detected by second device 600b, and then second device 600b sends a request to first device 600a to modify the focal plane of first camera 603a to capture the first participant out-of-focus. In some embodiments, first device 600a captures multiple images of the first participant, where each image is captured with the first camera 603a set to a different focal plane, and where at least one of the images is captured with the focal plane of first camera 603a set to capture the first participant out-of-focus. The images of the first participant captured at different focal planes are transmitted to second device 600b, and second device 600b selects image 622 where the first participant is captured out-of-focus for display in the live communication interface 624 when the lack of attention is detected.

When the first participant returns to the camera frame (e.g., the first participant's face is fully in view of first camera 603a), a return of attention is detected. In response to the return of attention, image 622 is displayed by second device 600b such that the first participant appears in-focus again, as shown in FIG. 6D. In some embodiments, the return of attention is detected by first device 600a, and then first device 600a modifies the focal plane of first camera 603a such that the first participant appears in-focus. In some embodiments, the return of attention is detected by second device 600b, and then second device 600b sends a request to first device 600a to modify the focal plane of first camera 603a to capture the first participant in-focus. In some embodiments, first device 600a captures multiple images of the first participant, where each image is captured with the first camera 603a set to a different focal plane, and where at least one of the images is captured with the focal plane of first camera 603a set to capture the first participant in-focus. The images of the first participant captured at different focal planes are transmitted to second device 600b, and second device 600b selects image 622 where the first participant is captured in-focus for display in the live communication interface 624 when the return of attention is detected.

Figure 6G:
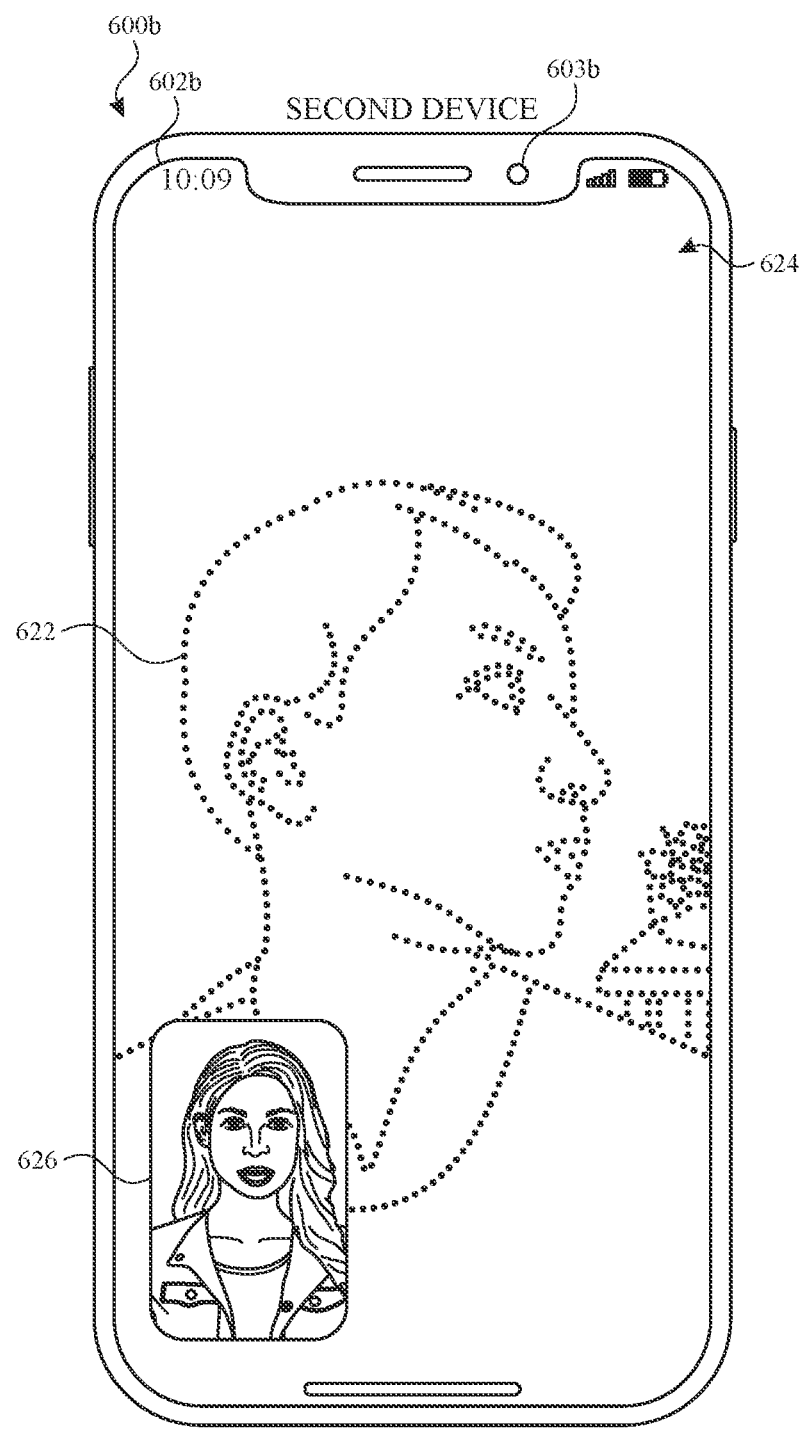

As illustrated in FIG. 6G, after the request to join the live communication session has been accepted, the first participant looks away from first device 600a (as shown in FIG. 6A) (e.g., the first participant turns their head away from first device 600*a* or the first participant's eyes gaze in a direction other than toward first device 600*a*). When the first participant looks away from first device 600*a*, a lack of attention is detected. In response to detecting the lack of attention, image 622 is displayed by second device 600*b* such that the first participant appears out-of-focus. In some embodiments, the lack of attention is detected by first device 600*a*, and then first device 600*a* modifies the focal plane of first camera 603*a* such that the first participant appears out-of-focus. In some embodiments, the lack of attention is detected by second device 600*b*, and then second device 600*b* sends a request to first device 600*a* to modify the focal plane of first camera 603*a* to capture the first participant out-of-focus. In some embodiments, first device 600*a* captures multiple images of the first participant, where each image is captured with the first camera 603*a* set to a different focal plane, and where at least one of the images is captured with the focal plane of first camera 603*a* set to capture the first participant out-of-focus. The images of the first participant captured at different focal planes are transmitted to second device 600*b*, and second device 600*b* selects image 622 where the first participant is captured out-of-focus for display in the live communication interface 624 when the lack of attention is detected.

When the first participant looks back toward first device 600*a* (e.g., the first participant turns their head toward first device 600*a* or the first participant's eyes gaze in a direction toward first device 600*a*), a return of attention is detected. In response to the return of attention, image 622 is displayed by second device 600*b* such that the first participant appears in-focus again, as shown in FIG. 6D. In some embodiments, the return of attention is detected by first device 600*a*, and then first device 600*a* modifies the focal plane of first camera 603*a* such that the first participant appears in-focus. In some embodiments, the return of attention is detected by second device 600*b*, and then second device 600*b* sends a request to first device 600*a* to modify the focal plane of first camera 603*a* to capture the first participant in-focus. In some embodiments, first device 600*a* captures multiple images of the first participant, where each image is captured with the first camera 603*a* set to a different focal plane, and where at least one of the images is captured with the focal plane of first camera 603*a* set to capture the first participant in-focus. The images of the first participant captured at different focal planes are transmitted to second device 600*b*, and second device 600*b* selects image 622 where the first participant is captured in-focus for display in the live communication interface 624 when the return of attention is detected.

Figure 6H:
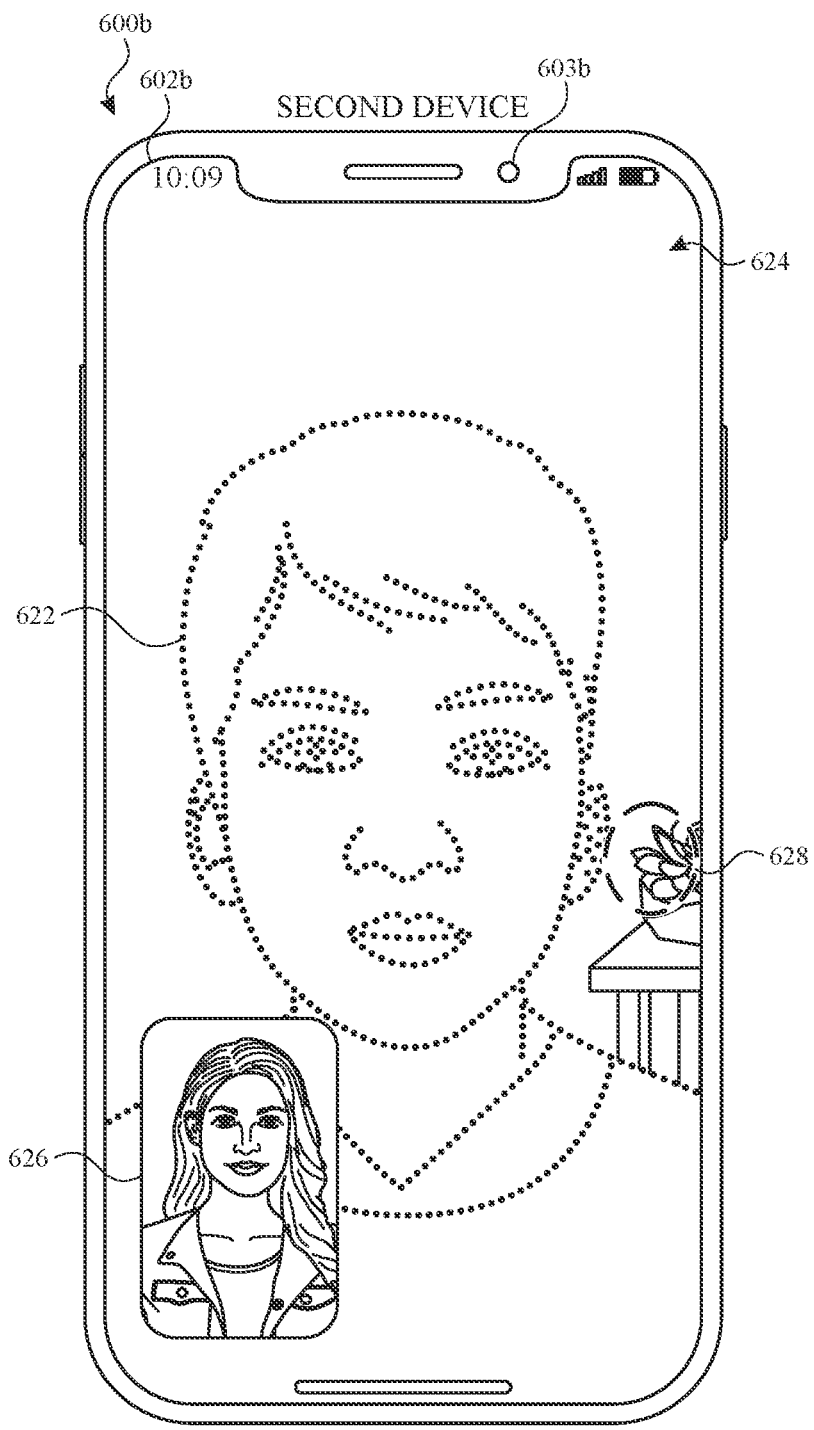

As illustrated in FIG. 6H, in response to an input 628 (e.g., a contact on second touch-sensitive display 602*b*), the focal plane of image 622 is modified. In some embodiments, in response to input 628, non-visual feedback (e.g., audio/tactile) is provided in conjunction with (e.g., at the same time or near the same time as) modifying the focal plane of image 622.

In some embodiments, the focal plane of image 622 is modified in response to input 628 being on a location of image 622 having a different depth (e.g., the location of an object in the background of image 622). In response to input 628, second device 600*b* displays image 622 such that a portion of the image at the location selected with input 628 is displayed in-focus (e.g., the focal plane is changed to correspond to the background object). In some examples, as a result of changing the focal plane, first participant is displayed out-of-focus in image 622. In some embodiments, second device 600*b* sends a request to first device 600*a* to modify the focal plane of first camera 603*a* to capture the portion of the image at the location selected with input 628 in-focus. In some embodiments, first device 600*a* captures multiple images with different focal planes. The multiple images are transmitted to second device 600*b*, and second device 600*b* selects image 622 where the portion of the image at the location selected with input 628 is captured in-focus for display in the live communication interface 624.

In some embodiments, the focal plane of image 622 is modified based on a characteristic intensity of input 628 (e.g., a contact on second touch-sensitive display 602*b* having a characteristic intensity). For example, an input 628 having a characteristic intensity at or below the light press intensity threshold changes the focal plane of image 622 to correspond to a minimum focal plane of first camera 603*a* (e.g., a shallow focal plane where objects near first camera 603*a* are displayed in-focus). As the characteristic intensity of input 628 increases, the focal plane of image 622 is changed to correspond to deeper focal planes of first camera 603*a* (e.g., the focal planes shift further away from first camera 603*a* as the characteristic intensity of input 628 increases). In this way, a user can vary the focal plane of image 622 by changing the characteristic intensity of input 628.

In some embodiments, the focal plane of image 622 is modified based on a duration of input 628 (e.g., the length of time a contact is held on second touch-sensitive display 602*b*). For example, when input 628 is initially detected on second touch-sensitive display 602*b*, the focal plane of image 622 is changed to correspond to a minimum focal plane of first camera 603*a* (e.g., a shallow focal plane where objects near first camera 603*a* are displayed in-focus). As the duration of input 628 increases, the focal plane of image 622 is changed to correspond to deeper focal planes of first camera 603*a* (e.g., the focal planes gradually shift further away from first camera 603*a* as the duration of the contact increases). When input 628 ceases to be detected, the focal plane of image 622 is maintained at the last focal plane displayed for image 622. In this way, a user can vary the focal plane of image 622 by changing the duration of input 628.

FIGS. 7A-7B are a flow diagram illustrating a method for displaying video for a live communication session with different focal planes, in accordance with some embodiments. Method 700 is performed at a device (e.g., 100, 300, 500, 600*b*) with a display. Some operations in method 700 are, optionally, combined, the orders of some operations are, optionally, changed, and some operations are, optionally, omitted.

As described below, method 700 provides, among other things, an intuitive way for displaying video for a live communication session. The method reduces the cognitive burden on a user viewing the live communication session, thereby creating a more efficient human-machine interface.

The device (e.g., second device 600*b*) displays (702) video for a live communication session (e.g., an audio/video communication session with a live data stream transmitted by a capture device (e.g. first device 600*a*)). The video includes a subject of the live communication session with a predefined portion of the subject identified in a first focal region (e.g., a focal region where the head or face of a participant of the live communication session is in focus). In some embodiments, the video for the live communication session includes first image data corresponding to a focal plane outside of the first focal region and second image data corresponding to a focal plane inside the first focal region (e.g., video data stream from first device 600*a* includes data for multiple focal depths). In some embodiments, the first image data and second image data are transmitted/received at different periods of time in the video data, or at the same (e.g., approximately the same) period of time (e.g. the video data includes two discrete channels/streams of data for the same time period, having different focal planes). In some embodiments, the device (e.g., second device 600*b*) selects the image data with the focal plane outside the first focal region (e.g., to display the subject out-of-focus).

In accordance with a determination that a set of one or more conditions is met, the device displays (704) the video with a focal plane of the video selected to be outside of the first focal region (e.g., the head/face of a participant of the live communication session is out of focus in the video). In some embodiments, the video is captured by a capture device (e.g., first device 600*a*) with a lens set outside the first focal region. In some embodiments, the video includes video data at multiple focal depths and the device (e.g., second device 600*b*) selects the video data with a focal plane outside the first focal region for display. Displaying video for a live communication session with the focal plane of the video selected to be at different focal regions based on whether one or more conditions are met improves visual feedback by enabling a user to quickly and easily recognize the status of the live communication session (e.g., whether the live communication session has been joined and/or whether another participant is engaged in the live communication session). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the video for the live communication session is captured by a camera of a capture device (e.g., first device 600*a* with first camera 603*a*), and in accordance with the determination that the set of one or more conditions is met, the focal plane of the camera has been set (e.g. mechanically set/adjusted, set/adjusted via software) outside of the first focal region. In some embodiments, the device (e.g., second device 600*b*) sends a request to the capture device (e.g., first device 600*a*) to set the focal plane of the camera (e.g., first camera 603*a*) of the capture device outside of the first focal region.

Optionally, while (710) displaying the video for the live communication session with the focal plane of the video selected to be outside of the first focal region and while the set of one or more conditions is met, the device (e.g., second device 600*b*) detects (712) a change in position of the predefined portion of the subject (e.g., the head/face of the participant moves forward or backward). The device then modifies (714) the first focal region based on the change in position of the predefined portion of the subject. The device then displays (716) the video for the live communication session with the focal plane of the video adjusted to continue being outside of the first focal region (e.g., the focal plane is changed to keep the head/face of the participant out-of-focus). Continually changing the focal plane for the live communication session to be outside of a focal region of the subject as the subject changes position improves visual feedback by enabling a user to quickly and easily recognize the status of the live communication session as the subject moves. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the video for the live communication session with the focal plane of the video selected to be outside of the first focal region, the device determines (706) that the set of one or more conditions is no longer met.

In response to the determination that the set of one or more conditions is no longer met, the device displays (708) the video for the live communication session with the focal plane of the video selected to be inside of the first focal region (e.g., a focal region where the head/face of the participant of the live communication session is no longer out of focus in the video). In some embodiments, the video is captured by another device (e.g., first device 600*a*) with a camera lens set at a focal plane inside the first focal region. In some embodiments, the video includes video data at multiple focal depths and the device (e.g., second device 600*b*) selects the video data with a focal plane inside the first focal region for display.

Optionally, while (718) the set of one or more conditions is no longer met and while displaying the video for the live communication session with the focal plane of the video selected to be inside of the first focal region, the device (e.g., second device 600*b*) detects (720) a change in position of the predefined portion of the subject (e.g., the head/face of the participant moves forward or backward). The device then modifies (722) the first focal region based on the change in position of the predefined portion of the subject. The device then displays (724) the video for the live communication session with the focal plane of the video adjusted to continue being inside the first focal region (e.g., the focal plane is changed to keep the head/face of the participant in-focus). Continually changing the focal plane for the live communication session to be inside of a focal region of the subject as the subject changes position improves visual feedback by enabling a user to quickly and easily recognize the status of the live communication session as the subject moves. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the device (e.g., second device 600*b*) receives a request to participate in the live communication session, and the set of one or more conditions includes a condition that is met while the request is pending (e.g., when receiving an incoming video call, video of the participant initiating the call is displayed with the participant's head/face out-of-focus). In some embodiments, the request is pending when the request remains unaccepted (e.g., the device receiving the request is not transmitting video back to the requesting device). In some embodiments, in response to detecting an acceptance (e.g., 617) of the request to participate in the live communication session (e.g., an input (e.g., a finger contact) on an acceptance affordance (e.g., 616) displayed on a touch-sensitive display), the device determines that the set of one or more conditions is no longer met (e.g., the subject is displayed out-of-focus until the live communication session is accepted, and then the subject is displayed in-focus). Displaying video for a live communication session with the focal plane of the video selected to be at different focal regions based on whether a request to join the live communication session is pending improves visual feedback by enabling a user to quickly and easily recognize the status of the live communication session. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of one or more conditions includes a condition that is met when a lack of attention from the subject of the live communication session has been detected (e.g., subject of video call appears out-of-focus when they are not paying attention to the video call) (e.g. detected via face and/or gaze detection techniques that are, optionally, based on analysis of the video data (e.g., analysis performed at second device 600b, or analysis performed by first device 600a providing the video data along with attention detection data, to the second device 600b)). In some embodiments, the lack of attention is detected based at least in part on the predefined portion of the subject (e.g., the subject's head/face) at least partially exiting an image boundary of the live communication session (e.g., the camera frame of the capture device) for a predetermined amount of time. In some embodiments, in response to a detection that the predefined portion of the subject (e.g., the subject's head/face) reenters the image boundary of the live communication session (e.g., the camera frame of the capture device), the device determines that the set of one or more conditions is no longer met (e.g., the subject is displayed out-of-focus if their head/face partially moves out of the camera frame, and then the subject is displayed in-focus when their head/face returns to the camera frame). Displaying video for a live communication session with the focal plane of the video selected to be at different focal regions based on whether a lack of attention is detected improves visual feedback by enabling a user to quickly and easily recognize the status of the live communication session. Displaying video for the live communication session with the focal plane of the video selected to be at different focal regions based on whether a lack of attention is detected also improves privacy by obfuscating the identity and/or activities of a participant when they are not paying attention to the live communication session. Providing improved visual feedback and privacy to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Furthermore, user inputs are not required to change the focal plane of the video for the live communication, which allows the live communication session to quickly and easily continue when a return of attention is detected. Performing an optimized operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the lack of attention is detected based at least in part on an eye gaze of the subject being directed in a direction other than toward a capture device (e.g., first device 600a) capturing the live communication session for a predetermined amount of time (e.g., the subject is displayed out-of-focus while they look away from the first camera 603a). In some embodiments, the subject's head/face remains in the camera frame at the same focal plane while they look away from the capture device. In some embodiments, in response to a detection that the eye gaze of the subject is directed toward the capture device (e.g., first device 600a) capturing the live communication session, the device (e.g., second device 600b) determines that the set of one or more conditions is no longer met (e.g., the subject is displayed out-of-focus while they look away from first camera 603a, and then the subject is displayed in-focus when their gaze returns to first camera 603a). Displaying video for a live communication session with the focal plane of the video selected to be at different focal regions based on a participant's eye gaze improves visual feedback by enabling a user to quickly and easily recognize the status of the live communication session. Displaying video for the live communication session with the focal plane of the video selected to be at different focal regions based on a participant's eye gaze also improves privacy by obfuscating the identity and/or activities of a participant when they are not paying attention to the live communication session. Providing improved visual feedback and privacy to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Furthermore, user inputs are not required to change the focal plane of the video for the live communication, which allows the live communication session to quickly and easily continue when a return of attention is detected. Performing an optimized operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, while displaying the video for the live communication session on a touch-sensitive display, the device (e.g., second device 600b) detects (726) an input (e.g., 628) (e.g., a finger contact) on the touch-sensitive display. The device then displays (728) the video for the live communication session with the focal plane of the video selected based on one or properties of the input (e.g., location, duration, and/or pressure of the finger contact).

In some embodiments, the device (e.g., second device 600b) sends a request to the capture device (e.g., first device 600a) to set the focal plane of the camera (e.g., first camera 603a) based on the one or more properties of the input (e.g., first device 600a is instructed to capture images having the desired focus, and to send video data including the images to second device 600b). In some embodiments, the video for the live communication session includes image data for two or more focal planes (e.g., video stream from the first device 600a includes data for multiple focal depths (e.g., for the same time period (e.g., providing two channels of video data, having different focal planes)), and the device (e.g., second device 600b) selects image data having a respective focal plane of the two or more focal planes for display based on the one or more properties of the input. In some embodiments, the one or more properties of the input includes a characteristic intensity of the input. In some embodiments, the one or more properties of the input includes a duration of the input (e.g., long press). In some embodiments, the one or more properties of the input includes a location of the input on the touch-sensitive display (e.g., if input location corresponds to a location of an object in the live communication session, focal plane changes to a focal region of the object). In some embodiments, the device (e.g., second device 600b) provides non-visual feedback (e.g., audio/tactile) in conjunction with (e.g., at the same time or near the same time as) the video for the live communication session is displayed with the focal plane of the video selected based on the one or properties of the input (e.g., non-visual feedback occurs when the focal plane of the video changes in response to the input).

Note that details of the processes described above with respect to method 700 (e.g., FIGS. 7A-7B) are also applicable in an analogous manner to the methods described below. For example, method 700 optionally includes one or more of the characteristics of the various methods described below with reference to method 900. For example, a plurality of still images with a plurality of different focal planes as described below with respect to method 900 can used in a live communication session described above with respect to method 700. For brevity, these details are not repeated below.

FIGS. 8A-8E illustrate exemplary user interfaces for capturing images with multiple focal planes, in accordance with some embodiments. The user interfaces in these figures are used to illustrate the processes described below, including the processes in FIG. 9.

Figure 8A:
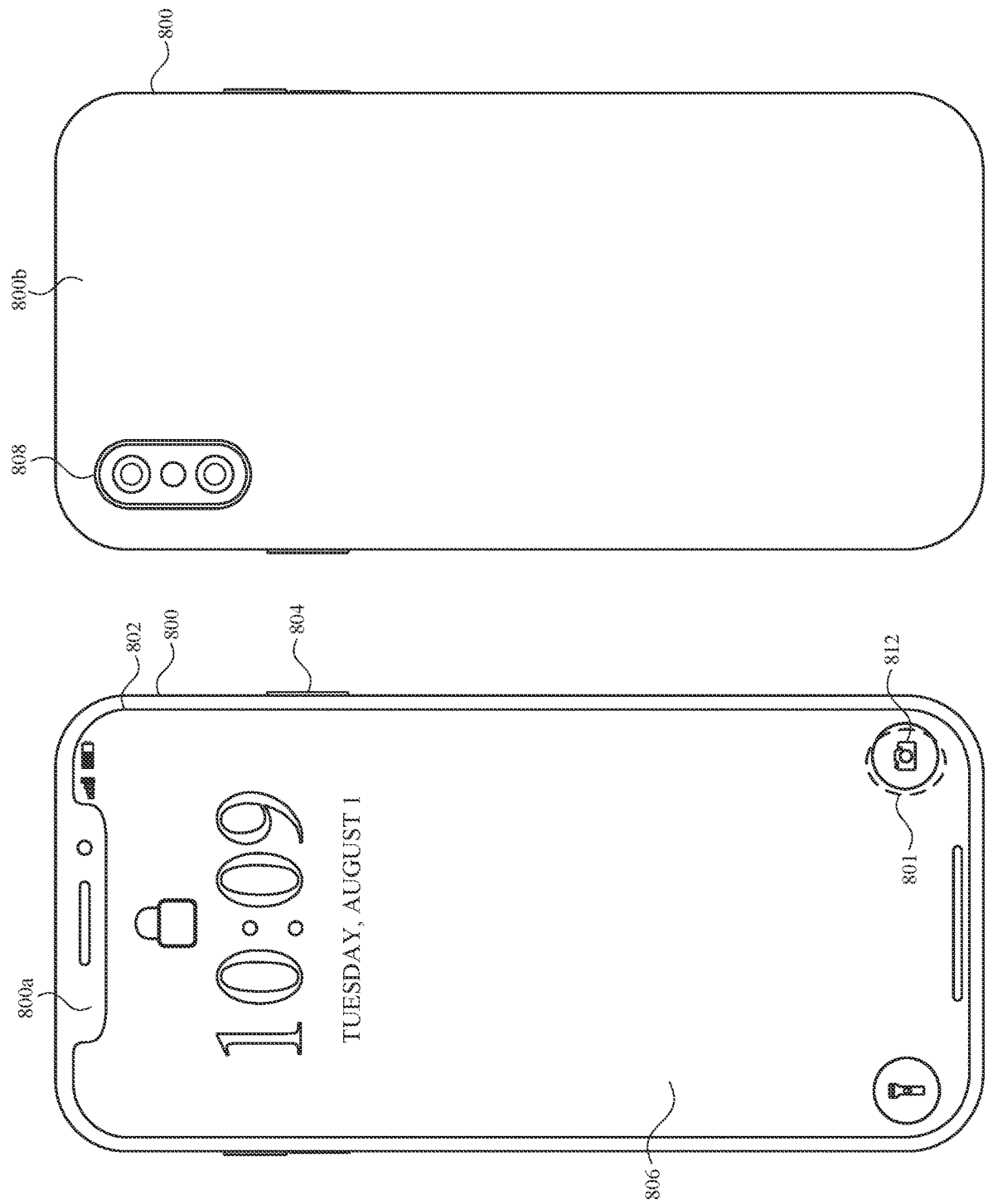
FIGS. 8A-8E illustrate exemplary user interfaces for capturing images with multiple focal planes, in accordance with some embodiments.
Figure 9:
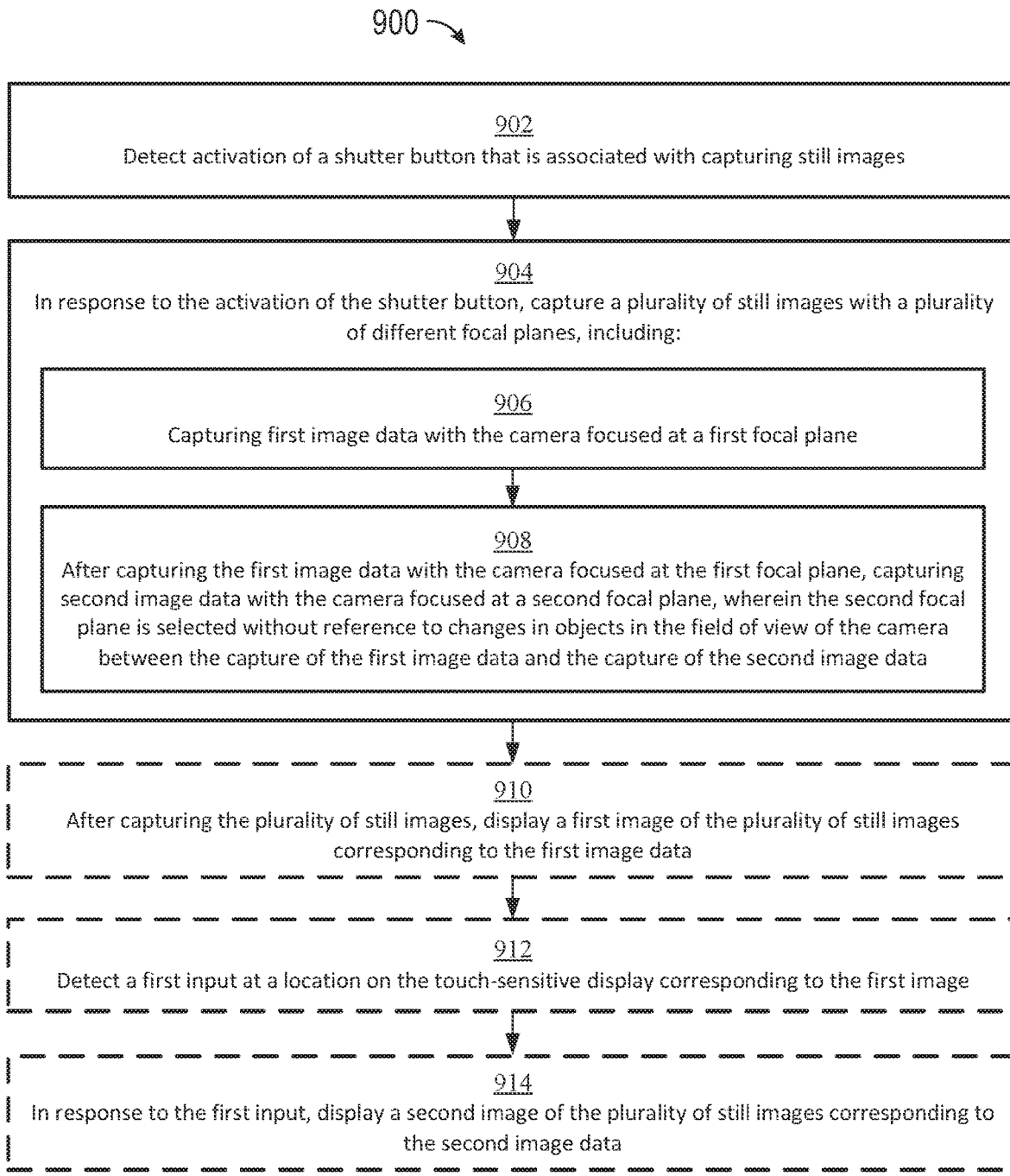
FIG. 9 is a flow diagram illustrating a method for displaying capturing a plurality of still images with a plurality of different focal planes, in accordance with some embodiments.

FIG. 8A illustrates a front-view 800a and a rear-view 800b of device 800 with touch-sensitive display 802. In some embodiments, device 800 includes one or more features of devices 100, 300, and 500. Device 800 also includes an input device 804 (e.g., a mechanical input button, a press-able input button) and a camera 808. Camera 808, at a minimum, includes an image sensor that is capable of capturing data representing a portion of the light spectrum (e.g., visible light, infrared light, or ultraviolet light). Camera 808 includes at least one focal lens capable of being adjusted to focus camera 808 on different focal planes (e.g., distances from camera 808 at which the sharpest focus is attained). In some embodiments, camera 808 includes a single focal lens for adjusting the focal plane. In some embodiments, the focal plane is adjusted by modifying the shape of the single focal lens. Camera 808 is capable of being adjusted to focus on different focal planes and capture images at each of the different focal planes within a brief amount of time (e.g., less than 0.5 ms, 1 ms, 5 ms, 10 ms, 15 ms, or 20 ms). The images are captured at each of the different focal planes at a speed such that the multiple images with different focal planes can be associated with approximately the same moment in time. The content of the images appear substantially the same except for the difference in focal planes between the images. In some embodiments, one or more photographic properties of camera 808 other than the focal plane (e.g., exposure, zoom level, white balance, contrast, ISO value) are kept constant during the capture of the multiple images.

In some embodiments, camera 808 includes multiple image sensors and/or other types of sensors. In addition to capturing data representing sensed light, in some embodiments, camera 808 is capable of capturing other types of data, such as depth data. For example, in some embodiments, camera 808 also captures depth data using techniques based on speckle, time-of-flight, parallax, or focus. Image data that device 800 captures using camera 808 includes data corresponding to a portion of the light spectrum for a scene within the field of view of the camera. Additionally, in some embodiments, the captured image data also includes depth data for the light data. In some other embodiments, the captured image data contains data sufficient to determine or generate depth data for the data for the portion of the light spectrum.

In some examples, device 800 includes a depth camera (e.g., as part of camera 808), such as an infrared camera, a thermographic camera, or a combination thereof. In some examples, camera 808 further includes a light-emitting device (e.g., light projector), such as an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of a subject captured by the visible light camera. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint.) In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

In FIG. 8A, electronic device 800 displays, on touch-sensitive display 802, a user interface 806 (e.g., a lock-screen user interface) that includes an affordance 812 for launching an image capture application (e.g., a camera application, an image/photo capturing and editing application). While displaying user interface 806, device 800 detects (e.g., via touch-sensitive display 802) an activation 801 of affordance 812 (e.g., a tap gesture on affordance 812).

Figure 8B:
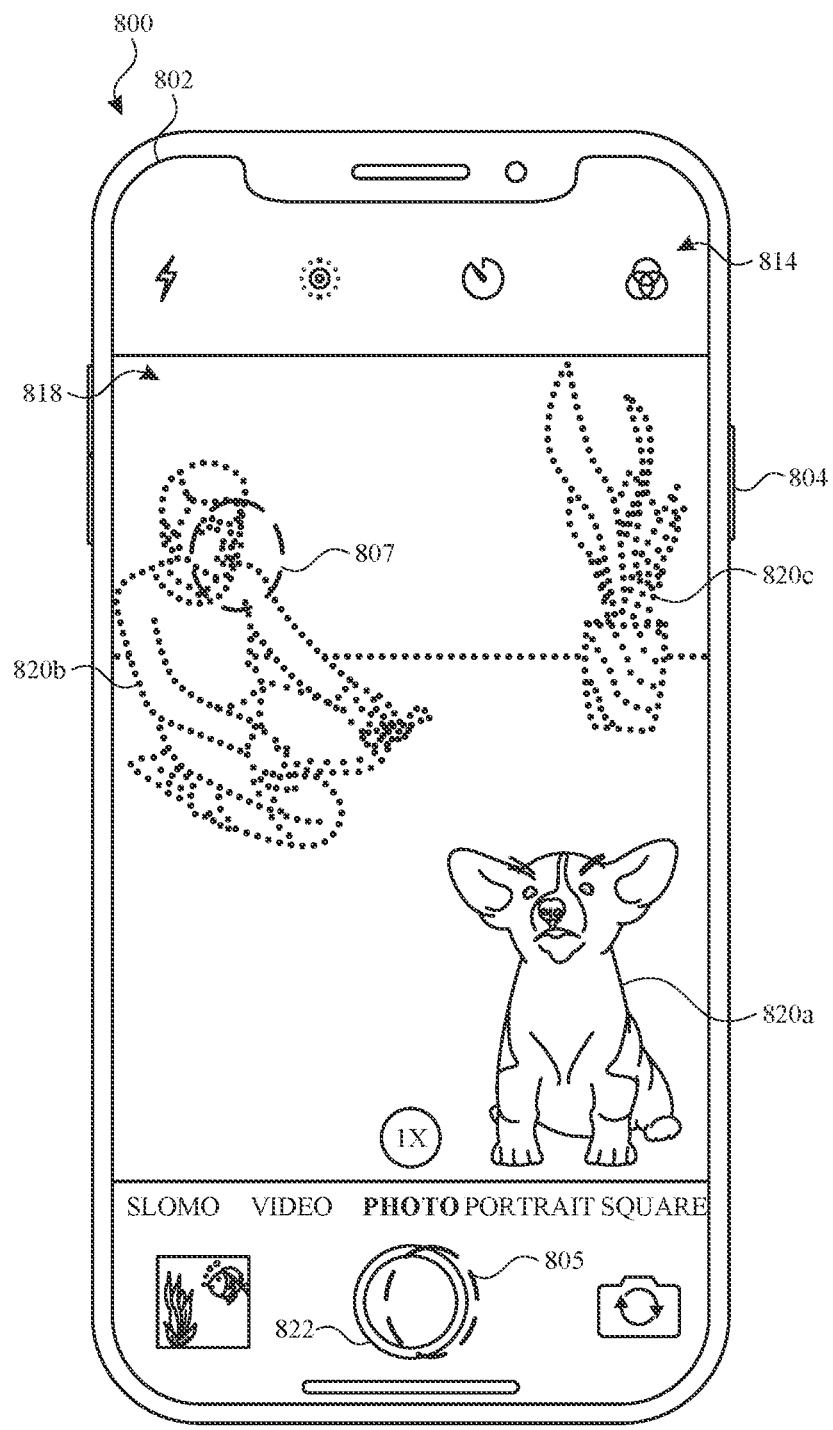

In FIG. 8B, in response to detecting activation 801 (or in response to other image capture requests), device 800 displays, on touch-sensitive display 802, a user interface 814 of the image capture application. In this example, image capture application is in a photo mode. While displaying user interface 814 of the image capture application, device 800 receives, via camera 808, image data corresponding to the environment within the field-of-view of camera 808.

Device 800 displays a preview image 818 corresponding to the image data received via camera 808 in the user interface 814 of the image capture application. In this example, preview image 818 includes multiple objects, including a foreground object 820a (e.g., a dog), a middleground object (e.g., a person), and a background object 820c (e.g., a plant). As illustrated in FIG. 8B, the focal plane of camera 808 is set such that middlegound object 820b and background object 820c are displayed out-of-focus (as illustrated by dashed lines) while foreground object 820a is displayed in-focus (as illustrated by solid lines) in preview image 818.

User interface 814 of the image capture application also includes a shutter affordance 822 (e.g., a virtual shutter button). While displaying preview image 818 in user interface 814, device 800 detects an activation 805 of shutter affordance 822 (e.g., a single tap gesture on shutter affordance 822). In response to detecting activation 805, device 800 captures multiple still images corresponding to the environment currently in the field-of-view of camera 808 (e.g., multiple still images of objects 820*a*-820*c* included in preview image 818). The still images are captured with multiple different focal planes in response to the activation 805. The multiple different focal planes are selected without reference to changes in objects in the field of view of the camera during the capture of the multiple still images (e.g., the different focal planes are predefined or are selected at the same time and do not change based on movement of the camera or movement of objects toward or away from the camera during the capture of the multiple still images).

In some embodiments, the multiple still images are captured in response to an activation of input device 804 (e.g., a single press of a physical input button). In some embodiments, after capturing the multiple still images with multiple different focal planes, the preview image 818 continues to be displayed. In some embodiments, after capturing the multiple still images with multiple different focal planes, one of the captured still images corresponding to the preview image 818 is displayed (e.g., image 826 shown in FIG. 8D).

In some embodiments, device 800 detects an input 807 (e.g., a contact on touch-sensitive display 802) at a location in preview image 818 corresponding to middleground object 820*b*. In response to detecting input 807, device 800 captures multiple still images with different focal planes and then displays one of the captured still images (e.g., image 824 shown in FIG. 8C) having a focal plane corresponding to middleground object 820*b*, as shown in FIG. 8C (e.g., tapping on an object in the preview image 818 causes multiple images with different focal planes to be captured, and an image with that object in-focus to be displayed).

Figure 8C:
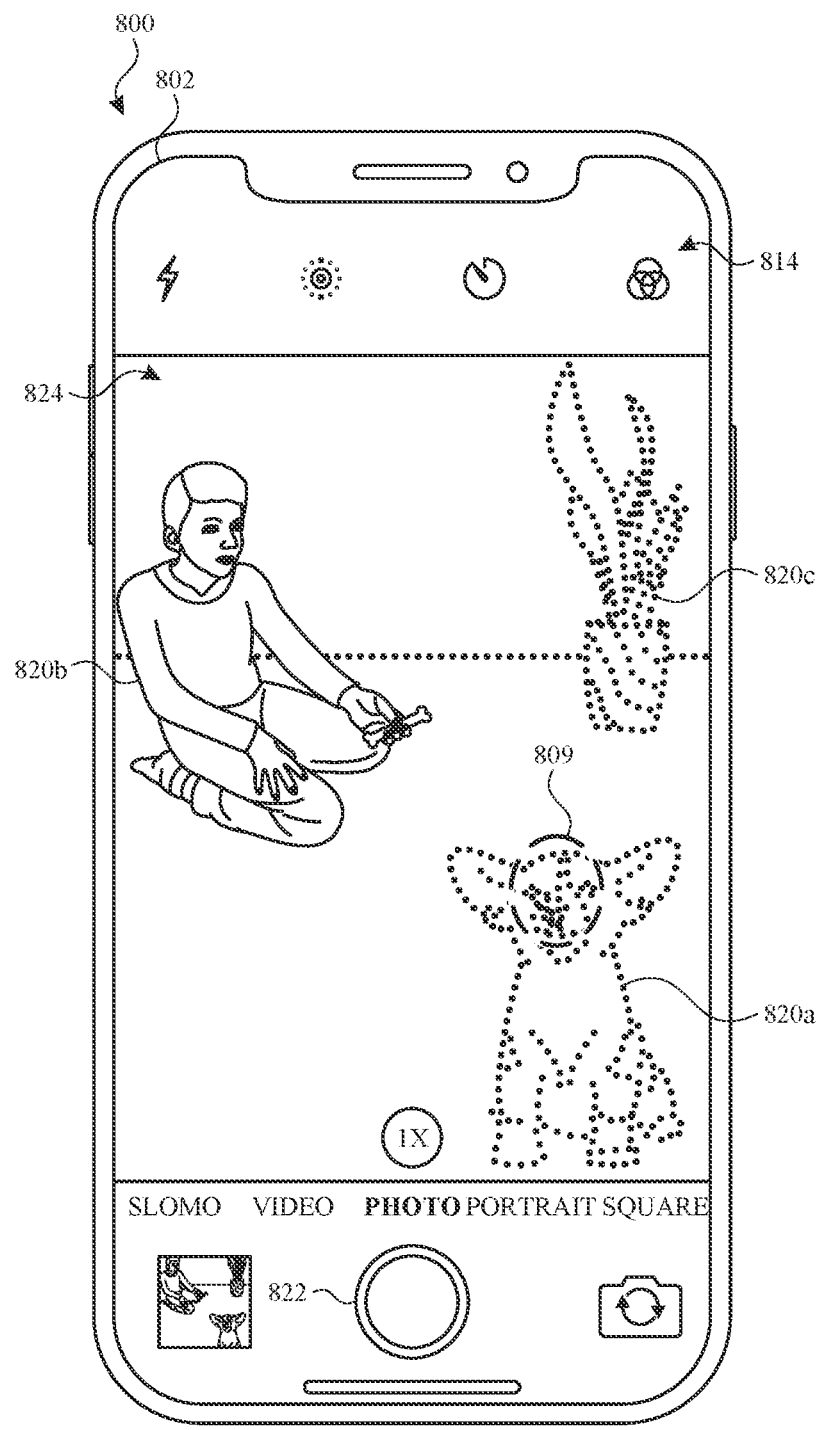

As illustrated in FIG. 8C, image 824 is displayed in user interface 814. Image 824 includes middleground object 820*b* displayed in-focus, and foreground object 820*a* and background object 820*c* displayed out-of-focus. Image 824 is displayed in response to input 807 on the location in preview image 818 corresponding to middleground object 820*b*, as described in reference to FIG. 8B. While displaying image 824, device 800 detects input 809. In some embodiments, input 809 is at a location in image 824 corresponding to foreground object 820*a*. In response to input 809 at the location corresponding to foreground object 820*a*, device 800 displays an image (e.g., image 826 shown in FIG. 8D) having a focal plane corresponding to foreground object 820*a*, as shown in FIG. 8D (e.g., tapping on an object in image 824 causes an image to be displayed with that object in-focus, without capturing additional images).

In some embodiments, input 809 has a corresponding characteristic intensity. Based on the characteristic intensity of input 809, device 800 displays an image (e.g., image 826 shown in FIG. 8D) having a different focal plane (e.g., a light press causes an image with a shallow focal plane to be displayed, while a deep press causes an image with a deep focal plane to be displayed, without capturing additional images). In some embodiments, device 800 maintains display of image 824 unless input 809 has a corresponding characteristic intensity greater than a threshold intensity. In some embodiments, the threshold intensity is based at least in part on a focal plane of an object captured in the multiple still images (e.g., the characteristic intensity of input 809 pushes the focal plane deeper into image 824 until the focal plane is at a depth corresponding to an object in the image). When the characteristic intensity of input 809 is greater than the threshold intensity, device 800 provides feedback indicating the threshold intensity has been exceeded (e.g., audio/tactile/visual feedback occurs when focal plane is pushed to a depth corresponding to an object in the image).

In some embodiments, input 809 has a corresponding duration (e.g., a long or short press). Based on the duration of input 809, device 800 displays an image (e.g., image 826 shown in FIG. 8D) having a different focal plane (e.g., a short press causes an image with a shallow focal plane to be displayed, while a long press causes an image with a deep focal plane to be displayed, without capturing additional images).

Figure 8D:
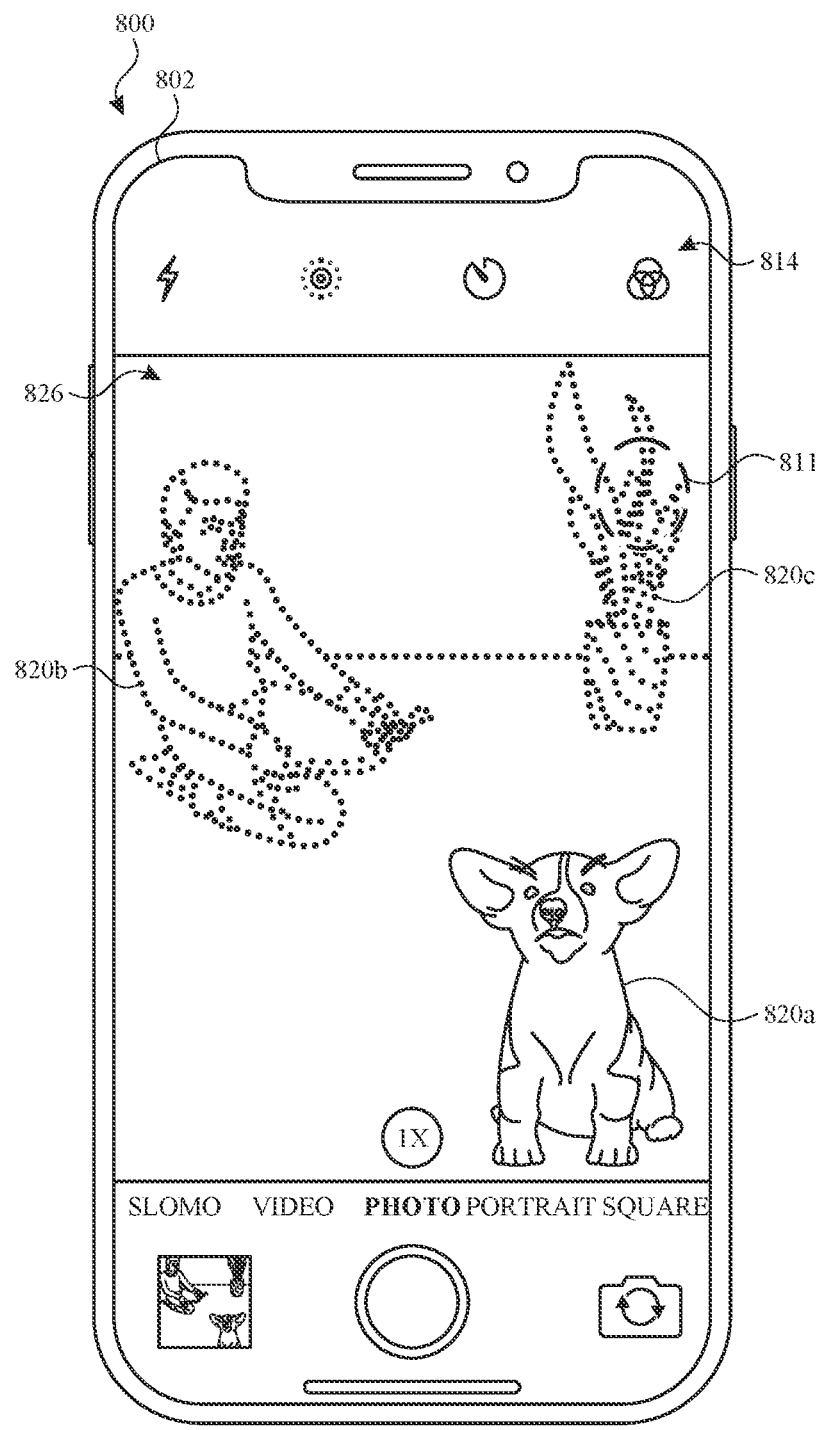

As illustrated in FIG. 8D, image 826 is displayed in user interface 814. Image 826 includes foreground object 820*a* displayed in-focus, and middleground object 820*b* and background object 820*c* displayed out-of-focus. Image 826 is displayed in response to input 809, as described in reference to FIG. 8C. In some embodiments, image 826 is displayed in response to activation 805 of shutter affordance 822 or activation of input device 804, as described in reference to FIG. 8B.

Image 826 is one of the multiple still images captured as described in reference to FIG. 8B. While displaying image 826, device 800 detects input 811 at a location in image 826 corresponding to background object 820*c*. In response to input 811, device 800 displays an image (e.g., image 828 shown in FIG. 8E) with background object 820*c* displayed in-focus while foreground object 820*a* continues to be displayed in-focus, as shown in FIG. 8E (e.g., tapping on another object in the image causes an image to be displayed with that object in-focus and the previously selected object also in-focus, without capturing additional images).

Figure 8E:
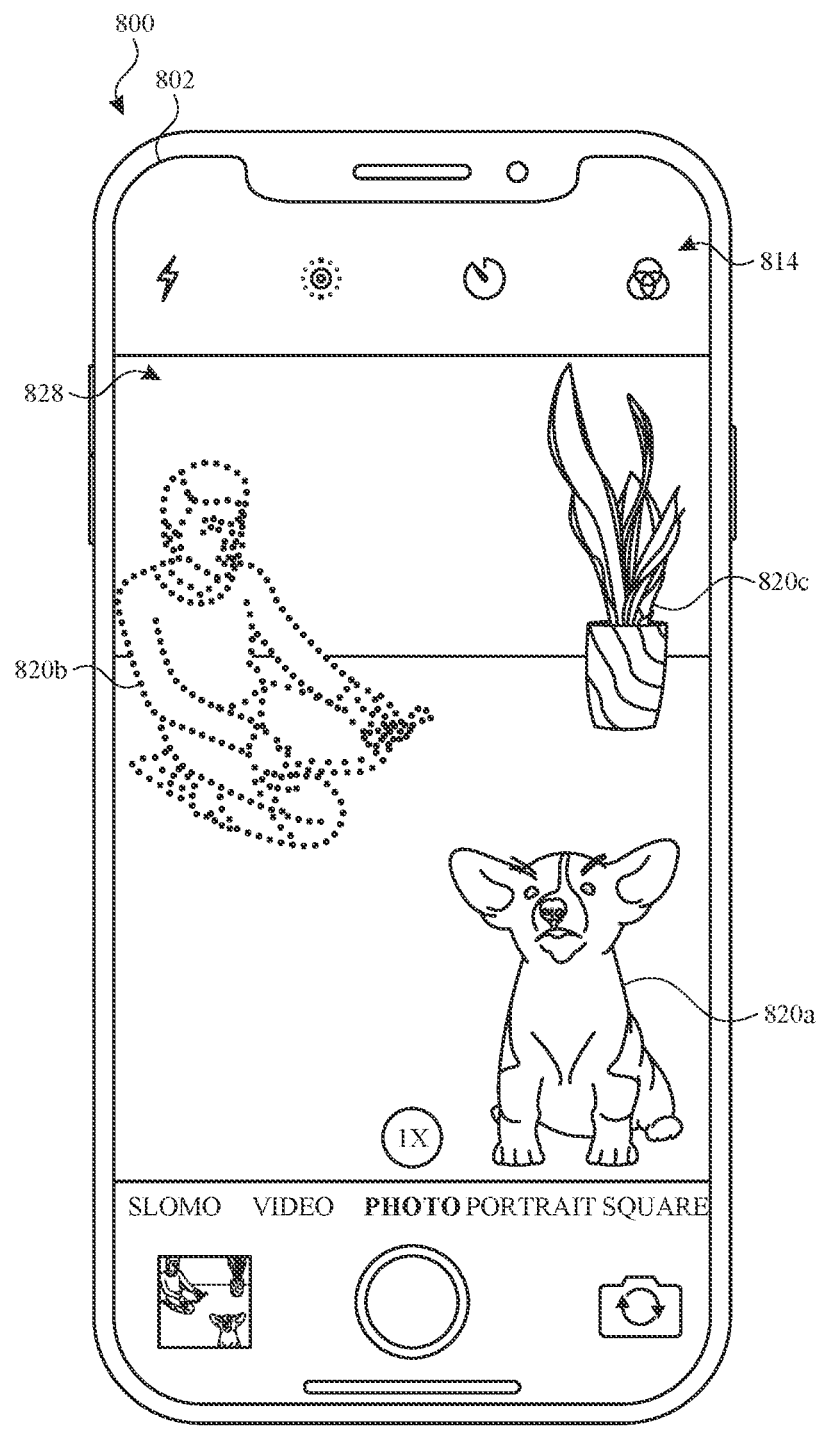

As illustrated in FIG. 8E, image 828 is displayed in user interface 814. Image 828 includes foreground object 820*a* and background object 820*c* displayed in-focus, and middleground object 820*b* displayed out-of-focus. Image 828 is displayed in response to input 811 on the location in image 824 corresponding to background object 820*c*, as described in reference to FIG. 8C. Input 811 is detected after another input 809 selected foreground object 820*a* to be displayed in-focus. Image 828 is a composite of a first image captured with foreground object 820*a* in-focus and a second image captured with background object 820*c* in-focus. Both the first image and second image were captured in response to input 807 described in reference to FIG. 8B. The composite image 828 includes at least the foreground object 820*a* from the first image and the background object 820*c* from the second image. Other portions of the composite image 828 (e.g., middleground object 820*b*) can be from the first image, the second image, or from other captured still images, such that the other portions of image 828 are displayed out-of-focus.

In some embodiments, device 800 receives a request to display an animation including two or more of the captured still images. For example, the animation includes displaying a first image (e.g., image 824 shown in FIG. 8C) with a first focal plane for a predetermined amount of time, followed by a second image (e.g., image 826 shown in FIG. 8D) with a different focal plane for a predetermined amount of time. In some embodiments, the animation continues indefinitely, cycling between the first image and the second image, until a cancellation input is received. In some embodiments, the animation continues cycling between the first image and the second image as long as an input is maintained (e.g., as long as contact is detected on the touch-sensitive display).

In some embodiments, device 800 determines depth information of the scene being captured in the multiple still images based on image data of the still images. For example, device identifies objects in the scene, and based on the focal planes of the objects, determines the depth of the object in the scene. In some embodiments, an operation is performed on at least one of the still images using the depth information, such as applying a simulated depth effect (e.g., a visual effect having a depth component), inserting an object into the scene, making a measurement, etc. In some embodiments, applying the simulated depth effect includes adjusting areas of the image that correspond to a selected depth to have different degrees of blurriness/sharpness, sizes, degrees of brightness, degrees of saturation, and/or degrees of shape-distortion in order to simulate the depth effect, such as a bokeh effect. In some embodiments, the simulated depth effect is "simulated" in that the effect is (artificially) generated based on a manipulation of the underlying image data for the area of the image to create and apply the effect to the image (e.g., as opposed to being a "natural" effect that is based on underlying data as originally captured via one or more cameras based on the optical properties of light passing through one or more lenses to reach the image sensor of the camera).

FIG. 9 is a flow diagram illustrating a method for displaying capturing a plurality of still images with a plurality of different focal planes, in accordance with some embodiments. Method 900 is performed at a device (e.g., 100, 300, 500, 800) with a camera (e.g., 808). In some embodiments, the camera includes a single lens for adjusting the focal length of the camera. In some embodiments, the focal length changes by modifying the shape of the lens. Some operations in method 900 are, optionally, combined, the orders of some operations are, optionally, changed, and some operations are, optionally, omitted.

As described below, method 900 provides, among other things, an intuitive way for capturing images of an environment with different focal planes. The method reduces the cognitive burden on a user capturing an image of the environment, thereby creating a more efficient human-machine interface. For battery-operated computing devices, enabling a user to capture images with different focal planes faster and more efficiently conserves power and increases the time between battery charges.

The device (e.g., 800) detects (902) activation (e.g., 805, 807) of a shutter button (e.g., 804, 822, preview image 818) (e.g., a physical or virtual shutter button) that is associated with capturing still images.

In response to the activation of the shutter button, the device captures (904) a plurality of still images with a plurality of different focal planes. In some embodiments, at least one photographic property of the camera (e.g., exposure, zoom level, white balance, contrast, ISO value) other than the focal plane is maintained during the capture of the plurality of still images.

Capturing the plurality of still images includes capturing (906) first image data with the camera focused at a first focal plane (e.g., the image is captured with a lens of the camera set at a first focal length).

After capturing the first image data with the camera focused at the first focal plane, the device captures (908) second image data with the camera focused at a second focal plane. The second focal plane is selected without reference to changes in objects in the field of view of the camera between the capture of the first image data and the capture of the second image data (e.g., the first focal plane and the second focal plane are predefined or are selected at the same time in response to the activation of the shutter button and do not change based on movement of the camera or movement of objects toward or away from the camera between the capture of the first image data and the capture of the second image data). In some embodiments, the lens is changed to the second focal plane by modifying the shape of the lens. In some embodiments, the second image data is captured at a second time, later than a first time at which the first image data is captured. In some embodiments, the first image data and the second image data are consolidated into a single data file. Capturing a plurality of still images with a plurality of different focal planes in response to a single activation of a shutter button allows the still images to be captured more efficiently. Performing an optimized operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, detecting the activation of the shutter button includes detecting an input (e.g., 807) on a touch-sensitive display. In response to detecting the input, the device selects a respective image of the plurality of still images based on one or more properties of the input and displays the respective image of the plurality of still images (e.g., a single finger contact triggers capture of the plurality of still images and selects the focal plane for an image to be displayed). In some embodiments, the one or properties of the input include a characteristic intensity of the input. In some embodiments, the one or more properties of the input (e.g., 807) includes a location (e.g., on middleground object 820*b*) of the input on the touch-sensitive display. In some embodiments, if the input location corresponds to a location of an object being captured in the plurality of still images (e.g., on middleground object 820*b*), the focal plane of the image being displayed corresponds to the focal plane of the object). Capturing a plurality of still images with a plurality of different focal planes and then displaying one of the still images in response to a single input allows the still images to be captured and displayed more efficiently. Performing an optimized operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, after capturing the plurality of still images, the device displays (910) on a touch-sensitive display (e.g., 802), a first image (e.g., 824) of the plurality of still images corresponding to the first image data. The device then detects (912) a first input (e.g., 809) (e.g., a finger contact) at a location (e.g., 820*a*) on the touch-sensitive display corresponding to the first image. In response to the first input, the device displays (914) a second image (e.g., 826) of the plurality of still images corresponding to the second image data. Selecting a second image with a different focal plane for display based on a single input on a touch-sensitive display allows the second image to be displayed more efficiently. Performing an optimized operation without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the second image (e.g., 826) includes selecting the second image from the plurality of still images based on one or properties of the first input, the one or more properties including a characteristic intensity of the first input. In some embodiments, in accordance with a determination that the characteristic intensity of the first input is greater than a threshold intensity, the device maintains display of the second image after the first input ceases to be detected by the device, and in accordance with a determination that the characteristic intensity of the first input is less than the threshold intensity, the device displays the first image after the first input ceases to be detected by the device. In some embodiments, the threshold intensity is based at least in part on a focal plane of an object being captured in the plurality of still images (e.g., the characteristic intensity of input 809 pushes the focal plane deeper into image 824 until the focal plane is at a depth corresponding to an object in the image). In some embodiments, after changing to the focal plane of the object, focus is maintained on the object for subsequent activations of the shutter button. In some embodiments, in accordance with the determination that the characteristic intensity of the first input is greater than the threshold intensity, the device provides feedback indicating the threshold intensity is exceeded (e.g., audio/tactile/visual feedback occurs when the characteristic intensity of the first input exceeds the threshold).

In some embodiments, the one or properties of the first input include a duration of the input (e.g., long press, short press).

In some embodiments, the one or more properties of the first input includes the location (e.g., on foreground object 820a) of the first input on the touch-sensitive display. The device identifies an object in the first image corresponding to the location of the first input, where the object is associated with a respective focal plane. The device then displays an image (e.g., 826) of the plurality of still images captured with the respective focal plane (e.g., when the input location corresponds to a location of an object being captured in the plurality of still images, the focal plane changes to the respective focal plane of the object). In some embodiments, after the object is selected with the first input, focus is maintained on the object for subsequent activations of the shutter button.

In some embodiments, while displaying the second image (e.g., 826) of the plurality of still images, the device detects a second input (e.g., 811) (e.g., a finger contact) at a location (e.g., on background object 820c) on the touch-sensitive display corresponding to the second image. In response to the second input, the device displays a composite image (e.g., 828) on the touch-sensitive display. The composite image includes a portion of the second image associated with the first input (e.g., a portion of the image selected to be displayed in focus by the first input) and a portion of the second image associated with the second input (e.g., a portion of the image selected to be displayed in focus by the second input, such that multiple planes (e.g., foreground and background) are displayed in-focus, while other planes (e.g., a middleground) are displayed out-of-focus).

In some embodiments, after capturing the plurality of still images, the device receives a request (e.g., a single request, a single input) to display two or more images of the plurality of still images. In response to receiving the request, the device displays a first image of the plurality of still images and displays a second image of the plurality of still images a predetermined time after displaying the first image, where the first image and the second image were captured with different focal planes. In some embodiments, additional images having different focal depths are also displayed. In some embodiments, the sequence of images with different focal planes are automatically played through in a loop or back and forth (e.g., "boomerang") animation. In some embodiments, the sequence of images is displayed in response to a user input, and continues to be displayed either while the user's input is maintained or until a cancellation input is received.

In some embodiments, the device determines depth information of a scene captured in the plurality of still images with the plurality of different focal planes. The depth information is determined based on image data of the plurality of still images. In some embodiments, an operation is performed on at least one of the plurality of still images using the depth information, such as applying a simulated depth effect (e.g., a visual effect having a depth component), inserting an object into the scene, making a measurement, etc. In some embodiments, applying the simulated depth effect includes adjusting areas of the image that correspond to a selected depth to have different degrees of blurriness/sharpness, sizes, degrees of brightness, degrees of saturation, and/or degrees of shape-distortion in order to simulate the depth effect, such as a bokeh effect. In some embodiments, the simulated depth effect is "simulated" in that the effect is (artificially) generated based on a manipulation of the underlying image data for the area of the image to create and apply the effect to the image (e.g., as opposed to being a "natural" effect that is based on underlying data as originally captured via one or more cameras based on the optical properties of light passing through one or more lenses to reach the image sensor of the camera).

Note that details of the processes described above with respect to method 900 (e.g., FIG. 9) are also applicable in an analogous manner to the methods described above. For example, method 900 optionally includes one or more of the characteristics of the various methods described above with reference to method 700. For example, a plurality of still images with a plurality of different focal planes as described above with respect to method 900 can used in a live communication session described above with respect to method 700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to change the focal plane of stored images or a live video communication. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to can be used to recognize a person or subject within a captured image or video. Accordingly, use of such personal information data enables users to more easily recognize the content of a captured image or live video communication. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of detection and recognition of a person or subject within an image or live video communication, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, images or live video communications can be displayed based on non-personal information data or a bare minimum amount of personal information, such as the content being requested by the device associated with a user, other non-personal information available to the device, or publicly available information.

What is claimed is:

1. An electronic device, comprising:
   a camera;
   a touch-sensitive display;
   one or more processors; and
   memory storing one or more programs configured to be executed by the one or more processors, the one or more programs including instructions for:
   detecting activation of a shutter button that is associated with capturing still images;
   in response to the activation of the shutter button, capturing a plurality of still images with a plurality of different focal planes, including:
   capturing first image data with the camera focused at a first object in a first focal plane; and
   after capturing the first image data with the camera focused at the first object in the first focal plane, adjusting a camera focus from the first focal plane to a second focal plane and capturing second image data with the camera focused at a second object in the second focal plane, wherein the second focal plane is selected without reference to changes in objects in the field of view of the camera between the capture of the first image data and the capture of the second image data;
   after capturing the plurality of still images, displaying, via the touch-sensitive display, a first image of the plurality of still images corresponding to the first image data, wherein the first image includes the first object in-focus and the second object out-of-focus;

while displaying the first image of the plurality of still images, detecting a first input at a location on the touch-sensitive display corresponding to the location of the second object; and in response to detecting the first input, displaying, via the touch-sensitive display, a second image, wherein the second image includes the first object in-focus and the second object in-focus.

2. The electronic device of claim 1, the one or more programs include instructions for:

while displaying the first image of the plurality of still images, detecting a second input at a location on the touch-sensitive display corresponding to the first image; and in response to detecting the second input, displaying, via the touch-sensitive display, a third image of the plurality of still images corresponding to the second image data.

3. The electronic device of claim 2, wherein displaying the third image includes selecting the third image from the plurality of still images based on one or more properties of the second input, and wherein the one or more properties include a characteristic intensity of the second input.

4. The electronic device of claim 3, the one or more programs including instructions for:

in accordance with a determination that the characteristic intensity of the second input is greater than a threshold intensity, maintaining display of the third image after the second input ceases to be detected by the device; and in accordance with a determination that the characteristic intensity of the second input is less than the threshold intensity, displaying the first image after the second input ceases to be detected by the device.

5. The electronic device of claim 4, wherein the threshold intensity is based at least in part on a focal plane of an object being captured in the plurality of still images.

6. The electronic device of claim 4, the one or more programs including instructions for:

in accordance with the determination that the characteristic intensity of the second input is greater than the threshold intensity, providing feedback indicating the threshold intensity is exceeded.

7. The electronic device of claim 2, wherein the one or more properties of the second input include a duration of the second input.

8. The electronic device of claim 2, wherein the one or more properties of the second input includes the location of the second input on the touch-sensitive display, and wherein the one or more programs include instructions for:

identifying a respective object in the first image corresponding to the location of the second input, wherein the respective object is associated with a respective focal plane; and displaying an image of the plurality of still images captured with the respective focal plane.

9. The electronic device of claim 1, wherein the second image is a composite image that includes a portion of the first image data and a portion of the second image data.

10. The electronic device of claim 1, wherein at least one photographic property of the camera other than the focal plane is maintained during the capture of the plurality of still images.

11. The electronic device of claim 1, wherein detecting the activation of the shutter button includes detecting an input corresponding to activation of the shutter button on the touch-sensitive display, and wherein the one or more programs include instructions for:

in response to detecting the input corresponding to activation of the shutter button:

selecting a respective image of the plurality of still images based on one or more properties of the input corresponding to activation of the shutter button; and displaying, via the touch-sensitive display, the respective image of the plurality of still images.

12. The electronic device of claim 11, wherein the one or more properties of the input corresponding to activation of the shutter button include a characteristic intensity of the input.

13. The electronic device of claim 11, wherein the one or more properties of the input corresponding to activation of the shutter button includes a location of the input on the touch-sensitive display.

14. The electronic device of claim 1, wherein the one or more programs include instructions for:

after displaying the first image of the plurality of still images, displaying another image of the plurality of still images a predetermined time after displaying the first image, wherein the first image and the another image were captured with different focal planes.

15. The electronic device of claim 1, the one or more programs including instructions for:

determining depth information of a scene captured in the plurality of still images with the plurality of different focal planes, wherein the depth information is determined based on image data of the plurality of still images.

16. A non-transitory computer-readable storage medium storing one or more programs configured to be executed by one or more processors of an electronic device with a camera and a touch-sensitive display, the one or more programs including instructions for:

detecting activation of a shutter button that is associated with capturing still images;

in response to the activation of the shutter button, capturing a plurality of still images with a plurality of different focal planes, including:

capturing first image data with the camera focused at a first object in a first focal plane; and after capturing the first image data with the camera focused at the first object in the first focal plane, adjusting a camera focus from the first focal plane to a second focal plane and capturing second image data with the camera focused at a second object in the second focal plane, wherein the second focal plane is selected without reference to changes in objects in the field of view of the camera between the capture of the first image data and the capture of the second image data;

after capturing the plurality of still images, displaying, via the touch-sensitive display, a first image of the plurality of still images corresponding to the first image data, wherein the first image includes the first object in-focus and the second object out-of-focus;

while displaying the first image of the plurality of still images, detecting a first input at a location on the touch-sensitive display corresponding to the location of the second object; and in response to detecting the first input, displaying, via the touch-sensitive display, a second image, wherein the second image includes the first object in-focus and the second object in-focus.

17. A method comprising:
at an electronic device with a camera and a touch-sensitive display:
detecting activation of a shutter button that is associated with capturing still images;
in response to the activation of the shutter button, capturing a plurality of still images with a plurality of different focal planes, including:
capturing first image data with the camera focused at a first object in a first focal plane; and
after capturing the first image data with the camera focused at the first object in the first focal plane, adjusting a camera focus from the first focal plane to a second focal plane and capturing second image data with the camera focused at a second object in the second focal plane, wherein the second focal plane is selected without reference to changes in objects in the field of view of the camera between the capture of the first image data and the capture of the second image data;
after capturing the plurality of still images, displaying, via the touch-sensitive display, a first image of the plurality of still images corresponding to the first image data, wherein the first image includes the first object in-focus and the second object out-of-focus;
while displaying the first image of the plurality of still images, detecting a first input at a location on the touch-sensitive display corresponding to the location of the second object; and
in response to detecting the first input, displaying, via the touch-sensitive display, a second image, wherein the second image includes the first object in-focus and the second object in-focus.

18. The electronic device of claim 1, the one or more programs include instructions for:
after capturing the plurality of still images, displaying, via the touch-sensitive display, the first image of the plurality of still images corresponding to the first image data without displaying other images of the plurality of still images.

19. The electronic device of claim 1, the one or more programs including instructions for:
in response to detecting the first input, displaying, via the touch-sensitive display, the second image without displaying other images of the plurality of still images.

20. The non-transitory computer-readable storage medium of claim 16, the one or more programs include instructions for:
while displaying the first image of the plurality of still images, detecting a second input at a location on the touch-sensitive display corresponding to the first image; and
in response to detecting the second input, displaying, via the touch-sensitive display, a third image of the plurality of still images corresponding to the second image data.

21. The non-transitory computer-readable storage medium of claim 20, wherein displaying the third image includes selecting the third image from the plurality of still images based on one or more properties of the second input, and wherein the one or more properties include a characteristic intensity of the second input.

22. The non-transitory computer-readable storage medium of claim 21, the one or more programs including instructions for:
in accordance with a determination that the characteristic intensity of the second input is greater than a threshold intensity, maintaining display of the third image after the second input ceases to be detected by the device; and
in accordance with a determination that the characteristic intensity of the second input is less than the threshold intensity, displaying the first image after the second input ceases to be detected by the device.

23. The non-transitory computer-readable storage medium of claim 22, wherein the threshold intensity is based at least in part on a focal plane of an object being captured in the plurality of still images.

24. The non-transitory computer-readable storage medium of claim 22, the one or more programs including instructions for:
in accordance with the determination that the characteristic intensity of the second input is greater than the threshold intensity, providing feedback indicating the threshold intensity is exceeded.

25. The non-transitory computer-readable storage medium of claim 20, wherein the one or more properties of the second input include a duration of the second input.

26. The non-transitory computer-readable storage medium of claim 20, wherein the one or more properties of the second input includes the location of the second input on the touch-sensitive display, and wherein the one or more programs include instructions for:
identifying a respective object in the first image corresponding to the location of the second input, wherein the respective object is associated with a respective focal plane; and
displaying an image of the plurality of still images captured with the respective focal plane.

27. The non-transitory computer-readable storage medium of claim 16,
wherein the second image is a composite image that includes a portion of the first image data and a portion of the second image data.

28. The non-transitory computer-readable storage medium of claim 16, wherein at least one photographic property of the camera other than the focal plane is maintained during the capture of the plurality of still images.

29. The non-transitory computer-readable storage medium of claim 16, wherein detecting the activation of the shutter button includes detecting an input corresponding to activation of the shutter button on the touch-sensitive display, and wherein the one or more programs include instructions for:
in response to detecting the input corresponding to activation of the shutter button:
selecting a respective image of the plurality of still images based on one or more properties of the input corresponding to activation of the shutter button; and
displaying, via the touch-sensitive display, the respective image of the plurality of still images.

30. The non-transitory computer-readable storage medium of claim 29, wherein the one or more properties of the input corresponding to activation of the shutter button include a characteristic intensity of the input.

31. The non-transitory computer-readable storage medium of claim 29, wherein the one or more properties of the input corresponding to activation of the shutter button includes a location of the input on the touch-sensitive display.

32. The non-transitory computer-readable storage medium of claim 16, wherein the one or more programs include instructions for:

after displaying the first image of the plurality of still images, displaying another image of the plurality of still images a predetermined time after displaying the first image, wherein the first image and the another image were captured with different focal planes.

33. The non-transitory computer-readable storage medium of claim 16, the one or more programs including instructions for:
determining depth information of a scene captured in the plurality of still images with the plurality of different focal planes, wherein the depth information is determined based on image data of the plurality of still images.

34. The non-transitory computer-readable storage medium of claim 16, the one or more programs include instructions for:
after capturing the plurality of still images, displaying, via the touch-sensitive display, the first image of the plurality of still images corresponding to the first image data without displaying other images of the plurality of still images.

35. The non-transitory computer-readable storage medium of claim 16, the one or more programs including instructions for:
in response to detecting the first input, displaying, via the touch-sensitive display, the second image without displaying other images of the plurality of still images.

36. The method of claim 17, wherein the method further comprises:
while displaying the first image of the plurality of still images, detecting a second input at a location on the touch-sensitive display corresponding to the first image; and
in response to detecting the second input, displaying, via the touch-sensitive display, a third image of the plurality of still images corresponding to the second image data.

37. The method of claim 36, wherein displaying the third image includes selecting the third image from the plurality of still images based on one or more properties of the second input, and wherein the one or more properties include a characteristic intensity of the second input.

38. The method of claim 37, further comprising:
in accordance with a determination that the characteristic intensity of the second input is greater than a threshold intensity, maintaining display of the third image after the second input ceases to be detected by the device; and
in accordance with a determination that the characteristic intensity of the second input is less than the threshold intensity, displaying the first image after the second input ceases to be detected by the device.

39. The method of claim 38, wherein the threshold intensity is based at least in part on a focal plane of an object being captured in the plurality of still images.

40. The method of claim 38, further comprising:
in accordance with the determination that the characteristic intensity of the second input is greater than the threshold intensity, providing feedback indicating the threshold intensity is exceeded.

41. The method of claim 36, wherein the one or more properties of the second input include a duration of the second input.

42. The method of claim 36, wherein the one or more properties of the second input includes the location of the second input on the touch-sensitive display, and wherein the method further comprises:
identifying a respective object in the first image corresponding to the location of the second input, wherein the respective object is associated with a respective focal plane; and
displaying an image of the plurality of still images captured with the respective focal plane.

43. The method of claim 36,
wherein the second image is a composite image that includes a portion of the first image data and a portion of the second image data.

44. The method of claim 17, wherein at least one photographic property of the camera other than the focal plane is maintained during the capture of the plurality of still images.

45. The method of claim 17, wherein detecting the activation of the shutter button includes detecting an input corresponding to activation of the shutter button on the touch-sensitive display, and wherein the method further comprises:
in response to detecting the input corresponding to activation of the shutter button:
selecting a respective image of the plurality of still images based on one or more properties of the input corresponding to activation of the shutter button; and
displaying, via the touch-sensitive display, the respective image of the plurality of still images.

46. The method of claim 45, wherein the one or more properties of the input corresponding to activation of the shutter button include a characteristic intensity of the input.

47. The method of claim 45, wherein the one or more properties of the input corresponding to activation of the shutter button includes a location of the input on the touch-sensitive display.

48. The method of claim 17, wherein the method further comprises:
after displaying the first image of the plurality of still images, displaying another image of the plurality of still images a predetermined time after displaying the first image, wherein the first image and the another image were captured with different focal planes.

49. The method of claim 17, further comprising:
determining depth information of a scene captured in the plurality of still images with the plurality of different focal planes, wherein the depth information is determined based on image data of the plurality of still images.

50. The method of claim 17, wherein the method further comprises:
after capturing the plurality of still images, displaying, via the touch-sensitive display, the first image of the plurality of still images corresponding to the first image data without displaying other images of the plurality of still images.

51. The method of claim 17, further comprising:
in response to detecting the first input, displaying, via the touch-sensitive display, the second image without displaying other images of the plurality of still images.

* * * * *